US010586282B2

(12) United States Patent
Costakis et al.

(10) Patent No.: US 10,586,282 B2
(45) Date of Patent: *Mar. 10, 2020

(54) SYSTEM AND METHOD FOR TRADING BASED ON TOURNAMENT-STYLE EVENTS

(75) Inventors: Alexander M. Costakis, Los Angeles, CA (US); James J. Lefkowitz, Beverly Hills, CA (US)

(73) Assignee: CFPH, LLC, New York, NY (US)

( * ) Notice: Subject to any disclaimer, the term of this patent is extended or adjusted under 35 U.S.C. 154(b) by 2292 days.

This patent is subject to a terminal disclaimer.

(21) Appl. No.: 11/379,171

(22) Filed: Apr. 18, 2006

(65) Prior Publication Data

US 2006/0173764 A1     Aug. 3, 2006

(51) Int. Cl.
*G06Q 40/00* (2012.01)
*G06Q 40/04* (2012.01)
*G06Q 20/10* (2012.01)

(52) U.S. Cl.
CPC ............. *G06Q 40/04* (2013.01); *G06Q 20/10* (2013.01); *G06Q 40/00* (2013.01)

(58) Field of Classification Search
CPC ......... G06Q 50/34; G06Q 40/00; G06Q 40/04
USPC .............................................. 705/36 R, 35, 37
See application file for complete search history.

(56) References Cited

U.S. PATENT DOCUMENTS

| | | | |
|---|---|---|---|
| 3,499,646 A | 3/1970 | Burgess, Jr. et al. | 273/1 |
| 3,573,747 A | 4/1971 | Adams et al. | 340/172.5 |
| 3,581,072 A | 5/1971 | Nymeyer | 235/152 |
| 3,679,210 A | 7/1972 | Breslow | |
| 4,031,376 A | 6/1977 | Corkin, Jr. | |
| 4,363,489 A * | 12/1982 | Chodak | A63F 3/00643 273/237 |
| 4,378,942 A | 4/1983 | Isaac | 273/278 |
| 4,412,287 A | 10/1983 | Braddock, III | 364/408 |
| 4,597,046 A | 6/1986 | Musmanno et al. | 364/408 |
| 4,674,044 A | 6/1987 | Kalmus et al. | |
| 4,677,552 A | 6/1987 | Sibley, Jr. | |
| 4,823,265 A | 4/1989 | Nelson | 364/408 |

(Continued)

FOREIGN PATENT DOCUMENTS

| | | | |
|---|---|---|---|
| CN | 1417731 | 5/2003 | |
| DE | 35 39 545 A1 | 11/1985 | ............. G06F 15/21 |

(Continued)

OTHER PUBLICATIONS

Donnelly, Craig, Philadelphia Inquirer, Dec. 30, 1995, "Philadelphia Park Cancels Races Again as More Worksers Joi Strike the Bensalem Track's Three Of-Track Betting Sites Are Still Operating. So is its TV Show." ProQuest.*

(Continued)

*Primary Examiner* — Mike Anderson

(57) ABSTRACT

A system for trading a plurality of derivative financial instruments comprises a processor operable to receive a first order to buy a derivative financial instrument that represents a contestant in a contest. The processor is further operable to receive a second order to sell the derivative financial instrument. The processor is further operable to determine a market price based at least in part on the first order and the second order. The processor is further operable to execute a trade at the determined market price. The system further comprises a memory operable to store the first order and/or the second order.

77 Claims, 18 Drawing Sheets

(56) References Cited

U.S. PATENT DOCUMENTS

| | | | |
|---|---|---|---|
| 4,856,788 A | 8/1989 | Fischel | |
| 4,874,177 A | 10/1989 | Girardin | |
| 4,890,228 A | 12/1989 | Longfield | |
| 4,903,201 A | 2/1990 | Wagner | 364/408 |
| 4,918,603 A | 4/1990 | Hughes et al. | 364/410 |
| 4,962,950 A | 10/1990 | Champion | |
| 4,980,826 A | 12/1990 | Wagner | 364/408 |
| 5,027,102 A | 6/1991 | Sweeny | |
| 5,077,665 A | 12/1991 | Silverman et al. | 364/408 |
| 5,101,353 A * | 3/1992 | Lupien | G06Q 40/04 340/4.5 |
| 5,108,115 A | 4/1992 | Berman et al. | 273/439 |
| 5,113,423 A | 5/1992 | Csonka | |
| 5,136,501 A | 8/1992 | Silverman et al. | 364/408 |
| 5,193,057 A | 3/1993 | Longfield | |
| 5,202,827 A | 4/1993 | Sober | |
| 5,205,827 A | 4/1993 | Sober | |
| 5,237,500 A | 8/1993 | Perg et al. | |
| 5,270,922 A | 12/1993 | Higgins | 364/408 |
| 5,297,031 A | 3/1994 | Gutterman et al. | |
| 5,297,032 A | 3/1994 | Trojan et al. | 364/408 |
| 5,315,634 A | 5/1994 | Tanaka et al. | |
| 5,375,055 A | 12/1994 | Togher et al. | 364/408 |
| 5,489,096 A | 2/1996 | Aron | |
| 5,497,317 A | 3/1996 | Hawkins et al. | |
| 5,508,731 A | 4/1996 | Kohorn | |
| 5,508,913 A | 4/1996 | Yamamoto et al. | 364/408 |
| 5,537,314 A | 7/1996 | Kanter | |
| 5,557,517 A | 9/1996 | Daughterty, III | 364/408 |
| 5,573,244 A | 11/1996 | Mindes | |
| 5,586,937 A | 12/1996 | Menashe | |
| 5,675,746 A * | 10/1997 | Marshall | G06F 3/04815 705/35 |
| 5,689,652 A | 11/1997 | Lupien et al. | 395/237 |
| 5,692,233 A | 11/1997 | Garman | 705/36 |
| 5,713,793 A | 2/1998 | Holte | 463/25 |
| 5,724,524 A | 3/1998 | Hunt et al. | |
| 5,727,165 A | 3/1998 | Ordish et al. | 395/237 |
| 5,743,525 A | 4/1998 | Haddad | |
| 5,794,219 A | 8/1998 | Brown | 705/37 |
| 5,799,287 A | 8/1998 | Dembo | |
| 5,806,048 A | 9/1998 | Kiron et al. | |
| 5,819,237 A | 10/1998 | Garman | |
| 5,819,238 A | 10/1998 | Fernholz | 705/36 |
| 5,826,241 A | 10/1998 | Stein et al. | |
| 5,842,148 A | 11/1998 | Prendergast et al. | |
| 5,842,921 A | 12/1998 | Mindes et al. | |
| 5,845,266 A * | 12/1998 | Lupien | G06Q 40/00 705/36 R |
| 5,846,132 A | 12/1998 | Junkin | 463/42 |
| 5,888,136 A | 3/1999 | Herbert | |
| 5,905,974 A | 5/1999 | Fraser et al. | 705/37 |
| 5,913,203 A | 6/1999 | Wong et al. | |
| 5,924,082 A | 7/1999 | Silverman et al. | 705/37 |
| 5,943,678 A | 8/1999 | Hocker et al. | |
| 5,946,667 A | 8/1999 | Tull, Jr. et al. | |
| 5,950,175 A | 9/1999 | Austin | |
| 5,950,176 A * | 9/1999 | Keiser | G06Q 40/00 705/35 |
| 5,950,177 A | 9/1999 | Lupien et al. | |
| 5,975,775 A | 9/1999 | Cherry | |
| 5,963,921 A | 10/1999 | Longfield | |
| 5,970,479 A | 10/1999 | Shepherd | |
| 6,004,211 A | 12/1999 | Brenner et al. | |
| 6,009,402 A | 12/1999 | Whitworth | |
| 6,012,046 A | 1/2000 | Lupien et al. | 705/37 |
| 6,014,643 A | 1/2000 | Minton | 705/37 |
| 6,016,483 A | 1/2000 | Rickard et al. | 705/37 |
| 6,021,397 A | 2/2000 | Jones et al. | |
| 6,023,685 A | 2/2000 | Brett et al. | 705/37 |
| 6,024,641 A | 2/2000 | Sarno | |
| 6,026,364 A | 2/2000 | Whitworth | |
| 6,026,388 A | 2/2000 | Liddy et al. | |
| 6,029,146 A | 2/2000 | Hawkins et al. | 705/35 |
| 6,035,287 A | 3/2000 | Stallaert et al. | |
| 6,048,269 A | 4/2000 | Burns | |
| 6,058,377 A | 5/2000 | Traub et al. | |
| 6,058,379 A | 5/2000 | Odom | |
| 6,064,985 A | 5/2000 | Anderson | |
| 6,067,532 A | 5/2000 | Gebb | 705/37 |
| 6,088,685 A | 7/2000 | Kiron | |
| 6,112,189 A | 8/2000 | Rickard et al. | |
| 6,113,492 A | 9/2000 | Walker et al. | |
| 6,115,698 A | 9/2000 | Tuck et al. | |
| 6,120,376 A | 9/2000 | Cherry | 463/16 |
| 6,126,543 A | 10/2000 | Friedman | |
| 6,152,822 A | 11/2000 | Herbert | |
| 6,154,730 A | 11/2000 | Adams et al. | |
| 6,161,096 A | 12/2000 | Bell | |
| 6,202,052 B1 | 3/2001 | Miller | |
| 6,236,900 B1 | 5/2001 | Geiger | 700/91 |
| 6,236,972 B1 | 5/2001 | Shkedy | |
| 6,240,396 B1 | 5/2001 | Walker et al. | 705/26 |
| 6,260,019 B1 | 7/2001 | Courts | |
| 6,260,024 B1 | 7/2001 | Shkedy | 705/37 |
| 6,263,321 B1 | 7/2001 | Daughtery, III | |
| 6,263,900 B1 | 7/2001 | Cabrera et al. | |
| 6,278,981 B1 | 8/2001 | Dembo et al. | |
| 6,296,569 B1 | 10/2001 | Congello, Jr. | |
| 6,309,307 B1 | 10/2001 | Krause et al. | |
| 6,325,721 B1 | 12/2001 | Miyamoto et al. | |
| 6,331,148 B1 | 12/2001 | Krause et al. | |
| 6,347,086 B1 | 2/2002 | Strachan | |
| 6,358,150 B1 | 3/2002 | Mir et al. | |
| 6,360,210 B1 | 3/2002 | Wallman | |
| 6,371,855 B1 | 4/2002 | Gavriloff | 463/42 |
| 6,418,417 B1 | 7/2002 | Corby et al. | |
| 6,443,841 B1 | 9/2002 | Rossides | |
| 6,450,887 B1 | 9/2002 | Mir et al. | |
| 6,470,324 B1 | 10/2002 | Brown et al. | 705/28 |
| 6,482,091 B1 | 11/2002 | Kobayashi et al. | |
| 6,527,270 B2 | 3/2003 | Maksymec et al. | |
| 6,578,010 B1 | 6/2003 | Teacherson | |
| 6,598,028 B1 | 7/2003 | Sullivan et al. | 705/35 |
| 6,604,239 B1 * | 8/2003 | Kohen | 705/36 R |
| 6,629,082 B1 | 9/2003 | Hambrecht et al. | |
| 6,505,174 B1 | 10/2003 | Keiser et al. | |
| 6,669,565 B2 | 12/2003 | Liegey | 463/42 |
| 6,688,978 B1 | 2/2004 | Herman | 463/25 |
| 6,692,916 B2 | 2/2004 | Bevilacqua et al. | |
| 6,697,787 B1 | 2/2004 | Miller | |
| 6,711,550 B1 | 3/2004 | Lewis et al. | |
| 6,772,132 B1 | 8/2004 | Kemp et al. | |
| 6,792,411 B1 | 9/2004 | Massey, Jr. | |
| 6,837,791 B1 | 1/2005 | McNutt et al. | |
| 6,910,965 B2 | 6/2005 | Downes | |
| 6,925,446 B2 | 8/2005 | Watanabe | 705/26 |
| 6,939,137 B1 | 9/2005 | Colaio et al. | 434/107 |
| 7,001,279 B1 | 2/2006 | Barber et al. | 463/42 |
| 7,003,485 B1 | 2/2006 | Young | 705/37 |
| 7,006,991 B2 | 2/2006 | Keiser et al. | 705/37 |
| 7,016,873 B1 | 3/2006 | Peterson et al. | |
| 7,031,938 B2 | 4/2006 | Fraivillig et al. | 705/36 R |
| 7,062,457 B1 * | 6/2006 | Kaufman | 705/35 |
| 7,076,459 B2 | 7/2006 | Zhang et al. | 705/37 |
| 7,099,838 B1 | 8/2006 | Gastineau et al. | |
| 7,099,839 B2 | 8/2006 | Madoff et al. | 705/37 |
| 7,110,961 B1 | 9/2006 | Goino | 705/14 |
| 7,120,928 B2 | 10/2006 | Sheth et al. | |
| 7,124,106 B1 | 10/2006 | Stallaert et al. | |
| 7,127,425 B1 | 10/2006 | Wilson | |
| 7,131,574 B1 | 11/2006 | Sciupac et al. | |
| 7,146,334 B2 | 12/2006 | Hogg et al. | 705/37 |
| 7,152,041 B2 | 12/2006 | Salavadori et al. | 705/36 R |
| 7,158,950 B2 | 1/2007 | Snyder | |
| 7,162,447 B1 | 1/2007 | Cushing | 705/37 |
| 7,171,385 B1 | 1/2007 | Dembo et al. | |
| 7,171,386 B1 | 1/2007 | Raykhman | 705/37 |
| 7,172,508 B2 | 2/2007 | Simon et al. | |
| 7,174,517 B2 | 2/2007 | Barnett et al. | |
| 7,177,829 B1 | 2/2007 | Wilson et al. | |
| 7,201,653 B2 * | 4/2007 | Radom | A63F 9/183 463/9 |
| 7,219,071 B2 | 5/2007 | Gallagher | |

(56) References Cited

U.S. PATENT DOCUMENTS

| | | | |
|---|---|---|---|
| 7,233,922 B2 | 6/2007 | Asher et al. | |
| 7,236,955 B2 | 6/2007 | Sugahara | |
| 7,249,081 B2 | 7/2007 | Shearer et al. | |
| 7,263,504 B2 | 8/2007 | Galai et al. | |
| 7,321,871 B2 | 1/2008 | Scott et al. | |
| 7,340,425 B2 | 3/2008 | Boyle et al. | |
| 7,341,517 B2 | 3/2008 | Asher et al. | |
| 7,359,871 B1 | 4/2008 | Paasche et al. | |
| 7,389,262 B1 | 6/2008 | Lange | |
| 7,389,268 B1 | 6/2008 | Kemp et al. | |
| 7,395,232 B1 | 7/2008 | Pilato | |
| 7,409,367 B2 | 8/2008 | McGill et al. | |
| 7,437,304 B2 | 10/2008 | Barnard et al. | |
| 7,438,640 B2 | 10/2008 | Amour | |
| 7,451,104 B1 | 11/2008 | Hendrix | |
| 7,487,123 B1 | 2/2009 | Keiser et al. | |
| 7,536,327 B2 | 5/2009 | Griebel et al. | |
| 7,567,931 B2 | 7/2009 | Asher et al. | |
| 7,567,935 B2 | 7/2009 | Tell et al. | |
| 7,571,130 B2 | 8/2009 | Weber et al. | |
| 7,641,549 B2 | 1/2010 | Asher et al. | |
| 7,690,991 B2 | 4/2010 | Black | |
| 7,698,184 B2* | 4/2010 | Asher et al. | 705/35 |
| 7,742,972 B2 | 6/2010 | Lange et al. | |
| 7,818,225 B2 | 10/2010 | Gula | |
| 7,844,514 B2 | 11/2010 | Blasnik et al. | |
| 7,896,740 B2 | 3/2011 | Asher et al. | |
| 7,908,323 B2 | 3/2011 | Lim | |
| 7,918,392 B2 | 4/2011 | Beck et al. | |
| 7,962,400 B2 | 6/2011 | Amaitis et al. | |
| 7,996,296 B2 | 8/2011 | Lange | |
| 8,027,899 B2 | 9/2011 | Asher et al. | |
| 8,065,219 B2 | 11/2011 | Haynie et al. | |
| 8,364,571 B1 | 1/2013 | Sroka et al. | |
| 8,380,602 B2 | 2/2013 | Lutnick | |
| 8,504,454 B2 | 8/2013 | Asher et al. | |
| 8,756,142 B1 | 6/2014 | Keiser et al. | |
| 2001/0003099 A1 | 6/2001 | Von Kohorn | 463/40 |
| 2001/0029485 A1 | 10/2001 | Brody et al. | |
| 2001/0031656 A1 | 10/2001 | Marshall et al. | |
| 2001/0034268 A1 | 10/2001 | Thomas et al. | |
| 2001/0037211 A1 | 11/2001 | McNutt et al. | |
| 2001/0037268 A1 | 11/2001 | Miller | |
| 2001/0039209 A1 | 11/2001 | DeWeese et al. | |
| 2001/0042785 A1 | 11/2001 | Walker et al. | |
| 2001/0047291 A1 | 11/2001 | Garahi et al. | |
| 2001/0047295 A1 | 11/2001 | Tenembaum | |
| 2002/0013747 A1 | 1/2002 | Valentine et al. | |
| 2002/0019792 A1* | 2/2002 | Maerz et al. | 705/36 |
| 2002/0023035 A1 | 2/2002 | Kiron et al. | |
| 2002/0023037 A1 | 2/2002 | White | |
| 2002/0026390 A1 | 2/2002 | Ulenas et al. | 705/27 |
| 2002/0032641 A1 | 3/2002 | Mendiola et al. | |
| 2002/0038270 A1 | 3/2002 | Shin et al. | |
| 2002/0042741 A1 | 4/2002 | Glover | |
| 2002/0046109 A1 | 4/2002 | Leonard et al. | |
| 2002/0052816 A1 | 5/2002 | Clenaghan et al. | |
| 2002/0055089 A1 | 5/2002 | Scheirer | |
| 2002/0062243 A1 | 5/2002 | Anderson | 705/10 |
| 2002/0062281 A1 | 5/2002 | Singhal | |
| 2002/0065666 A1 | 5/2002 | Zorrila De San Martin Soto | |
| 2002/0068633 A1 | 6/2002 | Schlaifer | 463/43 |
| 2002/0073021 A1 | 6/2002 | Ginsberg et al. | |
| 2002/0076674 A1 | 6/2002 | Kaplan | |
| 2002/0077880 A1 | 6/2002 | Gordon et al. | 705/10 |
| 2002/0077961 A1* | 6/2002 | Eckert et al. | 705/37 |
| 2002/0082965 A1 | 6/2002 | Loeper | |
| 2002/0082969 A1 | 6/2002 | O'Keeffe et al. | 705/37 |
| 2002/0087373 A1 | 7/2002 | Dickstein et al. | |
| 2002/0087447 A1 | 7/2002 | McDonald et al. | |
| 2002/0087454 A1 | 7/2002 | Calo et al. | |
| 2002/0094869 A1 | 7/2002 | Harkham | |
| 2002/0095369 A1 | 7/2002 | Kaplan et al. | |
| 2002/0099640 A1 | 7/2002 | Lange | |
| 2002/0103738 A1 | 8/2002 | Griebel et al. | |
| 2002/0107599 A1* | 8/2002 | Patel et al. | 700/99 |
| 2002/0111946 A1 | 8/2002 | Fallon | |
| 2002/0112014 A1 | 8/2002 | Bennett et al. | |
| 2002/0115488 A1 | 8/2002 | Berry et al. | |
| 2002/0119793 A1 | 8/2002 | Hronek et al. | |
| 2002/0120490 A1 | 8/2002 | Gajewski et al. | 705/10 |
| 2002/0128951 A1 | 9/2002 | Kiron et al. | |
| 2002/0133410 A1 | 9/2002 | Hermreck et al. | |
| 2002/0143676 A1 | 10/2002 | Kiron et al. | |
| 2002/0147670 A1 | 10/2002 | Lange | |
| 2002/0151340 A1 | 10/2002 | Guinn | |
| 2002/0152458 A1 | 10/2002 | Eyer et al. | |
| 2002/0153656 A1 | 10/2002 | Maksymec et al. | 273/138.1 |
| 2002/0156709 A1 | 10/2002 | Andrus et al. | |
| 2002/0156715 A1 | 10/2002 | Wall et al. | 705/37 |
| 2002/0161622 A1 | 10/2002 | Zhang et al. | 705/10 |
| 2002/0165740 A1 | 11/2002 | Saunder | |
| 2002/0188555 A1 | 12/2002 | Lawrence | |
| 2002/0194097 A1 | 12/2002 | Reitz | |
| 2002/0194502 A1 | 12/2002 | Sheth et al. | |
| 2003/0008711 A1 | 1/2003 | Corbo | |
| 2003/0009415 A1 | 1/2003 | Lutnick et al. | |
| 2003/0018564 A1 | 1/2003 | Bonnier et al. | 705/37 |
| 2003/0018571 A1 | 1/2003 | Eckert et al. | 705/37 |
| 2003/0022719 A1 | 1/2003 | Donald et al. | |
| 2003/0024988 A1 | 2/2003 | Stanard | |
| 2003/0036395 A1 | 2/2003 | Proidi | |
| 2003/0036396 A1 | 2/2003 | Back et al. | |
| 2003/0061096 A1 | 3/2003 | Gallivan et al. | 705/14 |
| 2003/0065615 A1 | 4/2003 | Aschir | |
| 2003/0093356 A1 | 5/2003 | Kaufman | |
| 2003/0101128 A1 | 5/2003 | Abernethy | |
| 2003/0115128 A1 | 6/2003 | Lange et al. | |
| 2003/0130920 A1 | 7/2003 | Freund | |
| 2003/0130941 A1 | 7/2003 | Birle | |
| 2003/0144046 A1 | 7/2003 | Hara | |
| 2003/0144054 A1 | 7/2003 | DeWeese et al. | |
| 2003/0144057 A1 | 7/2003 | Brenner et al. | |
| 2003/0154092 A1 | 8/2003 | Bouron et al. | 705/1 |
| 2003/0157976 A1 | 8/2003 | Simon et al. | |
| 2003/0171980 A1 | 9/2003 | Keiser et al. | |
| 2003/0172026 A1 | 9/2003 | Tarrant | |
| 2003/0177055 A1 | 9/2003 | Zimmerman, Jr. et al. | 705/10 |
| 2003/0199315 A1 | 10/2003 | Downes | |
| 2003/0200164 A1 | 10/2003 | Jacobs | |
| 2003/0204408 A1 | 10/2003 | Guler et al. | 705/1 |
| 2003/0212623 A1 | 11/2003 | Aylmer et al. | |
| 2003/0225618 A1 | 12/2003 | Hessburg et al. | |
| 2003/0236734 A1 | 12/2003 | Guler et al. | 705/37 |
| 2003/0236738 A1 | 12/2003 | Lange et al. | |
| 2004/0015427 A1 | 1/2004 | Camelio | |
| 2004/0039685 A1 | 2/2004 | Hambrecht et al. | |
| 2004/0043810 A1 | 3/2004 | Perlin et al. | |
| 2004/0049447 A1* | 3/2004 | Keiser et al. | 705/37 |
| 2004/0058731 A1 | 3/2004 | Rossides | |
| 2004/0059646 A1 | 3/2004 | Harrington et al. | 705/27 |
| 2004/0059660 A1 | 3/2004 | Michael | |
| 2004/0068738 A1 | 4/2004 | Kinoshita | |
| 2004/0078268 A1 | 4/2004 | Sprogis | |
| 2004/0078314 A1 | 4/2004 | Maerz et al. | |
| 2004/0088242 A1 | 5/2004 | Asher et al. | |
| 2004/0088244 A1 | 5/2004 | Bartter et al. | |
| 2004/0110552 A1 | 6/2004 | Del Prado | 463/4 |
| 2004/0111358 A1 | 6/2004 | Lange et al. | |
| 2004/0117302 A1 | 6/2004 | Weichert et al. | |
| 2004/0138977 A1 | 7/2004 | Tomkins et al. | |
| 2004/0143530 A1 | 7/2004 | Galai et al. | |
| 2004/0148236 A1 | 7/2004 | Steidlmayer | |
| 2004/0148244 A1 | 7/2004 | Badeau et al. | |
| 2004/0153375 A1 | 8/2004 | Mukunya et al. | 705/26 |
| 2004/0171381 A1 | 9/2004 | Inselberg | 455/426.2 |
| 2004/0192437 A1 | 9/2004 | Amaitis et al. | 463/26 |
| 2004/0193469 A1 | 9/2004 | Amaitis et al. | |
| 2004/0193531 A1 | 9/2004 | Amaitis et al. | |
| 2004/0199450 A1 | 10/2004 | Johnston et al. | 705/37 |
| 2004/0199451 A1 | 10/2004 | Benning et al. | |
| 2004/0199459 A1 | 10/2004 | Johnston et al. | 705/38 |
| 2004/0199471 A1 | 10/2004 | Hardjono | 705/50 |
| 2004/0204245 A1 | 10/2004 | Amaitis et al. | |

(56) References Cited

U.S. PATENT DOCUMENTS

| | | | |
|---|---|---|---|
| 2004/0210507 A1* | 10/2004 | Asher | G06Q 40/00 705/37 |
| 2004/0225554 A1 | 11/2004 | Chiappetta et al. | 705/10 |
| 2004/0229671 A1 | 11/2004 | Stronach et al. | |
| 2004/0235542 A1 | 11/2004 | Stronach et al. | |
| 2004/0235561 A1 | 11/2004 | Marshall et al. | |
| 2004/0243504 A1 | 12/2004 | Asher et al. | 705/37 |
| 2004/0248637 A1 | 12/2004 | Liebenberg et al. | |
| 2004/0260575 A1 | 12/2004 | Massey, Jr. | |
| 2004/0267657 A1 | 12/2004 | Hecht | |
| 2005/0010487 A1 | 1/2005 | Weisbach et al. | |
| 2005/0021441 A1 | 1/2005 | Flake et al. | 705/37 |
| 2005/0021445 A1 | 1/2005 | Caro | |
| 2005/0027583 A1 | 2/2005 | Smit et al. | |
| 2005/0027643 A1 | 2/2005 | Amaitis et al. | |
| 2005/0038706 A1 | 2/2005 | Yazdani et al. | |
| 2005/0044025 A1 | 2/2005 | Tutty et al. | |
| 2005/0049731 A1 | 3/2005 | Dell | 700/91 |
| 2005/0055302 A1 | 3/2005 | Wenger et al. | 705/36 |
| 2005/0064937 A1 | 3/2005 | Ballman | 463/40 |
| 2005/0070251 A1 | 3/2005 | Satake et al. | |
| 2005/0071250 A1 | 3/2005 | Weisbach et al. | |
| 2005/0080705 A1 | 4/2005 | Chaganti | |
| 2005/0086147 A1 | 4/2005 | Woodruff et al. | |
| 2005/0097022 A1 | 5/2005 | Silman | |
| 2005/0102215 A1 | 5/2005 | Ausubel et al. | 705/37 |
| 2005/0108131 A1 | 5/2005 | Halikias | |
| 2005/0125333 A1 | 6/2005 | Giannetti | 705/37 |
| 2005/0154629 A1 | 7/2005 | Matsuda et al. | 705/10 |
| 2005/0160020 A1* | 7/2005 | Asher | G06Q 40/00 705/35 |
| 2005/0160024 A1 | 7/2005 | Soderborg et al. | 705/37 |
| 2005/0160028 A1* | 7/2005 | Asher | G06Q 40/00 705/37 |
| 2005/0160029 A1* | 7/2005 | Asher | G06Q 40/00 705/37 |
| 2005/0187866 A1 | 8/2005 | Lee | |
| 2005/0209954 A1* | 9/2005 | Asher | G06Q 40/00 705/37 |
| 2005/0218218 A1 | 10/2005 | Koster | |
| 2005/0267836 A1 | 12/2005 | Crosthwaite et al. | |
| 2006/0003830 A1 | 1/2006 | Walker et al. | 463/20 |
| 2006/0004584 A1 | 1/2006 | Knight | |
| 2006/0025208 A1 | 2/2006 | Ramsey | 463/25 |
| 2006/0026091 A1 | 2/2006 | Keen, Jr. et al. | |
| 2006/0036448 A1 | 2/2006 | Haynie et al. | |
| 2006/0069635 A1 | 3/2006 | Ram et al. | 705/37 |
| 2006/0080220 A1 | 4/2006 | Samuel et al. | |
| 2006/0085320 A1 | 4/2006 | Owens et al. | |
| 2006/0100006 A1 | 5/2006 | Mitchell et al. | 463/9 |
| 2006/0105840 A1 | 5/2006 | Graeve | 463/42 |
| 2006/0116950 A1 | 6/2006 | Poffenberger et al. | 705/37 |
| 2006/0123092 A1 | 6/2006 | Madams et al. | |
| 2006/0143099 A1 | 6/2006 | Partlow et al. | 705/35 |
| 2006/0143110 A1 | 6/2006 | Keiser et al. | |
| 2006/0173761 A1 | 8/2006 | Costakis | 705/35 |
| 2006/0195355 A1 | 8/2006 | Lundgren | |
| 2006/0235783 A1 | 10/2006 | Ryles et al. | |
| 2006/0240852 A1 | 10/2006 | Al-Sarawi | |
| 2006/0258429 A1 | 11/2006 | Manning et al. | |
| 2006/0259312 A1 | 11/2006 | DeTitta | |
| 2006/0259381 A1 | 11/2006 | Gershon | 705/35 |
| 2006/0277135 A1 | 12/2006 | Jain et al. | 705/37 |
| 2006/0293985 A1 | 12/2006 | Lederman et al. | |
| 2006/0293995 A1 | 12/2006 | Borgs et al. | 705/37 |
| 2007/0010314 A1 | 1/2007 | Tulley et al. | |
| 2007/0054718 A1 | 3/2007 | Del Prado | 463/1 |
| 2007/0060380 A1 | 3/2007 | McMonigle et al. | 463/42 |
| 2007/0061240 A1 | 3/2007 | Jain et al. | 705/37 |
| 2007/0073608 A1 | 3/2007 | Garcia | 705/37 |
| 2007/0087815 A1 | 4/2007 | Van Luchene | |
| 2007/0087816 A1 | 4/2007 | Van Luchene | |
| 2007/0088661 A1 | 4/2007 | De Verdier et al. | |
| 2007/0100729 A1 | 5/2007 | Chen | |
| 2007/0130040 A1 | 6/2007 | Stinski | |
| 2007/0136074 A1 | 6/2007 | Hahn et al. | |
| 2007/0156594 A1 | 7/2007 | McGucken | |
| 2007/0168268 A1 | 7/2007 | Lange et al. | |
| 2007/0174171 A1 | 7/2007 | Sheffield | |
| 2007/0207849 A1 | 9/2007 | Asher et al. | |
| 2007/0208642 A1 | 9/2007 | Asher et al. | |
| 2007/0225069 A1 | 9/2007 | Garahi et al. | |
| 2007/0255965 A1 | 11/2007 | McGucken | |
| 2007/0298871 A1 | 12/2007 | Asher et al. | |
| 2008/0015969 A1 | 1/2008 | Mowshowitz | |
| 2008/0026825 A1 | 1/2008 | Yoshioka | |
| 2008/0032786 A1 | 2/2008 | Hosokawa | |
| 2008/0088087 A1 | 4/2008 | Weitzman et al. | |
| 2008/0120221 A1 | 5/2008 | Toneguzzo | |
| 2008/0153579 A1 | 6/2008 | Brenner et al. | |
| 2008/0183611 A1 | 7/2008 | Frischer | |
| 2008/0195459 A1 | 8/2008 | Stinski | |
| 2008/0200242 A1 | 8/2008 | Ginsberg et al. | |
| 2008/0207297 A1 | 8/2008 | Zilba | |
| 2008/0275824 A1 | 11/2008 | Assia et al. | |
| 2009/0017905 A1 | 1/2009 | Meckenzie et al. | |
| 2009/0061995 A1 | 3/2009 | Assia et al. | |
| 2009/0062016 A1 | 3/2009 | Assia et al. | |
| 2009/0186689 A1 | 7/2009 | Hughes et al. | |
| 2009/0210335 A1 | 8/2009 | Asher et al. | |
| 2009/0247286 A1 | 10/2009 | Inamura | |
| 2010/0153256 A1 | 6/2010 | Asher et al. | |
| 2010/0160012 A1 | 6/2010 | Amaitis et al. | |
| 2010/0173697 A1 | 7/2010 | Van Luchene | |
| 2010/0197382 A1 | 8/2010 | Van Luchene | |
| 2010/0210335 A1 | 8/2010 | Goto et al. | |
| 2010/0216545 A1 | 8/2010 | Lange et al. | |
| 2011/0208633 A1 | 8/2011 | Asher et al. | |
| 2013/0157755 A1 | 6/2013 | Amaitis | |
| 2013/0204764 A1 | 8/2013 | Sroka et al. | |
| 2013/0282551 A1 | 10/2013 | Keiser | |
| 2014/0067643 A1 | 3/2014 | Asher et al. | |
| 2015/0031423 A1 | 1/2015 | Amaitis et al. | |
| 2017/0109823 A1 | 4/2017 | Crosthwaite | |
| 2019/0287350 A1 | 9/2019 | Asher | |

FOREIGN PATENT DOCUMENTS

| | | | |
|---|---|---|---|
| EP | 0 739 526 | 10/1995 | |
| EP | 1 132 836 A1 | 9/2001 | G06F 17/60 |
| EP | 1 363 430 | 5/2002 | |
| EP | 0401203 | 11/2005 | |
| GB | 2180675 | 4/1987 | |
| GB | 2299425 | 10/1996 | |
| GB | 1574447 | 9/2008 | |
| JP | 2002-007712 | 1/2002 | |
| JP | 2002049789 | 2/2002 | G06F 17/60 |
| JP | 2002-099733 | 4/2002 | |
| JP | 2004-094377 | 3/2004 | |
| JP | 2004-513409 | 4/2004 | |
| JP | 2005-301588 | 10/2005 | |
| JP | 2006-012098 | 1/2006 | |
| JP | 6430053 | 11/2018 | |
| KR | 2001065086 | 7/2001 | G06F 17/60 |
| KR | 2001098204 | 11/2001 | G06F 17/60 |
| KR | 2002042036 | 6/2002 | G06F 17/60 |
| KR | 2004-0062806 | 7/2004 | |
| WO | WO 93110503 | 11/1992 | |
| WO | WO 96/41315 | 3/1996 | |
| WO | WO 98/58333 A1 | 12/1998 | G06F 17/60 |
| WO | WO 00/26745 | 5/2000 | |
| WO | WO 01/16825 | 6/2000 | |
| WO | WO 01/98983 | 6/2000 | |
| WO | WO 01/39056 | 11/2000 | |
| WO | WO 00/79442 A1 | 12/2000 | |
| WO | WO02/12986 | 8/2001 | |
| WO | WO 01/77861 | 10/2001 | |
| WO | WO 01/77940 | 10/2001 | |
| WO | WO 01/77964 A2 | 10/2001 | |
| WO | WO 02/46999 | 11/2001 | |
| WO | WO 02/25547 | 3/2002 | |
| WO | WO 03/010720 | 7/2002 | |
| WO | WO 03/090102 | 10/2003 | |

(56) References Cited

FOREIGN PATENT DOCUMENTS

| WO | WO 2003/100567 | 12/2003 |
|---|---|---|
| WO | WO 2003/107288 | 12/2003 |
| WO | WO2004/031899 | 4/2004 |
| WO | WO 2004/090681 A3 | 10/2004 |
| WO | WO2005/001728 | 1/2005 |
| WO | WO 2005/017700 | 2/2005 |

OTHER PUBLICATIONS

Evening Post, Aug. 4, 2001, "Big Names Raise Stakes in Internet Casinos".*
Wayback machine for www.wikipedia.com in 2005 for definition of "dividend".*
Nils H. Hakansson, et al.; The Journal of Finance; *On the Feasibility of Automated Market Making by a Programmed Specialist*; vol. XL, No. 1; pp. 1-20, Mar. 1985.
William C. Freund; California Management Review; *Trading Stock Around the Clock: The Future Growth of Global Electronic Markets*; 34, 1; ABI/INFORM Global; pp. 87-102, 1991.
Barbara Howard; The Trade; Institutional Investor; *Technology AIMS to Take the Final Step*; pp. 15-16, Jan. 1991.
Richard R. Lindsey, et al.; Financial Analysts Journal; *Specialist vs. Saitori: Market-Making in New York and Tokyo*; 48, 4; ABI/INFORM Global; pp. 48-57, Jul./Aug. 1992.
K. C. Chan, et al.; The Journal of Business; *Market Structure and the Intraday Pattern of Bid-Ask Spreads for NASDAQ Securities*; vol. 68, No. 1; pp. 35-60, Jan. 1995.
Jia Ye; *An Investigation of Market Fragmentation and the Specialist's Quotation Strategy*; 97 pages, Aug. 1995.
Robert Bloomfield; The Accounting Review; *The Interdependence of Reporting Discretion and Informational Efficiency in Laboratory Markets*; vol. 71, No. 4; pp. 493-511, Oct. 1996.
Christine DeMartini, et al.; *A New and Improved Design for Multi-Object Iterative Auctions*; 45 pages, Mar. 15, 1999.
Robin D. Hanson; IEEE Intelligent Systems; Trends & Controversies; *Decision Markets*; pp. 16-20, May/Jun. 1999.
In Science; *The Real Power of Artificial Markets*; pp. 987-988, Feb. 9, 2001.
Net Exchange Speaks at Eye for Energy Conference in Amsterdam; *Net Exchange provides insight into evolution of energy trading*; 2 pages, Mar. 28, 2001.
Net Exchange Architects of Markets; *Market Architecture: Improving Markets by Enhancing Choice*; 9 pages, May 2001.
Net Exchange Presents at Energy Venture Fair; *Net Exchange presents innovative solutions that address challenges faced by the energy industry*; 1 page, Jun. 26, 2001.
Net Exchange Addresses Dash Optimization User Group; *Net Exchange disuses the application of optimization software to the commerce function of deal-making*; 2 pages, Nov. 7, 2001.
News Futures Prediction Markets; *Trading uncertainty for collective wisdom*; 2 pages, Dec. 6, 2001.
Charles R. Plott, et al.; Division of the Humanities and Social Sciences California Institute of Technology; *Information Aggregation Mechanisms: Concept, Design and Implementation for a Sales Forecasting Problem*; 34 pages, Mar. 2002.
Net Exchange Deploys in the Transportation Procurement Market; *Net Exchange's advanced combined value trading framework selected for Schneider Logistics' SUMIT CVA procurement system*; 2 pages, Jul. 8, 2002.
John O. Ledyard, et al.; Interfaces; *The First Use of a Combined-Value Auction for Transportation Services*; vol. 32, No. 5; pp. 4-12, Sep./Oct. 2002.
Joyce E. Berg, et al.; Information Systems Frontiers; *Prediction Markets as Decision Support Systems*; pp. 79-93, 2003.
Hal R. Varian; The New York Times; *Can markets be used to help people make nonmarket decisions?*; 3 pages, May 8, 2003.
Charles Polk, et al.; *The Policy Analysis Market: An Electronic Commerce Application of a Combinatorial Information Market*; ACM 1-58113-679-X/03/0006, Jun. 9-12, 2003.
Net Exchange Expanding the Value of Commerce; *The Policy Analysis Market: "Market in Death" Or Your Next Decision Support Tool?*; 15 pages, Sep. 9, 2003.
Harvard Business School Working Knowledge; *You Can Bet on Idea Markets*; 4 pages, Dec. 1, 2003.
Justin Wolfers, et al.; Journal of Economic Perspectives; *Prediction Markets*; vol. 18, No. 2; pp. 107-126, 2004.
James Surowiecki; Wired; *Smarter Than the CEO*; Issue 12.06; 3 pages, Jun. 2004.
Barbara Kiviat; Time; *The End of Management?*; 5 pages, Jul. 6, 2004.
James M. Pethokoukis; Money & Business; *All seeing all knowing*; 5 pages, Aug. 22, 2004.
Emile Servan-Schreiber, et al.; Electronic Markets; *Prediction Markets: Does Money Matter?*; 11 pages, Sep. 2004.
Common Knowledge Markets; *Swing State Presidential Prediction Markets*; 2 pages, Oct. 6, 2004.
Chris Hibbert; CommerceNet Labs Technical Report 05-02; *Zocalo: An Open-Source Platform for Deploying Prediction Markets*; 21 pages, Feb. 2005.
NewsFutures Prediction Markets; *Trading uncertainty for collective wisdom*; 3 pages, Mar. 15, 2005.
Business Week; *The Power of Us, Mass Collaboration on the Internet is shaking up business*; 6 pages, Jun. 20, 2005.
Corey Hajim; Fortune; *Making a Market in (almost) anything*; pp. 103-106, Aug. 8, 2005.
Prediction Markets Blog by Consensus Point; *Popular Prediction Market Software Becomes Open Source*; 3 pages, Aug. 29, 2005.
Bill Saporito; Time; *Place Your Bets! On terrorism, on politics, on your future. Why markets will have a say in almost everything*; 1 page, Oct. 24, 2005.
Alix Nyberg Stuart; CFO.com; *Market Magic, Internal markets can solve thorny allocation problems and predict the future*; 3 pages, Nov. 1, 2005.
CBS News; *The Crowd Knows Best*; 2 pages, Jan. 8, 2006.
Prediction Markets Blog by Consensus Point; *Foresight Technologies Changes Name to 'Consensus Point'*; 3 pages, Jan. 30, 2006.
*Prediction Mrkt Conference Presentation*; 4 pages, Feb. 6, 2006.
UsableMarkets—markets, design, usability, research; *Public Prediction Markets Heuristic Review: CrowdIQ*; 9 pages, May 9, 2006.
Trendio; *The founder of Trendio blogs to keep you informed of the latest developments on Trendio, to discuss the future of the site with you and to share some personal reflections*; 2 pages, Oct. 17, 2006.
Robin Hanson, et al.; *Manipulators Increase Information Market Accuracy*; pp. 1-11, Feb. 2007.
Eric Benderoff; Chicago Tribune; *Different Kind of Futures Market*; 3 pages, Feb. 24, 2007.
Howard Wolinsky; Sun-Times News Group; *Prediction market rolls with hunches*; 1 page, May 15, 2007.
Motoko Rich; The New York Times; *Publisher to Let the Public Have a Vote on Book Projects*; 3 pages, May 21, 2007.
Peter Bossaerts, et al.; European Economic Review; *Inducing liquidity in thin financial markets through combined-value trading mechanisms*; pp. 1-25.
The Cambridge-MIT Institute; *Projects, Innovation Futures UK*; 3 pages.
Ken Miguel; ABC7/KGO-TV/DT; *Wisdom of Crowds: ABC7 Futures Market*; 2 pages.
Emile Servan-Schreiber; NewsFutures Prediction Markets; *Presidential Reality Check*; 6 pages.
Incentive Markets, Inc.; *Incentive Market Prediction Games*; 1 page.
*Common Knowledge Markets*; 7 pages.
Net Exchange Expanding The Value of Commerce; *White Papers*; 4 pages.
NewsFutures Prediction Markets; *Trading uncertainty for collective wisdom*; 4 pages.
NewsFutures; *About the Company, NewsFutures in the News*; 2 pages.
Inside-Out Markets; *Putting market forces to work inside your business*; 4 pages.

(56) References Cited

OTHER PUBLICATIONS

Notification of Transmittal of the International Search Report and the Written Opinion of the International Searching Authority, or the Declaration for International Application No. PCT/US04/11206; 9 pages; dated Jun. 5, 2007.
United States Patent and Trademark Office; Office Action for U.S. Appl. No. 10/822,484, filed Apr. 12, 2004 in the name of Joseph M. Asher; 5 pages, dated May 6, 2005.
United States Patent and Trademark Office; Office Action for U.S. Appl. No. 10/822,484, filed Apr. 12, 2004 in the name of Joseph M. Asher; 16 pages, dated Nov. 7, 2005.
United States Patent and Trademark Office; Office Action for U.S. Appl. No. 10/822,484, filed Apr. 12, 2004 in the name of Joseph M. Asher; 19 pages, dated May 31, 2006.
United States Patent and Trademark Office; Advisory Action for Application No. 10/822,484, filed Apr. 12, 2004 in the name of Joseph M. Asher; 3 pages, dated Aug. 14, 2006.
United States Patent and Trademark Office; Office Action for U.S. Appl. No. 10/822,484, filed Apr. 12, 2004 in the name of Joseph M. Asher; 8 pages, dated Dec. 1, 2006.
United States Patent and Trademark Office; Office Action for U.S. Appl. No. 10/822,484, filed Apr. 12, 2004 in the name of Joseph M. Asher; 20 pages, dated Jun. 17, 2008.
USPTO Office Action Summary for U.S. Appl. No. 10/822,484, filed Apr. 12, 2004; 15 pages, dated Jun. 5, 2007.
Notification of Transmittal of the International Search Report and the Written Opinion of the International Searching Authority for International Application No. PCT/US07/09383; 8 pages, dated Nov. 7, 2007.
Notification of Transmittal of the International Search Report and the Written Opinion of the International Searching Authority for International Application No. PCT/US07/09389; 8 pages, dated Nov. 13, 2007.
USPTO Office Action Summary for U.S. Appl. No. 10/822,484, filed Apr. 12, 2004; 25 pages, dated Nov. 20, 2007.
Schrage, Michael, (Firms Quietly Forming Own Economies, San Jose Mercury News, 2 Pages, dated Jul. 13, 2002.
Astral Media, "The Harold Greenberg Fund's Equity Investment Program", 11 pages, dated 1992.
Avary's Domain—Interviews—Miltimeter Magazine Interview, pp. 9-10, dated Mar. 3, 1994.
Lewis, Peter H., "Attention Internet Shoppers: E-Cash is Here," The New York Times, Section D, p. 4, col. 4,2 pages, dated Oct. 19, 1994.
"Digital Commerce on Increase", Publishing Technology Review, vol. 2, No. 2, ISSN: 1351-0177, 1 page, dated Jan. 1, 1995.
Hansell, Saul, "Today, Shoppers on Internet Get Access to Electronic Cash," The New York Times, Section D, p. 4, col. 5, 2 pages, dated Oct. 23, 1995.
Cones, John W., "43 Ways to Finance Your Feature Film", A Comprehensive Analysis of Film Finance, 14 pages, dated 1995.
Nash, Kim S., "Cybercash at Risk: Money Laws Lacking," Computerworld, 3 pages, dated Dec. 23, 1996.
The Rogue Market Journal, "The Power Play on Popular Culture, A Letter from the Editor", 18 pages, dated Dec. 30, 1996.
Chang, Yahlin, "The Internet: Bull Market in Movies," Newsweek, 1 page, dated Feb. 3, 1997.
Dubin, Alex, "Sunspot: Maryland's Online Community, Taking Stock at the Box Office," 5 pages, dated Aug. 19, 1997.
Engineers, Hollywood Stock Exchange, 2 pages, dated Nov. 13, 1997.
Newman, Jeffrey L., Amex.com, The Street.com, Across the Street: Buying Stock in Hollywood, 2 pages, dated Nov. 17, 1997.
Pedersen-Pietersen, Laura, "The Hollywood Stock Market: You Can't Lose," The New York Times, Section 3, p. 4, col. 1, 3 pages, dated Jan. 11, 1998.
Kelly, Brendan, Variety: Canadians turn to co-finance, pre-sales for TV prod'n. coin. Findarticles.com , 4 pages, dated Jan. 19, 1998.
Ragas, Matthew, OnlinePress.com, Insider Trading—Hollywood Style, 3 pages, dated Feb. 4, 1998.
Smith, Leo, Ventura County Business; Venture County Review; Ventura Studio Company Expands on Its Multimedia Savvy; The Los Angeles Times, 2 pages, dated Dec. 15, 1998.
Cones, John W. and Wilke, Pete, "Investor Financing of Independent Film" pp. 1-257.
Tuchlin, Harris E., "Smooth Negotiating: Making the Director Deal," International Entertainment, Multimedia & Intellectual Property Law & Business Network, 13 pages.
Feuer, Jack, "Disc Driven," Findarticles.com, 8 pages, dated Jul. 12, 1999.
Film Finances, Inc. The World Leader in Completion Guarantees, Internet print-out, 1 page, dated Nov. 23, 2005.
Findarticles.com, "MediaX and CMC International Records Team Up for Exclusive Download Campaigns with Major Artists." PR Newswire, 2 pages, dated Dec. 8, 1999.
Film Finances, Inc., Sample Completion Guaranty; internet print-out, 14 pages.
Kaufman, Debra, "Lights, Camera, Capital, Online Investing," Wired Magazine, 2 pages, dated 2001.
Martinez, Barbara, "A New Craze for March's Maddest: Online 'Trading' of NCAA Shares," The Wall Street Journal, 1 page, dated Mar. 8, 1994.
Kilmartin, Liam, et al., Development of an Interactive Voice Response System for a GSM SMS based Share Price Server, DSP UK—Sandown Exhibition Centre, pp. 89-93, dated Dec. 31, 1997.
Friel, Dermot, et al., "An Automated Stock Price Delivery System Based on the GSM Short Message Service," IEEE, pp. 1591-1595 including Figure 3, dated 1998.
Nelson, Darin, et al., (Design Issues in Multimedia Messaging for Next Generation Wireless Systems, pp. 98-103, dated 2001.
Cabral de Souza, Geraldo Marcelo, et al., Proceedings of the IASTED International Conference, Communications, Internet, & Information Technology, "A Gateway to Interconnect Corporate and Mobile Telephony Operator Networks for Two-way SMS Messages Interchange," pp. 449-453, dated Nov. 18, 2002.
Jack D. Glen, "Trading and information systems in two emerging stock market", East Asian Executive Reports, Dec. 15, 1994, vol. 16., Iss 12, pp. 1-4, dated Dec. 15, 1994.
American Film Market; Hollwoodnet.com; 1997, http://www.hollywoodnet.com/conferences/aft97.htm.
Domowitz, I. et al., "Auctions as algorithms: computerized trade execution and price discovery", Journal of Economic Dynamics and Control, (J-Econ-Dyn-Control-Netherlands), Jan. 1994, vol. 18, No. 1, pp. 29-60.
Notification of Transmittal of the International Search Report and Written Opinion of the International Searching Authority, or the Declaration for International Application No. PCT/US06/28805, dated Dec. 27, 2006, 6 pp.
Notification of the International Search Report for International Application No. PCT/US99/25793, dated Aug. 25, 2000, 2 pp.
Preliminary Examination Report for International Application No. PCT/US99/25793, dated May 17, 2001, 4 pp.
Examination Report for European Patent Application No. 99965746.3, dated Nov. 27, 2007, 7 pp.
Office Action for U.S. Appl. No. 11/279,997, dated Jan. 14, 2009, 15 pp.
Examiner Interview Summary for U.S. Appl. No. 11/279,997, dated Jun. 22, 2009, 2 pp.
Office Action for U.S. Appl. No. 09/465,607, dated Dec. 20, 2000, 5 pp.
Office Action for U.S. Appl. No. 09/465,607, dated Sep. 12, 2001, 6 pp.
Office Action for U.S. Appl. No. 09/465,607, dated Jun. 25, 2002, 6 pp.
Office Action for U.S. Appl. No. 09/465,607, dated Jan. 14, 2003, 6 pp.
Office Action for U.S. Appl. No. 09/465,607, dated Jun. 29, 2004, 6 pp.
Office Action for U.S. Appl. No. 09/465,607, dated Jan. 6, 2009, 14 pp.
Office Action for U.S. Appl. No. 10/301,527, dated Oct. 8, 2003, 6 pp.

(56) References Cited

OTHER PUBLICATIONS

Office Action for U.S. Appl. No. 10/301,527, dated Jul. 28, 2004, 6 pp.
Office Action for U.S. Appl. No. 10/301,527, dated Nov. 23, 2004, 5 pp.
Notice of Allowance for U.S. Appl. No. 10/301,527, dated Apr. 25, 2005, 10 pp.
Office Action for U.S. Appl. No. 10/655,409, dated Jan. 27, 2005, 14 pp.
Office Action for U.S. Appl. No. 10/655,409, dated Aug. 11, 2005, 10 pp.
Office Action for U.S. Appl. No. 10/655,409, dated Feb. 15, 2006, 17 pp.
Office Action for U.S. Appl. No. 10/655,409, dated Sep. 7, 2006, 16 pp.
Office Action for U.S. Appl. No. 10/655,409, dated Sep. 14, 2007, 22 pp.
Office Action for U.S. Appl. No. 10/655,409, dated Jan. 28, 2009, 22 pp.
Office Action for U.S. Appl. No. 11/351,614, dated Sep. 19, 2007, 11 pp.
Office Action for U.S. Appl. No. 11/351,614, dated Oct. 2, 2008, 15 pp.
Office Action for U.S. Appl. No. 09/382,907, dated Sep. 12, 2000, 11 pp.
Office Action for U.S. Appl. No. 09/382,907, dated May 29, 2001, 9 pp.
Office Action for U.S. Appl. No. 09/382,907, dated May 9, 2002, 9 pp.
Office Action for U.S. U.S. Appl. No. 09/382,907, dated Apr. 30, 2003, 8 pp.
Notice of Allowance for U.S. Appl. No. 09/382,907, dated Nov. 25, 2008, 13 pp.
Office Action for U.S. Appl. No. 11/189,262, dated Jan. 11, 2008, 23 pp.
Office Action for U.S. Appl. No. 11/189,262, dated Sep. 30, 2008, 15 pp.
Internet Printout: "What is UMOO", UMOO Financial Entertainment, http://www.umoo.com/about_umoo.aspx, downloaded July 9, 2009, 3 pp.
Internet Printout: "Who We Are", Wall Street Survivor, http://www.wallstreetsurvivor.com/Public/Content/About.aspx, downloaded Jul. 9, 2009, 2 pp.
Klapwald, Thea, "Prod'n co. born from Net game", Special Issue: The Independents; Daily Variety, Jul. 24, 1997, 2pp.
Australian Examiner's Report for Australian Application No. 2006272654, dated Jun. 24, 2009 (3 pages).
"NTRA All-Star Jockey Championship Special Wagers," dated unknown (3 pages).
"Wagering Information; Straight or Basic Wagers," Lone Star Park at Grand Prairie: Player's Guide, http://www.lonestarpark.comlbet_info.asp, printed May 8, 2007 (3 pages).
"Wagering Information; Straight or Basic Wagers," NTRA.com, http://www.ntra.com/news.asp?type=playthehorses&id=4799, printed May 8, 2007 (3 pages).
"Glossary of Terms," NTRA.com, http://www.ntra.com/news.asp?type=playthehorses&id=4797, printed May 8, 2007 (3 pages).
U.S. Appl. No. 10/667,755, filed Sep. 22, 2003, Amaitis, et al.
"The Basics of Horseplay," NTRA.com, http://www.ntra.com/news.asp?type=playthehorses&id=4795, printed May 8, 2007 (2 pages).
"Bet With the People Who Know Racing," Racing Daily Forum, Jul. 24, 2001 (15 pages).
"Quote of the Day; Bet of the Day," London Times, Jul. 30, 2003 (1 page).
The Patent Office Search Report from International Application No. GB 0320232.2, dated Dec. 17, 2003 (6 pages).
Scarne "Scarne's New Complete Guide to Gambling," Simon and Schuster, pp. 46-48 plus title and Copyright pages, dated 1961 (2 pages).
U.S. Appl. No. 10/667,923, filed Sep. 22, 2003, Amaitis, et al.

U.S. Appl. No. 12/614,610, filed Nov. 9, 2009, Asher et al.
PCT Search Report for PCT/US04/09797, dated May 13, 2005 (9 pages).
Scarne "Scarne's New Complete Guide to Gambling", Simon and Schuster, pp. 132-133, 1974.
Daley, Ken. "Handicapping the Race; Bet on McGwire surging past Maris, Sosa fading at the wire" <URL: http://nl.newsbank.com/nlsearch/we/Archives?p_product=DM&p_theme=dm&p_action=search&p_maxdocs= 200&p_topdoc=1&p_text_direct-0=OED3DAE8C5FC5A3A&p_field_direct-O=documenUd&p_perpage=1O&p_sort=YMD_date: D&s_trackval=GooglePM>, dated Aug. 27, 1998.
The New York Times, Plus: Auto Racing; Winston Cup purse Increased by Nascar, accessed at: http://query.nytimes.com/gst/fullpage.html?res=9F03EOD81139F93AA15752COA9659C8B, published Jan. 29, 2003; (1 page).
The New York Times, Horse Racing; Purse may Rise for Super Derby, accessed at: http://query.nytimes.com/gst/fullpage.htmi?res=950DE7D81F31F936A15755COA96F948260, published Jun. 25, 1989 (1 page).
PCT Search Report for PCT/US04/10069, dated Jun. 17, 2005 (9 pages).
Google, Definition of "purse" accessed at: http://www.google.com/search?hl=en&rls=GGLD,GGLD:2004-30,GGLD:en&defl=en&q= . . . , on May 9, 2008; (2 pages).
rec.gambling.sports faq, Frequently Asked Questions about Sports Betting, Last Modified Feb. 15, 1996, pp. 1-8.
Parimutuel Betting; Wikipedia reference; http://en.wikipedia.org/wiki/Parimutuel_betting; last modified Jan. 26, 2008 (7 pages).
PCT Notification of Transmittal of the International Search Report and the Written Opinion of the International Searching Authority for International Application No. PCT/US04/09796; dated Jul. 21, 2008 (7 pages).
International Search Report for International Application No. PCT/US04/09798; dated Sep. 8, 2005 (1 page).
Jon Kiele; "Caveat Emptor: Understanding the Dynamics of the Futures Market"; Electrical World, vol. 210, No. 9, Sep. 1996; pp. 1-5.
"Atlantic International Entertainment, Ltd. (AIEE) Announces Third License Agreement for Internet Casino Extension (ICE) Product with Imperiamedia, Ltd."; PR Newswire; Friday, Jun. 18, 1999; pp. 1 and 2.
International Preliminary Report on Patentability for International Application No. PCT/US06/28805, dated Jan. 29, 2008 (4 pages).
USPTO Office Action for U.S. Appl. No. 11/351,614; dated Sep. 18, 2009 (12 pages).
USPTO Office Action for U.S. Appl. No. 11/189,262; dated Aug. 21, 2009 (19 pages).
USPTO Office Action for U.S. Appl. No. 10/667,755; dated Jan. 12, 2009 (19 pages).
USPTO Office Action for U.S. Appl. No. 10/667,755; dated May 14, 2008 (19 pages).
USPTO Office Action for U.S. Appl. No. 10/667,923; dated Aug. 2, 2005 (12 pages).
USPTO Office Action for U.S. Appl. No. 10/667,923; dated Dec. 1, 2006 (17 pages).
USPTO Advisory Action for U.S. Appl. No. 10/667,923; dated Feb. 28, 2007 (3 pages).
USPTO Office Action for U.S. Appl. No. 10/667,923; dated Aug. 31, 2007 (9 pages).
USPTO Office Action for U.S. Appl. No. 10/667,923; dated Jan. 28, 2008 (10 pages).
USPTO Advisory Action for U.S. Appl. No. 10/667,923; dated Apr. 16, 2008 (3 pages).
USPTO Office Action for U.S. Appl. No. 10/667,923; dated May 15, 2008 (11 pages).
USPTO Office Action for U.S. Appl. No. 10/667,923; dated Nov. 4, 2008 (13 pages).
USPTO Examiner Interview Summary Record for U.S. Appl. No. 10/667,923; dated Sep. 15, 2009 (4 pages).
USPTO Examiner Interview Summary Record for U.S. Appl. No. 10/667,755; dated Jul. 20, 2009 (4 pages).

(56) References Cited

OTHER PUBLICATIONS

Examiner Interview Summary for U.S. Appl. No. 10/822,484, dated Mar. 22, 2007, 3 pp.
USPTO Notice of Allowance and Examiner Interview Summary Record for U.S. Appl. No. 10/822,484; dated Oct. 1, 2009 (19 pages).
Examiner Interview Summary for U.S. Appl. No. 09/465,607, dated May 24, 2001 (2 pp.).
Advisory Action for U.S. Appl. No. 09/382,907, dated Sep. 3, 2003 (3 pp.).
USPTO Office Action for U.S. Appl. No. 08/620,906; dated May 15, 1998 (14 pp.).
USPTO Office Action for U.S. Appl. No. 08/620,906; dated Dec. 1, 1998 (9 pp.).
USPTO Office Action for U.S. Appl. No. 08/620,906; dated Jun. 7, 1999 (4 pp.).
USPTO Office Action for U.S. Appl. No. 09/184,571; dated Jun. 23, 2000 (13 pp.).
USPTO Office Action for U.S. Appl. No. 09/184,571; dated Jan. 23, 2001 (6 pp.).
USPTO Office Action for U.S. Appl. No. 09/184,571; dated Apr. 25, 2001 (5 pp.).
USPTO Notice of Allowance for U.S. Appl. No. 09/184,571; dated Nov. 4, 2002 (4 pp.).
U.S. Appl. No. 60/462,176, filed Apr. 11, 2003, in the name of Howard W. Lutnick et al (3 pp.).
USPTO Office Action for U.S. Appl. No. 11/279,997, dated Nov. 10, 2009 (25 pages).
Examiner Interview Summary for U.S. Appl. No. 11/279,997, dated Jul. 9, 2009, 2 pp.
USPTO Office Action for U.S. Appl. No. 10/655,409, dated May 26, 2010 (13 pages).
USPTO Office Action for U.S. Appl. No. 11/189,262, dated Apr. 1, 2010 (19 pages).
Office Action for U.S. Appl. No. 10/914,528; 7 pages; dated Jan. 23, 2010.
International Preliminary Report on Patentability for International Application No. PCT/US07/09389, dated Oct. 22, 2008 (5 pages).
International Preliminary Report on Patentability for International Application No. PCT/US07/09383, dated Oct. 22, 2008 (6 pages).
International Preliminary Report on Patentability for International Application No. PCT/USO4/09798, dated Oct. 1, 2005 (4 pages).
International Preliminary Report on Patentability for International Application No. PCT/USO4/09796, dated Apr. 28, 2009 (4 pages).
USPTO Office Action for U.S. Appl. No. 09/660,296, dated Aug. 27, 2003 (10 pages).
USPTO Office Action for U.S. Appl. No. 09/660,296, dated May 18, 2004 (14 pages).
USPTO Advisory Action for U.S. Appl. No. 09/660,296, dated Oct. 6, 2004 (3 pages).
USPTO Office Action for U.S. Appl. No. 09/660,296, dated Dec. 30, 2004 (31 pages).
USPTO Office Action for U.S. Appl. No. 09/660,296, dated Jun. 28, 2005 (25 pages).
USPTO Office Action for U.S. Appl. No. 09/660,296, dated Jan. 30, 2006 (16 pages).
"A New Craze for March's Maddest: Online 'Trading' of NCAA Shares", Barbara Martinez, The New York Times Company: Abstracts, Mar. 8, 1994 (1 page).
Film Finances, Inc. The World Leader in Completion Guarantees. Oct. 1999 Internet print-out (1 page).
Mukta Arts Limited; the Internet print-out; 1999 (20 pages).
"Film Venture; Funding the Next Generation of Filmmakers," Film Investors Group, (5 pgs) undated.
Lee, "Sport Marketing Strategies Through the Analysis of Sport Consumer Behavior and Factors 2000 Influencing Attendance," UMI Dissertation Services, (139 pgs) 2000.
Eng, "Producing New Opportunities," Presstime, (2 pgs) Feb. 2005.
Notification of Transmittal of the International Search Report and Written Opinion of the International Searching Authority, or the Declaration for International Application No. PCT/US2005/01276 (9 pgs), dated Dec. 18, 2006.
Notification of Transmittal of the International Search Report and Written Opinion of the International Searching Authority, or the Declaration for International Application No. PCT/US2006/19316 (6 pgs), dated Jan. 8, 2007.
Goliath Business Knowledge on Demand; Innkeepers USA Trust Announces 2001 Dividend Allocation; (1 pg) Jan. 24, 2002.
USPTO Office Action for U.S. Appl. No. 10/914,706, dated Feb. 21, 2008 (19 pgs).
USPTO Office Action for U.S. Appl. No. 10/914,467, dated Mar. 19, 2008 (25 pgs).
USPTO Office Action for U.S. Appl. No. 11/133,972, dated Mar. 31, 2008 (18 pgs).
USPTO Office Action for U.S. Appl. No. 10/914,528, dated Feb. 20, 2008 (13 pgs).
USPTO Office Action for U.S. Appl. No. 10/914,528, dated Apr. 20, 2009 (11 pgs).
USPTO Office Action for U.S. Appl. No. 10/914,467, dated Dec. 15, 2008 (14 pgs).
USPTO Office Action for U.S. Appl. No. 11/133,972, dated Dec. 23, 2008 (20 pgs).
US PTO Office Action for U.S. Appl. No. 12/408,370; 11 pages; dated Aug. 6, 2009.
Notice of Allowance for U.S. Appl. No. 10/914,528; 38 pages; dated Dec. 11, 2009.
Gaylord Entertainment, Warner Brothers pictures enters in to Co-Financing/production Pact, Sep. 14, 2000; Business Wire; Gaylord.
CINE-TEC Motion Picture Funding and Marketing Consultants, http://cine-tec.com/whatwedo.htm,2000 (CINE-TEC).
Notice of Allowance for U.S. Appl. No. 10/914,467; 38 pages; dated Jan. 28, 2010.
Notice of Allowance for U.S. Appl. No. 11/133,972; 22 pages; dated Nov. 25, 2009.
Michael C. McCabe; You have now entered the Bowie Bond Era; 1997 p. 8-16; www.freddiemac.com/finance/smm/july97/pdfs/mccabe.pdf (McCabe).
USPTO Office Action for U.S. Appl. No. 10/914,706, dated Feb. 21, 2008 (12 pages).
USPTO Office Action for U.S. Appl. No. 10/914,706, dated Nov. 4, 2008 (8 pages).
USPTO Notice of Allowance and Fees Due for U.S. Appl. No. 10/914,706, dated Mar. 5, 2009 (7 pages).
USPTO Notice of Allowance and Fees Due for U.S. Appl. No. 10/914,706, dated Apr. 16, 2009 (2 pages).
USPTO Notice of Allowance and Fees Due for U.S. Appl. No. 10/914,706, dated May 12, 2009 (3 pages).
USPTO Notice of Allowance and Fees Due for U.S. Appl. No. 10/914,706, dated Jun. 11, 2009 (2 pages).
USPTO Notice of Allowance and Fees Due for U.S. Appl. No. 10/914,706, dated Jul. 2, 2009 (2 pages).
Canadian Exam Report for Application No. 2533524, dated Jun. 7, 2010 (4 pages).
USPTO Notice of Allowance and Fees Due for U.S. Appl. No. 12/408,370, dated Mar. 30, 2010 (7 pages).
C. Edward Fee, The Costs of Outside Equity Control; Evidence from Motion Picture Financing Decisions, The Journal of Business, vol. 75, No. 4 (Oct. 2002), pp. 681-711 (Costs).
EP Examination and Search Report for Application No. 05705731.7 dated Dec. 18, 2008; 4 pages.
AU Examiners Report for Application No. 2005208563 dated Nov. 25, 2009; 3 pages.
AU Notice of Acceptance for Application No. 2005208563 dated Feb. 7, 2010; 3 pages.
Notice of Allowance for U.S. Appl. No. 10/914,467, dated Feb. 26, 2010 (3 pgs).
Advisory Action for U.S. Appl. No. 10/914,467, dated Mar. 3, 2009 (2 pgs).
Notice of Allowance for U.S. Appl. No. 11/133,972; 2 pages; dated Mar. 1, 2010.
U.S. Appl. No. 09/660,926, filed Sep. 13, 2000; 38 pages.

(56) References Cited

OTHER PUBLICATIONS

U.S. Appl. No. 10/914,528, filed Aug. 9, 2004; 35 pages.
U.S. Appl. No. 10/914,706, filed Aug. 9, 2004; 33 pages.
U.S. Appl. No. 12/408,370, filed Mar. 20, 2009; 33 pages.
U.S. Appl. No. 12/823,337, filed Jun. 25, 2010; 33 pages.
U.S. Appl. No. 10/914,467, filed Aug. 9, 2004; 31 pages.
U.S. Appl. No. 11/133,972, filed May 20, 2005; 36 pages.
Pre-Brief Appeal Conference Decision for U.S. Appl. No. 11/133,972; 2 pages; Apr. 30, 2009.
U.S. Appl. No. 12/709,067, filed Feb. 19, 2010; 27 pages.
U.S. Appl. No. 12/709,047, filed Feb. 19, 2010; 44 pages.
U.S. Appl. No. 12/705,059, filed Feb. 12, 2010; 29 pages.
U.S. Appl. No. 09/465,607, filed Dec. 17, 1999; 22 pages.
U.S. Appl. No. 10/655,409, filed Sep. 4, 2003; 20 pages.
U.S. Appl. No. 11/351,614, filed Feb. 9, 2006; 30 pages.
U.S. Appl. No. 11/189,262, filed Jul. 25, 2005; 73 pages.
Pre-Brief Appeal Conference Decision for U.S. Appl. No. 10/914,467, May 29, 2009 (2 pgs).
USPTO Pre-Brief Appeal Conference Decision for U.S. Appl. No. 11/279,997, Jun. 3, 2010 (2 pages).
U.S. Appl. No. 08/620,906, filed Mar. 25, 1996; 31 pages.
U.S. Appl. No. 09/184,571, filed Nov. 2, 1998; 44 pages.
U.S. Appl. No. 10/301,527, filed Nov. 21, 2002; 44 pages.
U.S. Appl. No. 09/382,907, filed Aug. 25, 1999; 26 pages.
U.S. Appl. No. 10/822,484, filed Apr. 12, 2004; 26 pages.
Advisory Action for U.S. Appl. No. 10/655,409, dated Nov. 17, 2005, 3 pp.
Pre-Brief Appeal Conference decision for U.S. Appl. No. 11/351,614; Jul. 7, 2009 (3 pages).
Examiner's Answer to Appeal Brief for U.S. Appl. No. 09/382,907, Jul. 2, 2004, 17 pp.
Notice of Allowance for U.S. Appl. No. 10/914,528; 3 pages; dated Mar. 1, 2010.
Pre-Brief Conference Decision for U.S. Appl. No. 11/189,262, Feb. 26, 2010, 2 pp.
Office Action for U.S. Appl. No. 10/822,484, dated Dec. 13, 2004, 5 pp.
Pre-Brief Appeal Conference Decision for U.S. Appl. No. 10/822,484, mailed Jan. 16, 2009, 2 pp.
Notice of Allowance for U.S. Appl. No. 10/822,484, dated Oct. 1, 2009, 18 pp.
Examiner Interview Summary Record for U.S. Appl. No. 12/614,610 dated Aug. 17, 2010; 3 Pages.
Office Action for U.S. Appl. No. 10/914,467, dated Feb. 1, 2008 (6 pgs).
USPTO Examiner Interview Summary Record for U.S. Appl. No. 10/667,755; dated Nov. 9, 2009 (3 pages).
Heritage S, Dancing on Ice Betting Odds—Starts Tomorrow, Who'll Win? Jan. 13, 2006; retrieved from http://www/hecklersspray.com/dancing-on-ice-betting-odds-starts-tomorrow-wholl-win/20061981.php on Nov. 16, 2010.
Ramanathan, "Determinants of Value in Pharmaceutical Innovation: A Property Rights Approach", University of Illinois at Urbana-Champaign, 1999, vol. 6009A of Dissertations Abstracts International, p. 3437, 139 pages.
New-York State Canals.: Their Finances, Report of the Canal Auditor. New York Daily Times (1851-1857); Jan. 9, 1855; ProQuest Historical Newspapers; The New York Times (1851-2009).
Test of the New War Revenue Bill as Agreed Upon by the Conferees: . . . New York Times (1857-1922); Feb. 7, 1919; ProQuest Historical Newspapers: The New York Times (1851-2009) p. 8.
Definition of dividend from www.wikipedia.org, revision as of Aug. 13, 2010 (obtained Dec. 21, 2010 at: http://en.wikipedia.org/w/index.php?title=Dividend&oldld=378636953) (7 pages).
ISDA Home—http://www.isda.org/educat/faqs/html (ISDA).
Investopedia, http://www.investopedia.com/articles/optioninvestor/07/swaps.aso (Swaps).
Leslie Eaton, You Too Can Be Rated AAA, N.Y. Times, Jun. 7, 1998.
Leslie M. Fairfax, When You Wish Upon A Star: Explaining the Cautious Growth of Royalty Backed Securitization, Columbia Business Law Review, 1999.
Thomas S. Gruca, et al., The Effect of Electronic Markets on Forecasts of New Product Success, Information Systems Frontiers 5:1, 95-105, 2003 (Kluwer Academic Publishers 2003).
Newswire; "Funbets.com Jumps into 2nd Place among Fantasy Sports Web Sites."; Dec. 15, 2000; pp. 1 and 2.
"F1 Championship Scoring". From Wikipedia, The Free Encyclopedia. [online], [retrieved Mar. 2, 2011]. Retrieved from the internet <URL:http://en.wikipedia.org/wiki/List_of_formula_one_world_championship_points_scoring_systems >. 4 pages.
Michael Markowitz, The Record (Bergen County,NJ) Hubco Seeks Loyalty with Discount Shaes, Mar. 25, 1999 (Hubco).
The Washington Post, Mexico to Sell Off Part of Oil Monopoly; [Capital Edition] Tod Robberson. The Washington Post (pre-1997 Fulltext). Washington D.C.; Jan. 3, 1995. p. a.01.
"Wolfram Range". From Wolfram MathWorld [online] [retrieved on Jun. 11, 2013]. Retrieved from the Internet <URL:http://mathworld.wolfram.com/Range.html>, 1 page.
"Wolfram Set". From Wolfram MathWorld [online] [retrieved on Jun. 11, 2013]. Retrieved from the Internet <URL:http://mathworld.wolfram.com/Set.html>, 1 page.
Thompson, Jr., Arthur A.: Strategies for Staying Cost Competitive, Jan. 1984, Harvard Business Review, pp. 1-19. (Year: 1984).
Pennings et al.: The price path due to order imbalances: evidence from the Amesterdam Agricultural Futures Exchange, 1998, European Financial Management, vol. 4, No. 1, pp. 47-64. (Year: 1998).

\* cited by examiner

ADMINISTRATION MODULE

GLOBAL EXCHANGE VARIABLES

**\*\*\*VIRTUAL SPECIALIST VOLATILITY ADJUSTERS**

StockPosPriceThresh:
StockNegPriceThresh:
BondPosPriceThresh:
BondNegPriceThresh:
StockPriceIncr:
BondPriceIncr:

StockBrakeThresh:
BondBrakeThresh:
StockBrakeIncr:
BondBrakeIncr:
StockTradeHaltThresh:
BondTradeHaltThresh:

**\*\*\*GHOST TRADING PARAMETERS**

GhostBuyProb:
GhostNumOrders:
GhostStockBuyQty:
GhostStockSellQty:
GhostBondBuyQty:
GhostBondSellQty:

GENERAL TRADING PARAMETERS (NOT SPECIFIC TO VIRTUAL SPECIALIST)

StockTradeMod:
BondTradeMod:
StockAmtOutstanding:
BondAmtOutstanding:
MaxSecOwnPercent:
StockTradeMin:
BondTradeMin:
StockTradeMax:
BondTradeMax:

SyndicateMaxStockThresh:
SyndicateMinStockThresh:
SyndicateMinBondThresh:
SyndicateMaxBondThresh:

ECONOMY WIDE PARAMETERS

DiscountRate:

MoneyMarketRate:
CommissionPercent:

GAME ENGINE CONTROL

OrderExecInter:
TradingDayInter:
CommissionExecInter:
SessionLengthInter:
InitialCashBalance:
NumStandingsDisplay:

SYSTEM AND METHOD FOR TRADING BASED ON TOURNAMENT-STYLE EVENTS

TECHNICAL FIELD OF THE INVENTION

This invention relates in general to computer-implemented financial systems, and in particular to an improved automated securities trading system.

BACKGROUND OF THE INVENTION

Computer-implemented securities trading systems are well known in the art. One such system is that disclosed in U.S. Pat. No. 4,674,044, issued to Kalmus et al., entitled "Automated Securities Trading System", and incorporated by reference herein. These computer-implemented securities trading systems obtain bid and asked trades based on the bid and asked prices. However, there is generally still a human component to such systems.

For example, most financial markets also employ one or more market makers called "specialists." These specialists fill customer orders from the specialist's inventory position if there are no matches for the customer orders in the open market. In the prior art, the specialist function is not automated, but is performed by a firm or individual. Thus there is a need in the art for an improved computer-implemented trading system that includes an automated specialist function to create a market for the securities traded and to lessen the volatility of smaller securities markets.

SUMMARY OF THE INVENTION

Accordingly, it is an object of this invention to solve the problems with existing systems described above.

Another object of the present invention is to lessen the price volatility of derivative financial instruments traded in narrower markets.

Another object of the present invention is to provide an on-line virtual trading system.

Another object of the present invention is to provide a virtual specialist program that engages in trading in the market to offset the price volatility and to provide liquidity to the market.

Another object of the present invention is to provide a security instrument pricing system which depends from buy-sell trade imbalances.

Another object of the present invention is to provide a security instrument price control system which controls volatility of a security.

Another object of the present invention is to provide a security instrument trade halting system to prevent extreme price volatility for a security instrument.

Another object of the present invention is to provide a ghost trader for a security in order to generate trading activity so that adjusted market control factors take effect.

Another object of the present invention is to provide a virtual reserve bank program to control money market interest rates and global volatility for the virtual market.

Another object of the present invention is to provide an on-line market research tool which researchers can access to obtain statistical information based on trading behavior.

To overcome the limitations in the prior art, and to overcome other limitations that will become apparent upon reading and understanding the present specification, the present invention discloses a system for trading a plurality of derivative financial instruments. The system comprises a processor operable to receive a first order to buy a derivative financial instrument that represents a contestant in a contest. The processor is further operable to receive a second order to sell the derivative financial instrument. The processor is further operable to determine a market price based at least in part on the first order and the second order. The processor is further operable to execute a trade at the determined market price. The system further comprises a memory operable to store the first order and/or the second order.

In one embodiment, a database of securities is provided for trading in an open, computerized, exchange. In one embodiment, securities are listed which relate to movies, actors, products or service companies. In another embodiment, securities are listed which relate to contestants in contests such as, for example, tournaments, playoffs, game shows, reality-based television shows, award shows, sporting events, and/or any suitable competition.

Users may access the system over a network, using a standard interface. An exemplary system comprises a Web server with an SQL compliant back-end database, with a standardized Web browser interface. Using the Web browser, the user may register for the on-line trading system over a network, providing demographic information, such as age, sex, location, occupation, income, hobby interest, and the like. Once registered, the user is given the option of choosing a unique userID which will be used for logging in after registration. In providing the demographic information, the user also provides an e-mail address to which a randomly assigned password and other instructional information can be forwarded.

Once the user has received a password, the user may freely log in and out of the system over the Web by selecting a start button present on a Web home page for the system. However, while the password is being forwarded to the new user, the new user is given temporary access to the system so that trading can begin instantaneously.

Automatically, the user is provided with a fixed quantity of virtual currency in virtual dollars (V$) from a reserve bank program, described below, to begin trading with. This quantity can either be considered a loan from the reserve bank program, for which interest is charged, or a gift.

After logging in, the user's portfolio summary page is displayed which displays the user's current cash balance, amount held in stocks, bonds, and other types of securities. When the new user logs in, the cash value of the user's portfolio is represented solely in cash, or in a money market account. The cash in the user's portfolio accrues at an interest rate set by a virtual reserve bank program.

The user may trade security instruments by typing in the symbol for the instrument for which a purchase is desired in a buy-sell area of the page. A quantity is also specified in the buy sell area. If the user does not know the symbol for a particular instrument, a lookup or search function is provided in another area of the screen using standard graphical user interface (GUI) features such as drop-down list boxes, text search boxes, or slider bar lists. Alternatively, a ticker tape style updating menu at the bottom of the screen displays available instruments with the corresponding instrument prices.

Once the user has successfully entered the symbol for an available instrument, a buy button may be pressed in the buy-sell area of the page. If the user has enough cash on account, and if the instrument is available for trading, then a confirmation screen appears before execution of the transaction. Upon confirmation, the trade is executed, and the cash is debited from the user's account.

If the user wishes to sell a security instrument, the same procedure is followed, except, a sell button is clicked on in the buy-sell area of the Web page. After confirmation, the market price for the shares sold is added to the user's account, and the shares are made available in the system for fulfilling purchase orders.

The system includes a virtual specialist program which, among other things, handles fulfillment of buy and sell orders. In the embodiment of the present system, the virtual specialist program controls the economy, and provides it with liquidity. In one embodiment, the virtual specialist program provides instantaneous liquidity by fulfilling all orders, whether or not there are equal and matching sell orders to offset buy orders, and vice versa. The system keeps a running net movement balance for the quantity of buy or sell trades which the virtual specialist program had to fulfill without offsetting sell or buy trades. The imbalance is stored as a positive number if the buy-sell imbalance represents more buy trade orders executed than sell orders, or a negative number if the buy-sell imbalance represents more sell orders executed than buy orders.

Unlike the case with non-virtual markets, the virtual specialist program of the embodiment does not control the economy by setting prices of shares based on last executed buy order price offered. Rather, the virtual specialist program determines the price of an instrument after each trade by computing and effecting an outstanding buy-sell imbalance.

The buy-sell imbalance, also referred to herein as the net movement balance (NMB), controls security prices by incrementing or decrementing security prices using a combination of a security price increment (SPI) constant, and a pair of security price threshold constants. Both a positive security price threshold (PSPT) constant, and a negative security price threshold (NSPT) constant is set in a security constant table 2002 for each security in the system. A net trade movement (NTM) variable for a trade order is set to the positive quantity of shares in the trade order if the trade order is a buy, and to the negative quantity of shares in the trade order if the trade order is a sell. A new NMB is calculated by adding the NMB before the trade, retrieved from a net price movement table 2008 (NMB (old)), to the NTM.

A security price increment (SPI) constant for the security which is the subject of the trade order is retrieved from the security constant table 2002. The NMB is then compared to the PSPT. If the NMB is greater than the PSPT, then the price for the security (SP) is calculated by adding the SPI to the SP before the trade which was retrieved from a security price table 2006. The NMB is then reduced by the PSPT and stored back to the net price movement table.

Conversely, if the NMB is less-than the NSPT (a negative value) then the SP (new) is calculated by subtracting the SPI from the SP (old). The NMB is then incremented by the NSPT.

After the above calculations are made, the SP is stored in a security price table 2006, which keeps track of all security prices. The NMB is updated in the net movement balance database. Each record of the net movement balance database further contains an increment tracking field for keeping track of the number of consecutive increments for the security instrument, up or down. Also, a price history tracking table 2010 is updated after each trade, performing a write SQL statement which adds a record comprising the SP, NMB, userID, and other information relating to the trade. This information is used by a marketing tool, explained below, which provides statistical information to market researchers.

Periodically, due to natural popularity of a particular security, or by market manipulation by an individual or groups of traders, the security will realize wild fluctuations in price. This is especially true in a market in which virtual currency is used in a virtual market. Given the special circumstances of the virtual market, the system provides an artificial price control, or braking, mechanism.

The braking mechanism of the present invention monitors each price increment the virtual specialist performs. When a price moves up or down on a security instrument, the increment tracking field of the net movement balance table 2012 is retrieved for the security. A security brake threshold (SBT) constant, and a security brake increment (SBI) constant is retrieved from the security constant table 2002. If the total consecutive number of price increments (TCPI) is greater than the SBT, then the PSPT is increased by the security brake increment, and then stored back to the security constant table 2002. If the total consecutive number of price decrements (a negative value) is less than the SBT, the NSPT is decreased by the security brake increment, and then stored back to the security constant table 2002. In this way, for securities which have experienced price movement greater than the set thresholds, the price movement will be slowed.

Still, the braking mechanism may not be effective enough in either an extreme-bear-or bull market for the security, or the market as a whole. In those instances, a halting mechanism is provided by the system. The halting mechanism acts much in the same way as the braking mechanism. The exception is that a security halt threshold (SHT) constant is compared to the TCPI/TCPD field. If the absolute value of the TCPI/TCPD field value exceeds the SBT, trading is halted for that particular security. A notice appears on screen for a trader who tries to trade the security, informing the user that trading has been halted by the system. Trading for the security may be resumed after an administratively set period of time, or manually through an administration module.

The virtual economy may have a finite amount of capital with which to close arbitrage situations that might arise if the policy of the exchange is different than what is reflected by the prices on the market. The virtual economy is unlike so non-virtual economies, which may have an infinite amount of capital. A system administrator is provided a separate control screen where changes to global constants, such as the PSPT, NSPT, SBT, SBI, etc., can be adjusted to affect the market. In effect, the password protected control screen serves as a volatility control module. The volatility control, or ghost trade, module is used to implement and enhance monetary regulations, and the market as a whole. The desired effect is implemented by causing the system to issue buy and sell programs which comprise coordinated, across the board, buying and selling timer intervals. A timer periodically queries the ghost trading table 2014. Each security instrument record in the ghost trading table 2014 is set to cause a trade for an administratively set number of times per trading day. If the timer detects that the time interval between trades for a security has ended, the ghost trading mechanism retrieves a ghost buy probability (GBT) from the ghost trade table 2014. A random trade constant (RTC) is generated by the system. Next, a ghost security buy/sell quantity (GBQ) is retrieved from the ghost trade table 2014. If the GBT is greater than or equal to the RTC, a buy order is placed by the system for the number of shares specified by the GBQ. Otherwise, a sell order is placed for the number of shares specified by the GBQ.

The system of the present invention includes a virtual reserve bank program. The reserve bank program regulates the economy with monetary tools which are provided within the reserve bank program module. With these tools, certain system global constants, such as total money supply and interest rates can be adjusted.

In the case of interest rates, adjustable global constants are built into the administration table 2016 for the virtual trading system. By raising or lowering rates, the amount of interest paid on the virtual dollars not tied up in securities is adjusted for the users. In this way, the unused money in users' accounts act as a money market accounts for which interest is adjusted accordingly.

Alternatively, a virtual reserve bank program chairman can determine interest rate and security threshold constants by using global interest threshold constants (GITCs) which monitor inflationary and deflationary pressures in the system. Inflationary and deflationary pressure may be defined as the size of the system economy, i.e., number of shares of securities which obtain a certain defined price. For example, the total outstanding shares may have a combined par value of VS8 billion, and the total market price for the shares outstanding may be V$80 billion with about V$5 billion average daily trading volume. The virtual specialist program, for the majority of securities in the system, may have set price movement thresholds to 10,000 positive and 10,000 negative. The money market rate may be set to 70% under these market conditions by the reserve bank program. However, if prices on the exchange were to inflate to a value of V$200 billion, for example, price movement thresholds might be reset to 20,000 and 20,000 positive and negative respectively, and the money market interest rate reset to 15%.

Considering the vast cross-section of on-line users, comprising different interests, artistic tastes and economic buying powers, the system of the present invention further provides extremely useful information for entities such as market research firms, advertising agencies, investors, movie and television studios, phonorecord companies, radio stations and movie rental companies. Accordingly, for select market research users, an on-line market research tool is provided which allows the market research users to access statistical information about trader demographics, interests, beliefs, and/or tastes.

BRIEF DESCRIPTION OF THE DRAWINGS

For a more complete understanding of the present invention and for further features and advantages, reference is now made to the following description taken in conjunction with the accompanying drawings in which:

FIG. 18 shows an administration module which is used to adjust constants and variables in the system.

DETAILED DESCRIPTION OF THE DRAWINGS

Overview of Virtual Trading System

Figure 1:
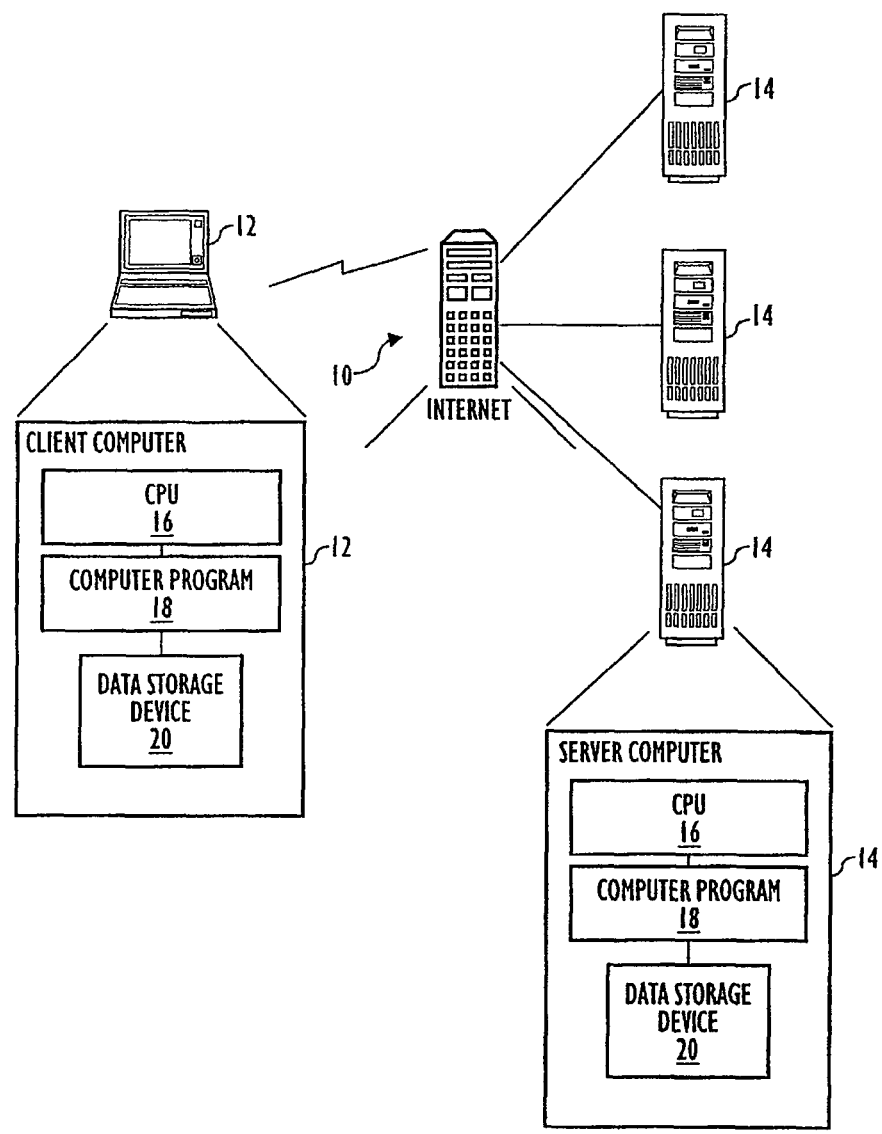
FIG. 1 is a block diagram of an exemplary hardware environment of the present invention.

The present invention comprises a computer-implemented trading system for derivative financial instruments ("derivatives"). The present invention accepts buy and sell orders from traders for the derivative financial instruments, sets a market price based on the supply and demand, and participates in the market as a trader in order to minimize price volatility. In some embodiments, the present invention is a computer-implemented exchange for derivative financial instruments representing movies, talent, CDs, and television programs. In other embodiments, the present invention is a computer implemented exchange for derivative financial instruments representing contestants in tournaments, playoffs, game shows, reality-based television shows, award shows, sporting events, any/or any suitable contest.

The computer-implemented exchange ("the exchange") may be implemented as a simulation (i.e., game) or as an actual trading system for the derivative financial instruments described above. The derivative financial instruments may be purchased with dollars, with virtual currency that is controlled by a virtual reserve bank program, or with any suitable real or artificial currency.

The derivative financial instruments are identified by a Current Trading List displayed for the traders. In some embodiments, the Current Trading List comprises a list of movies in various stages of production, talent, and other entertainment-oriented assets. In other embodiments, the Current Trading List comprises a list of contestants in tournaments, playoffs, game shows, reality-based television shows, award shows, sporting events, any/or any suitable contest. The list may comprise:

name of the derivative financial instrument;
number of shares in circulation;
last trading price (printed every 15 minutes);
price movement since the previous midnight (PST);
price movement since the previous mid-day; and
price movement year to date.

In an exchange that relates to derivatives based on movies and/or actors, the Current Trading List may further comprise the genre of the movie (action-adventure, mystery, western, comedy, etc.) and the production status of the movie (scripting, pre-production, filming, editing, release, home-video, etc.).

Traders may be able to view the Current Trading List sorted by:

name, alphabetically;
genre, alphabetically;
productions status, alphabetically;
most active (number of shares traded yesterday);
biggest gainers;
biggest losers; and
fastest movers today (e.g., fastest 20 movers up and fastest 20 movers down).

Similar information may be provided for other derivative financial instruments offered on the exchange.

Each trader's portfolio is identified by a Portfolio data structure that comprises the trader's account status. This information includes:

the amount of cash in the trader's account (paid interest at the system discount rate plus some increment, compounded daily);
current percentage rate paid to cash;
the total value of held stocks at the last selling price;
the total value of held bonds at the last selling price;
total portfolio value (TPV) (cash+bonds+stocks);
percentage of TPV in cash;
percentage of TPV in bonds; and
percentage of TPV in stocks.

Traders can generate any number of different reports for display, including:

lists of stocks and bonds being traded (see above);
index of total stocks (INDEX_STOCKS) expressed as a number, with 1000 defined as the aggregate total stock price value on opening day, wherein INDEX_STOCKS=(today's gross stock-value)/(opening day gross stock-value);
index of total bonds (INDEX_BONDS) expressed as a number, with 1000 defined as the aggregate total bond price value on opening day, wherein INDEX_BONDS= ((today's gross bond-value)/(opening day gross bond-value));
index of total exchange (INDEX_EXCHANGE) comprised of all stocks and bonds, and expressed as a number, with 1000 as the aggregate total stock price value on opening, wherein INDEX_EXCHANGE= ((today's gross market-value)/(opening day gross market-value));
lists of the top market performers, e.g., the top 10 traders in percentage portfolio growth calculated as net portfolio value-change=(% change of cash)+(% change of stocks)+(% change of bonds), and for each of the categories: yesterday (midnight to midnight), last week (7 days, ending midnight, each Thursday), last month (closes at midnight last calendar day of month), last quarter (closes at midnight on last day of last month/quarter), year-to-date (running daily total of percentage value changes)/(days year-to-date), and annually (closes at midnight on December 31 each year);
overall market condition report, including a list of stopped issues with:
name;
last trading price;
time that stop-trade condition occurred;
percentage the issue actually moved on-the-day before the stop-trade;
number of total shares and/or bonds traded today;
dollar value of total trades today;
number of buy and sell trades today; and
number of buy and sell trades this month.

Use of the above information will guide traders in making future buy and sell orders.

Hardware Environment

With reference to FIG. 1, a block diagram illustrates an exemplary hardware environment for the preferred embodiments of the present invention. More particularly, a typical distributed computer system is illustrated, which uses the Internet 10 to connect client computers 12 executing for example, Web browsers, to server computers 14 executing a computer program embodying the present invention. A typical combination of resources may include client computers 12 that are personal computers or work stations connected via the Internet 10 to server computers 14 that are personal computers, work stations, minicomputers, or mainframes.

Generally, both the client computers 12 and the server computers 14 are comprised of one or more CPUs 16, various amounts of RAM storing computer programs 20 and other data, and other components typically found in computers. In addition, both the client computers 12 and the server computers 14 may include one or more monitors, and fixed or removable data storage devices 20 such as hard disk drives, floppy disk drives, and/or CD-ROM drives. Also, input devices, such as mouse pointing devices and keyboards, may be included.

Both the client computers 12 and the server computers 14 operate under the control of an operating system, such as Windows, Macintosh, UNIX, etc. Further, both the client computers 12 and the server computers 14 each execute one or more computer programs 18 under the control of their respective operating systems. The present invention is preferably implemented as one or more computer programs 18 executed by the server computer 14, although in alternative embodiments these computer programs 18 may also be executed on the client computer 12.

Generally, the computer programs 18 implementing the present invention are tangibly embodied in a computer-readable medium, e.g., one or more of the fixed and/or removable data storage devices 20 attached to the computer. Under control of the operating system, the computer programs 18 may be loaded from the data storage devices 20 into the RAM of the computer for subsequent execution by the CPU 16. The computer programs 18 comprise instructions which, when read and executed by the computer, causes the computer to perform the steps necessary to execute the steps or elements of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

I. General Logic of a First Embodiment of the Trading System

Figure 2:
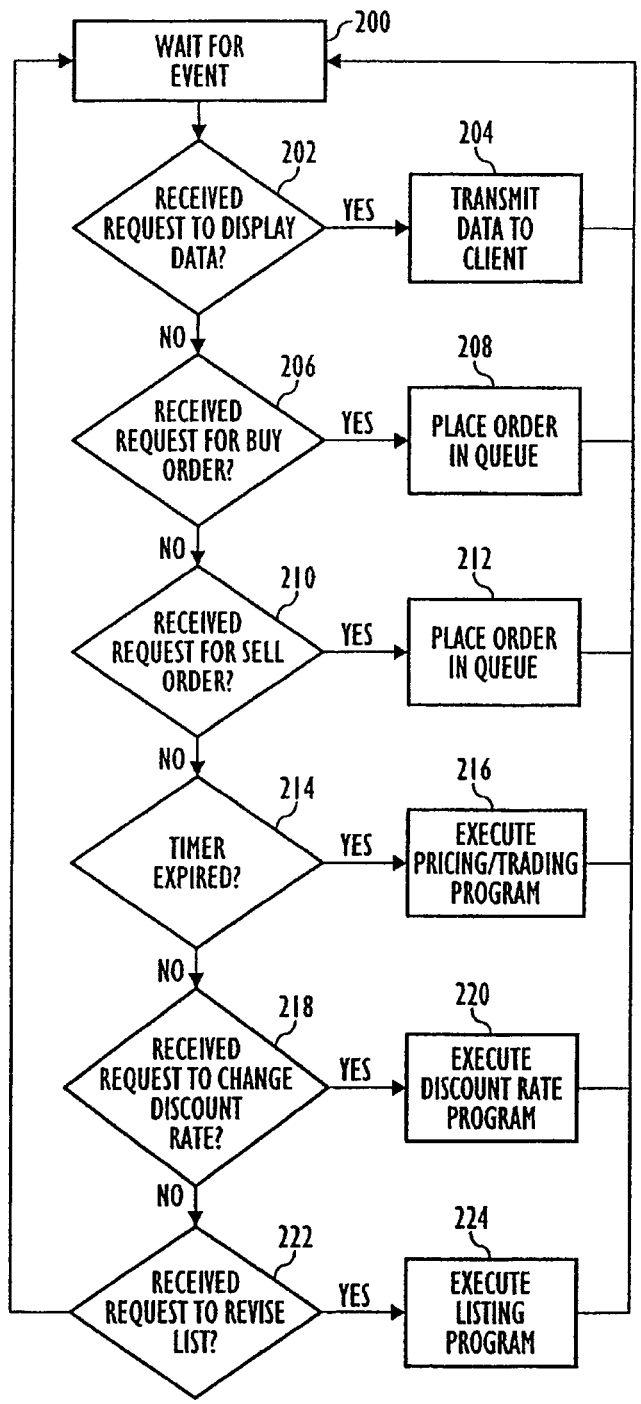
FIG. 2 is a flowchart illustrating the general logic of a first embodiment of the present invention.

With reference to FIG. 2, a flowchart illustrating the general logic of a first embodiment of the present invention is shown.

Block 200 represents the server computer 14 waiting for the next event to occur. Once the event occurs, control is transferred to the even-numbered blocks 202-224 to identify the event and respond accordingly.

Block 202 is a decision block that represents the server computer 14 determining whether it received a request to display data from the client computer 12. If so, block 204 represents the server computer 14 transmitting data to the client computer 12 for subsequent display. The data transmitted for display preferably includes at least three types of data: the current list of trading derivative financial instruments, the trader's portfolio, and other reports generated by the server computer 14.

Block 206 is a decision block that represents the server computer 14 determining whether it received a request to submit a buy order from the client computer 12 for a particular derivative financial instrument, e.g., stock or bond. If so, block 208 represents the server computer 14 processing the buy order by placing it in a queue in the memory of the server computer 14. The buy order is a data structure comprising:

trader's account number;
trader's name;
the time and date of the order;
the stock or bond to buy;
the cash balance in the trader's account; and
a text-field where the trader may enter the total number to buy (generally in multiples of 100).

In a first preferred embodiment, the buy order waits in the queue for the expiration of a predetermined "sweep pricing cycle" The sweep pricing cycle occurs periodically, such as every 15 minutes, or during another specified time interval. The marked price the trader actually pays for the derivative financial instrument is determined by the aggregate supply/demand for the derivative financial instrument at the end of the sweep pricing cycle during which the order was placed.

The market price is set by the pricing/trading program executed by the server computer, which is described below in FIG. 3. The trader's account is then charged the market price for the derivative financial instrument. If the purchase uses up all available cash in the trader's account, the trader is "loaned" enough money to pay for the purchase, and their account is charged interest at a predetermined rate, e.g., 18% a year compounded daily, on the negative account balance. The interest is charged against the trader's account until they accumulate more cash to zero out the balance, either by selling stocks or buying dollars.

Block 210 is a decision block that represents the server computer 14 determining whether it received a request to submit a sell order from the client computer 12. If so, block 212 represents the server computer 14 processing the sell order by placing it in queue in the memory of the server computer 14. The sell order is a data structure comprising:

trader's account number;
trader's name;
the time and date of the order;
the stock or bond to sell;
the amount of the stock or bond in the trader's account; and
a text-field where the trader may enter the total number to sell (generally in multiples of 100).

In the first preferred embodiment, like the buy order, the sell order waits in the queue for the expiration of the predetermined sweep pricing cycle. The market price at which the trader actually sells the derivative financial instrument is determined by the aggregate supply/demand for the derivative financial instrument at the end of the sweep pricing cycle during which the order was placed. The market price is set by the pricing/trading program executed by the server computer, which is described below in FIG. 3. The trader's account is then credited with the market price for the derivative financial instrument.

The sell order can be either produced by a trader or generated by the server computer 14, as will be explained in more detail below. For a sell order produced by a trader, the trader views a list of stocks or bonds owned by the trader on a monitor attached to the client computer and chooses to sell a quantity at the market price.

When the trader requests to view the list of stocks, the server computer 14 transmits certain information to the client computer 12 for display, including, for each stock owned, the last trading price (LTP), the quantity of stocks, the purchase price, and the date purchased, Similarly, when viewing the list of bonds, the server computer 14 transmits certain information to the client computer 12 for display, including, for each bond owned, the last trading price (LTP), the interest rate being earned for each kind of bond, the quantity of bonds, the purchase price, and the date purchased.

Block 214 is a decision block that represents the server computer 14 determining whether an internal timer for the sweep pricing cycle has expired. If so, block 216 represents the server computer 14 processing the timer executing a pricing/trading program as described in FIG. 3.

Block 218 is a decision block that represents the server computer 14 determining whether it received a request to change the discount rate. If so, block 220 represents the server computer 14 executing a discount rate program. In order to add or subtract liquidity, the server computer 14 occasionally steps in to act as a virtual reserve bank program and adjust the discount rate. The discount rate may be adjusted based on any suitable data, such as, for example, the performance of a particular industry, the television ratings of a particular show, ticket sales, revenue, or any other suitable information. The discount rate may be adjusted to add or subtract liquidity to affect the growth of a particular market and/or industry. When the server computer 14 lowers the discount, all the bonds seem to be a better deal, because the bonds are paying a fixed rate interest that never changes. In the first preferred embodiment, this encourages traders to buy more bonds, and this surge in buying demand causes a correlated increase in bond prices as described above. The same thing happens to stocks, because traders are making less money on the interest being paid on the cash balance in their trading account. When the server computer 14 raises the discount, so the bonds seem to be a worse deal, since their advantage over the discount is smaller. Thus, the server computer 14 relaxes the buying pressures or demands for bonds, which should result in additional sell orders, or at least slow the buying of bonds, thus decreasing their prices as they trade in the market. Likewise, stocks seem less attractive, since traders could make more money by keeping cash in their accounts and getting interest on it.

Block 222 is a decision block that represents the server computer 14 determining whether it received a request to revise the derivative list. If so, block 224 represents the server computer 14 executing a listing program. The server computer 14 determines whether the list of derivatives trading in the system should be revised. The list could be revised to reflect new derivative offerings, expired derivatives, and delisted derivatives.

The initial price of a particular derivative may be based on the movie, actor, athlete, team, awards nominee, contestant, and/or entity represented by the particular derivative. For example, the initial price for a derivative representing a movie may be based on estimates of the movie's potential box office revenue. As another example, the initial price for a derivative representing a movie may be based on subjective criteria such as, for example, the reputation of the director, whether the movie is produced by a major or minor studio, the popularity of an actor in the movie, and/or any other suitable criteria. The initial price for a derivative representing a contestant in a sports tournament (e.g., basketball team in playoffs) may be based on that contestant's seeding in the tournament, current ranking, win-loss record, and/or any suitable number and combination of objective and/or subjective criteria. The initial price for a derivative based on an awards nominee may be based on prior awards, achievements, or honors earned by the nominee. For derivatives based on contestants in a reality-based television show, the exchange may set the initial prices associated with the contestants to be equal. In other embodiments, the exchange may set the initial price of a particular derivative based on the achievements, skills, and/or popularity of the contestant represented by that derivative. For a bond representing talent on the exchange, the price of the bond may be based on the Hollywood Reporter's Star Power Index. A bond representing a talent with a low Star Power Index of 15 would be issued with a higher yield than a bond representing a talent with a high Star Power Index rating. It will be understood that the exchange may use any suitable number and combination of data and/or criteria to set prices for the derivative financial instruments.

In some embodiments, the exchange may automatically determine the initial price of a particular derivative. In other embodiments, one or more individuals (such as, for example, a panel of experts) may use any suitable objective and/or subjective criteria to determine the initial price of a particular derivative.

In some embodiments, a warrant with a strike price may be attached to the new derivative when it is offered. When the derivative and warrant are first issued, the warrant may be of no value until the strike price is reached. For example, for a stock based on a movie, the strike price may be reached after the movie grosses a certain level of revenue. When a derivative is delisted from the exchange, a stock due to the movie ending its production run or a talent due to retirement or death, for example, the warrants may be called and the traders may be paid the value of the warrants, thus providing off-balance sheet financing for studios.

Pricing/Trading Program

Figure 3:
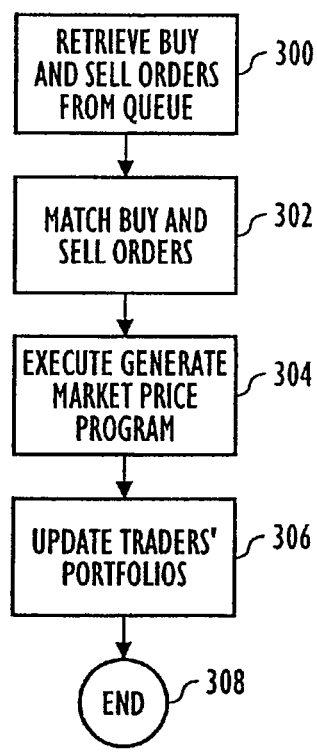
FIG. 3 is a flowchart illustrating the logic of the pricing/trading program of the first embodiment of the present invention.

With reference to FIG. 3, a flowchart illustrating the logic of the pricing/trading program of the present invention is shown. Block 300 represents the server computer 14 retrieving the buy and sell orders that have accumulated in the queue during the period since the prior sweep pricing cycle. Block 302 represents the server computer 14 matching the buy orders with the sell orders, although it is likely than an identical number of buy and sell orders would not have accumulated in the queue during the period. Block 304 represents the server computer 14 executing the generate market price program described in FIG. 4 to determine the market price for the derivative financial instruments. After the market price is determined, block 306 represents the server computer 14 updating the traders' portfolios to reflect the buy and sell orders in the queue being processed at the market price. Block 308 represents the end of the pricing/trading program.

Generate Market Price Program

Figure 4:
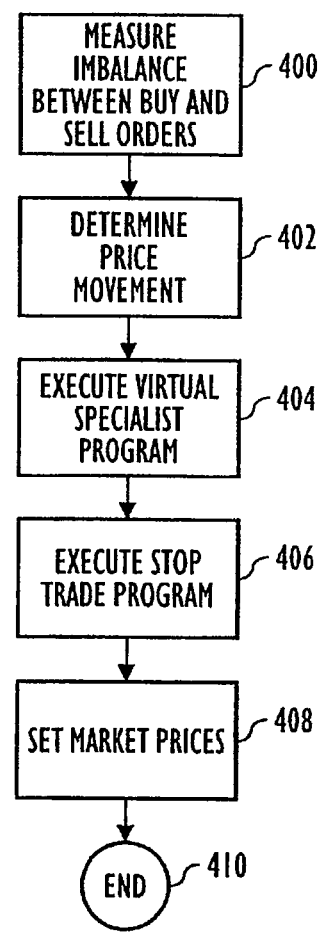
FIG. 4 is a flowchart illustrating the logic of the generate market price program of the first embodiment of the present invention.

With reference to FIG. 4 a flowchart illustrating the logic of the generate market price program of the present invention is shown. One purpose of the generate market price logic is to generate a market price for a derivative financial instrument that reflects the demand or lack of demand for the derivative financial instrument in the market. Block 400 represents the server computer 14 measuring the imbalance between the buy and sell orders during the period since the prior sweep pricing cycle. Block 402 represents the server computer 14 determining the price movement of a derivative financial instrument caused by the imbalance in buy and sell orders. Block 404 represents the server computer 14 executing a virtual specialist program as described in FIG. 5 to provide stability and liquidity to the market. Block 406 represents the server computer 14 executing the stop trade program, as described in FIG. 6, to stop trading in a derivative financial instrument if the projected price movement is excessive during the trading day and threatens the integrity of the market for that instrument. Block 408 represents the server computer 14 setting the market price, which becomes the price the pricing/trading program uses to update the traders' portfolios. Block 410 represents the end of the generate market price program.

In measuring the imbalance between buy and sell orders, as represented by block 400, the absolute difference between the number of sells and the number of buys is defined as the net movement in sweep (NMS). A sweep increment variable (SIV) is defined as the increase or decrease in price caused by an incremental imbalance in the number of buy orders and sell orders. A lot movement variable (LMV) represents the incremental lot size that will result in a price increase or decrease of one SIV. The projected price movement (PM) can be expressed as: $PM=(NMS/LMV)*SIV$.

For example, with 42,000 buy orders and 30,000 sell orders for a particular stock, the $NMS=(42,000-30,000)=12,000$. With $SIV=\$0.25$ and $LMV=5000$, the price movement of the particular stock will be $(12,000/5,000)*0.25=\$0.50$. Thus, the market price of the particular stock will be $0.50 greater than the last trading price.

One can easily see that, with such a pricing scheme, there is the potential for great volatility in the price of a derivative financial instrument and the eventual loss of investor confidence in the market mechanism. In the exchange, it may be possible for one or more individuals to pursue trading strategies that would purposely cause drastic price fluctuations.

In order to encourage growth and stability in the capital market regulated by the trading system of the present invention, a virtual specialist program is executed by the server computer, as represented by block 404 in FIG. 4. In executing the virtual specialist program, the server computer 14 regulates the trading by actively trading in the market out of a virtual specialist portfolio (VSP). In the first preferred embodiment, the virtual specialist program portfolio initially contains half of all the issued shares of each derivative financial instrument.

Virtual Specialist Program

Figure 5:
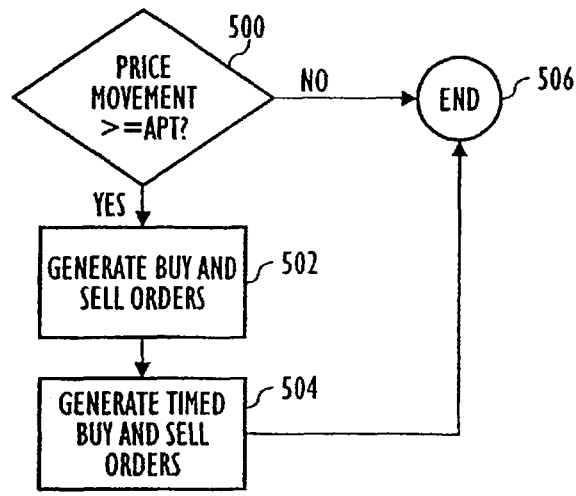
FIG. 5 is a flow diagram illustrating the logic of the virtual specialist program of the first embodiment of the present invention.

With reference to FIG. 5 a flow diagram illustrating the logic of the virtual specialist program of the present invention is shown. Block 500 is a decision block that represents the server computer 14 determining whether or not the price movement during the sweep pricing cycle is greater or equal to an adjusted price movement threshold (APT). The APT is a constant in the memory of the server computer 14. If the APT is greater than the price movement, then the server computer 14 does not trade in the market. If the price movement is greater than or equal to the APT, then the server computer 14 trades out of a virtual specialist program portfolio. The level of trading by the server computer 14 is determined by the amount that the price movement exceeded the APT. The greater the price movement, the more shares the server computer 14 trades to offset the price movement.

In an exemplary embodiment of the present invention, the ATP=1.25 and the server computer 14 performs the following steps: if PM=APT then the server computer 14 matches 20% of unmatched shares; if PM=APT+0.25 then the server computer 14 matches 20% of unmatched shares; if PM=APT+0.50 then the server computer 14 matches 30% of unmatched shares; if PM=APT+0.75 then the server computer 14 matches 40% of unmatched shares; if PM=APT+1.0 then the server computer 14 matches 50% of unmatched shares; if PM=APT+1.25 then the server computer 14 matches 60% of unmatched shares; if PM=APT+1.50 then 60 the server computer 14 matches 70% of unmatched shares; if PM=APT+1.75 then the server computer 14 matches 80% of unmatched shares.

Block 502 represents the server computer 14 generating a buy or a sell order to offset the price movement. The buy or sell order generated by the server computer 14 is placed in the queue with the trader buy and sell orders to be processed during the next sweep cycle.

In the first preferred embodiment, since the virtual specialist program portfolio initially includes half of all the securities traded, the server computer 14 could eventually deplete the virtual specialist program portfolio or cause the virtual specialist program portfolio to own all the shares of a stock. In order-to maintain a balanced virtual specialist program portfolio, and provide some-liquidity-to the market, the server computer 14 generates additional buy and sell orders to offset orders generated in response to the price movement exceeding the APT. Block 504 represents the server computer 14 generating timed buy and sell orders. In one embodiment of the invention, the server computer 14 assess each stock and each bond in the virtual specialist program portfolio. The server computer 14 determines the deficit or surplus in the item, and then place ½ssth of the deficit as a "timed recovery order" into each successive 15 minute segment for the next 3 days. When the pricing/trading program matches buy and sell orders as represented by block 302, the pricing/trading program includes any "timed recovery orders" outstanding for the last 3 days in the sweep. These orders are matched with the traders' buy and sell orders. Block 506 represents the end of the virtual specialist program.

Stop Trading Program

Figure 6:
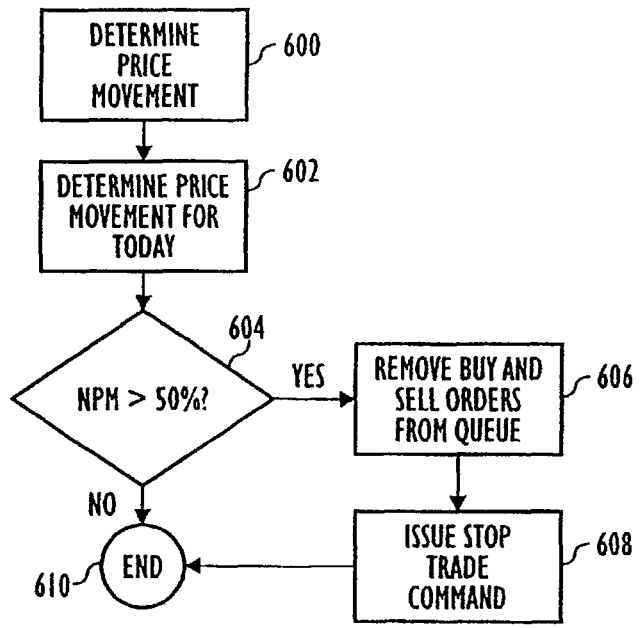
FIG. 6 is a flow diagram illustrating the logic of the stop trading program of the first embodiment of the present invention.

FIG. 6 is a flow diagram illustrating the logic of the stop trading program of the present invention. Block 600 represents the server computer 14 determining the price movement of a stock caused by the imbalance in buy and sell orders. Block 602 represents the server computer 14 measuring the price movement on the day, not just during the sweep cycle period. Block 604 is a decision block that represents the server computer 14 determining whether the net price movement (NPM) within one "trading day" (i.e., midnight-midnight) is greater than 50% up or down. As represented by block 606, the buy and sell orders are removed from the queue if the net price movement is greater than 50% for a stock trading above $20. At that point, the trading in that issue is stopped within the 15 minute period until further notice. All orders (buy and sell) for that stock during this sweep are unfilled. The trading has stopped due to "excessive order imbalance".

For example, assume that the Last Trading Price (LTP) for a particular derivative based on a particular movie is $67 (+7.5 on-the-day). During one 15-minute sweep pricing cycle, the server computer 24 receives buy orders for 655,000 shares of the particular derivative. Also, the server computer 14 receives sell orders for 35,000 shares of particular derivative. The server computer 14 evaluates the price movement for the sweep pricing cycle, and tests it to see if the net projected price movement "on-the-day" is greater than 50%. If it would be greater than 50%, it stops trading in that instrument only. In this example, there is a net order-imbalance of 620,000 shares, which would create an up movement in price of (+620,000/5000)*$0.25=+$31.00. Since the total movement on the day would be the $7.50 so far plus the additional $31.00, the net projected price movement on the day would be $31.00+$7.50=$38.50. If the opening price that day was $59.50, the percentage projected price movement for the day is $38.50/$59.50=64%. Since the projected net price movement would be greater than 50%, the trading is stopped for that instrument. If the projected price movement was less than 50%, the price of the instrument would be adjusted accordingly and trade in that stock continued. Block 608 represents the STOP TRADE order that issues regarding the particular stock. Traders who issued a buy or sell order for the stock are notified that the order has not been filled due to excessive order imbalance during the trading day. Finally, block 610 represents the end of the stop trading program.

II. General Logic of a Second Embodiment of the Trading System

As with the first embodiment described above, a second embodiment of the system of the present invention includes a database of securities provided for trading in an open, computerized, exchange. In some embodiments, securities are listed which relate to movies, actors, products, and/or service companies. In other embodiments, securities are listed which relate to contestants in contests such as, for example, tournaments, game shows, reality-based television shows, award shows, sporting events, and/or any suitable competition. Thus, the following description of the second embodiment focuses on the differences in functionality from the first embodiment, and may omit features which are nevertheless included in the second embodiment, but do not require further description.

System Component Overview

Figure 7:
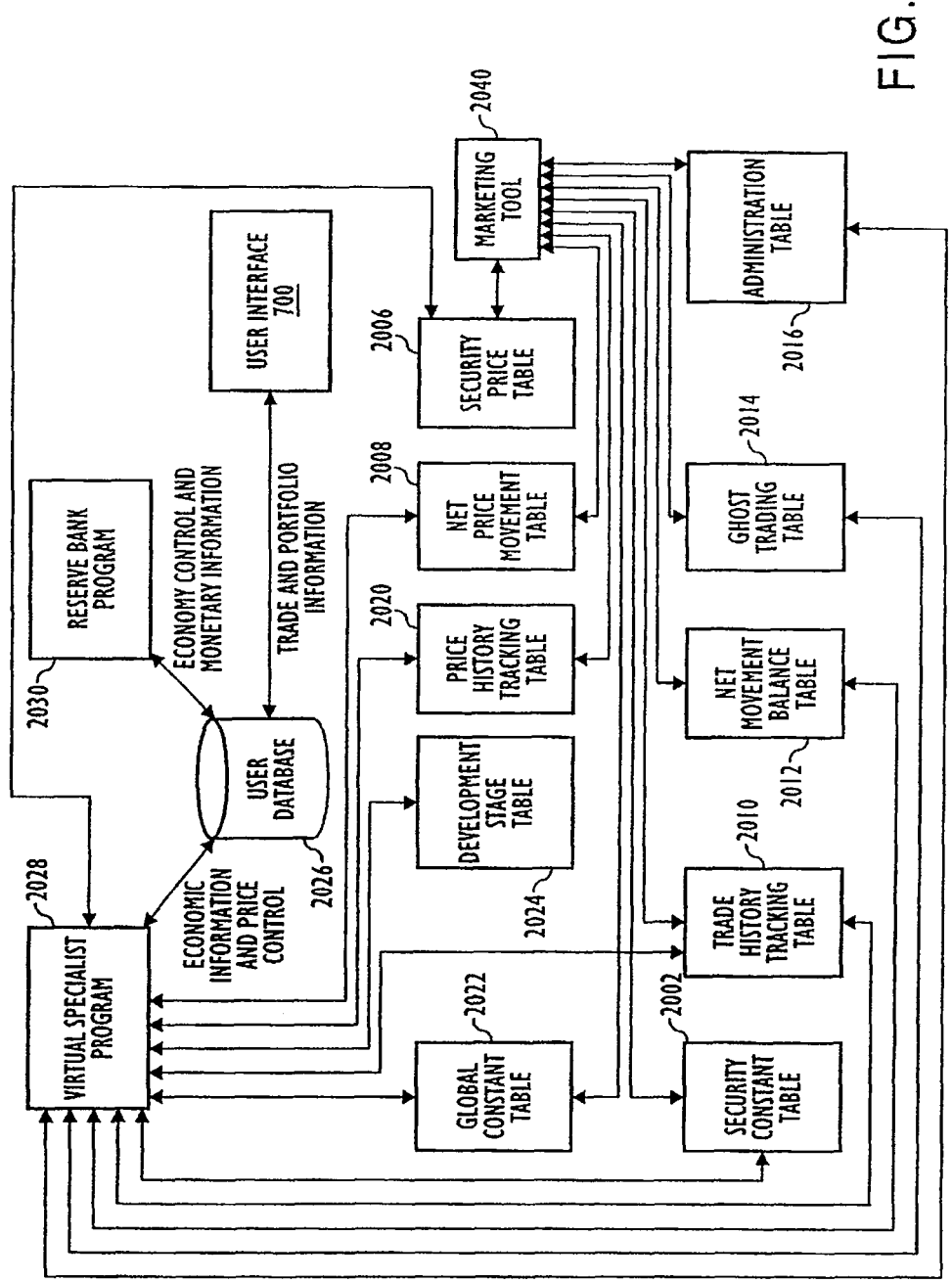
FIG. 7 shows an exemplary administration module Screen for a second embodiment of the present invention.

With reference to FIG. 7, included within the system are a plurality of tables, including a global constant table 2022, price history table, 2020, net price movement table, 2008, security price table 2006, security constant table 2002, trade history tracking table 2010, net price movement balance table, 2012, ghost trading table 2014, administration table, 2016, and a user database table 2026, which are used as explained below. Exchanges based on derivatives such as movies may further comprise a development stage table 2024. Interfacing with these tables are the virtual specialist program, 2028, which passes economic and price control data between all of the tables, a reserve bank program, 2030, which passes economic control data between all of the tables, and the user interface, 700, which passes trade and portfolio information between itself and the user database as explained below. Also interfacing with all tables is a marketing tool, 2040, as described below.

Administration Module

With reference to FIG. 18, the system includes an administration module which is used, as explained below, to adjust constants and variables in the system. The administration module is password protected and implemented with browser interface 700, also described below.

User Registration and Login

With reference to FIG. 1, users may access the system over a network, using a standard interface. An exemplary system comprises a Web client 12 connected to a network such as the Internet 10, which is connected to SQL compliant back-end database servers 14.

Figure 8A:
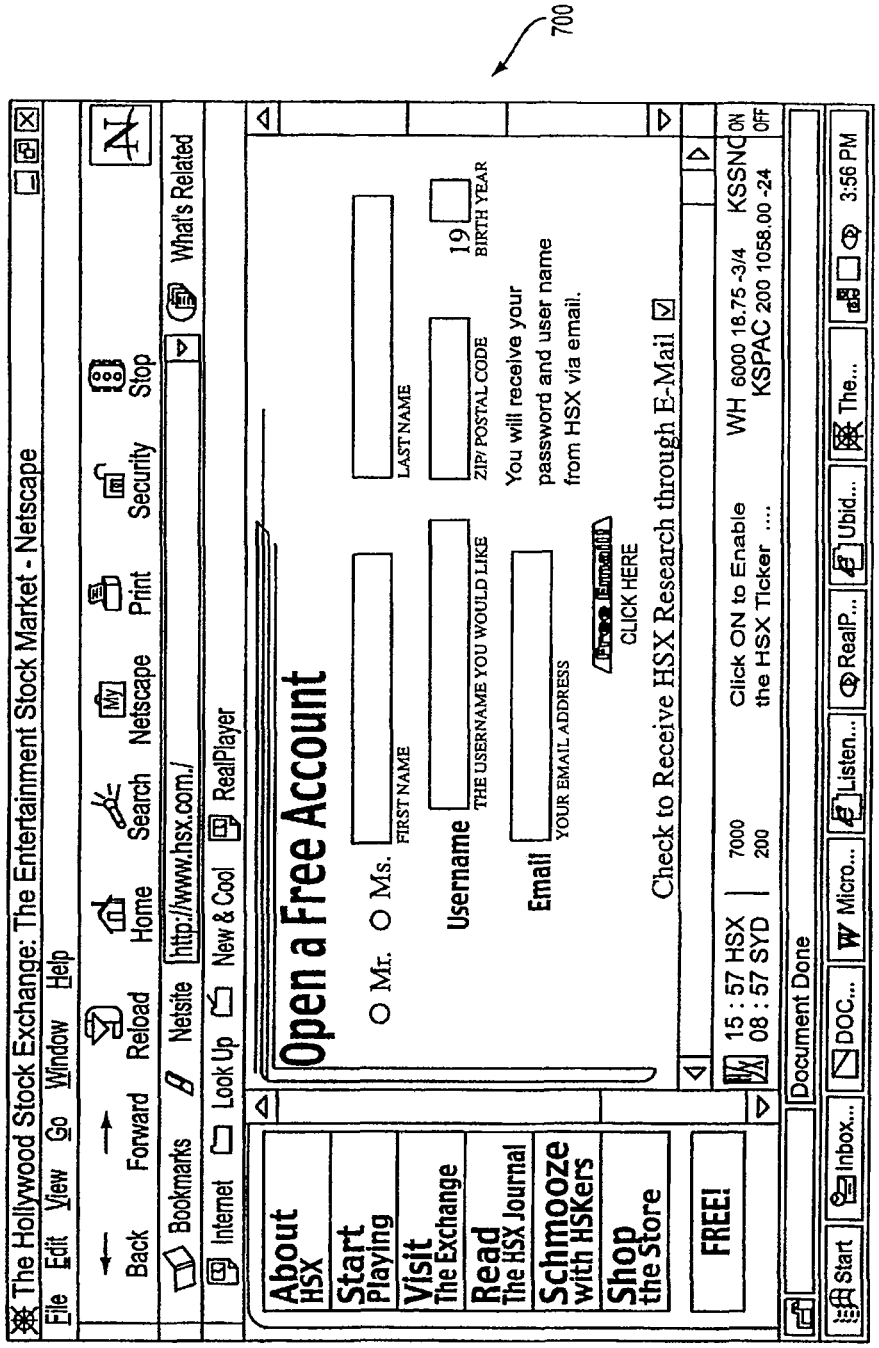
FIG. 8A shows an exemplary interface for the second embodiment of the present invention with a new user registration screen.

With reference to FIG. 8A, a standardized Web browser interface 700 may be used by the user to register with the on-line trading system over Internet 10, providing demographic information, such as first name, last name, age, sex, location, occupation, income, hobby interest, and the like. Once registered, the user is given the option of choosing a unique userID which will be used for logging in after registration. In providing the demographic information, the user also provides an e-mail address to which a randomly assigned password and other instructional information can be forwarded.

Figure 8B:
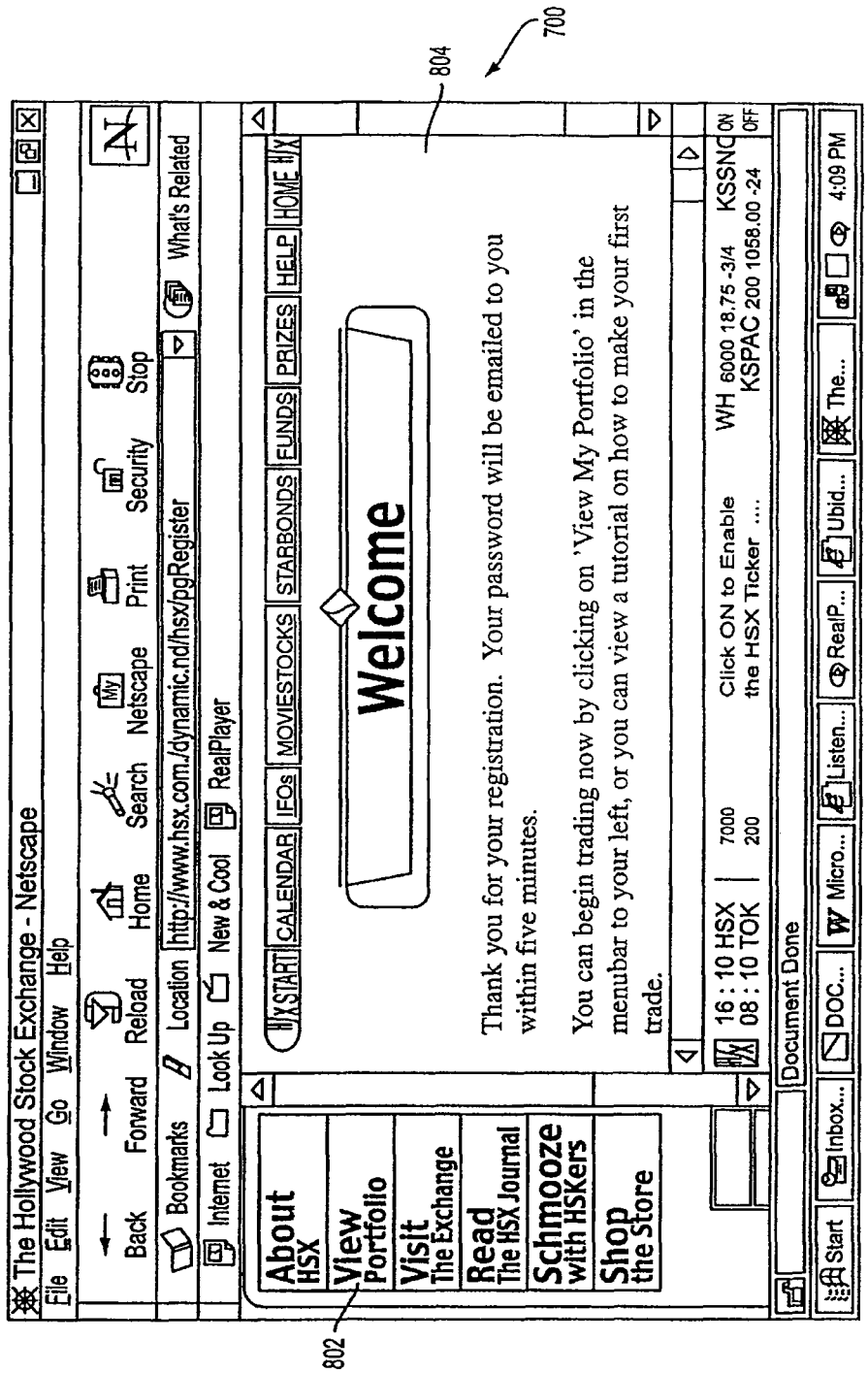
FIG. 8B shows the interface screen of FIG. 8A with a new user welcome screen displayed.

With reference to FIG. 8B, once the user is registered, the first time user's default portfolio may be accessed using a temporary password free login by selecting the View Portfolio button 802 in the upper left hand corner of a Welcome Web page 804.

Figure 9:
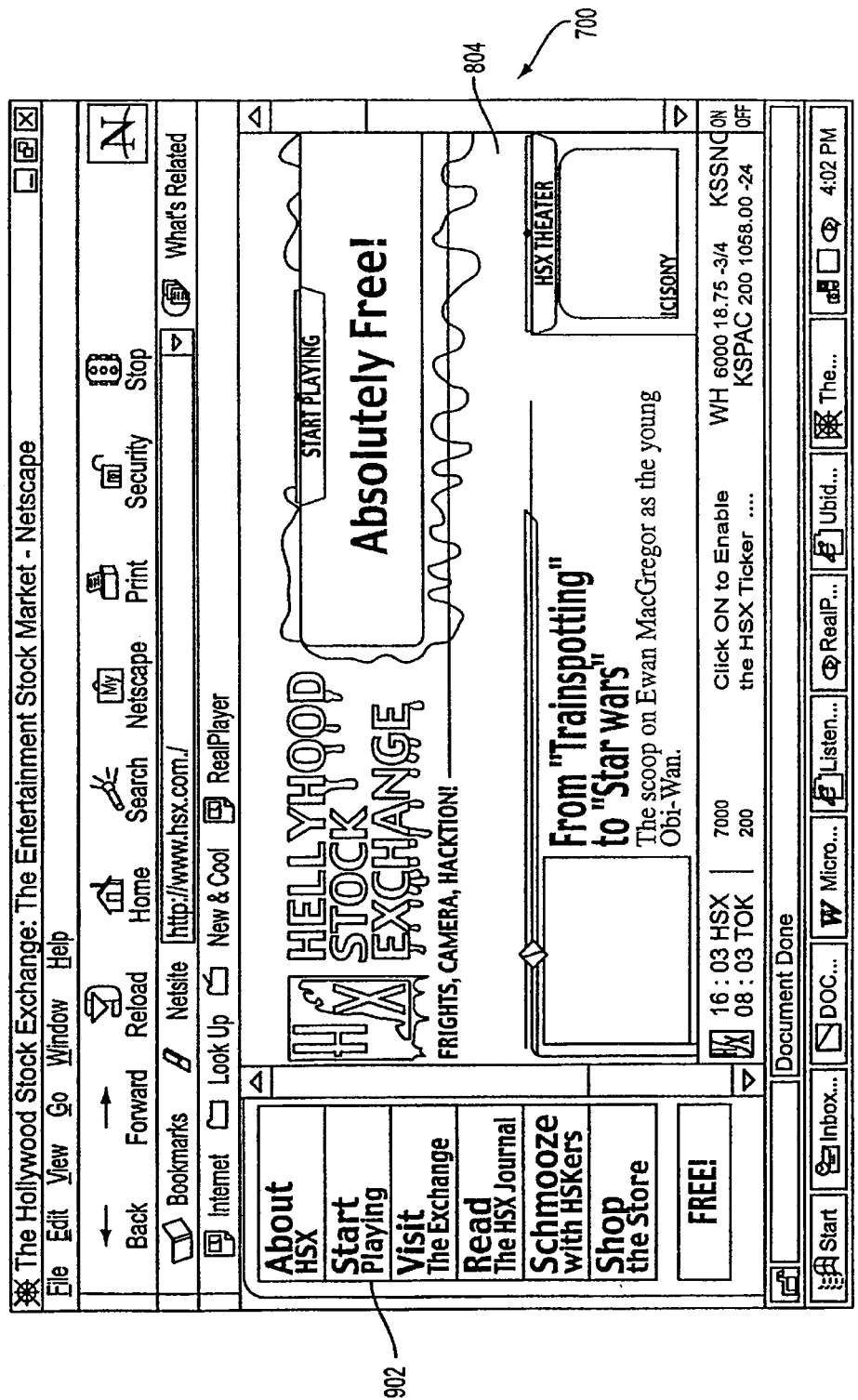
FIG. 9 shows the interface screen of FIG. 8A with a system home page displayed.

With reference to FIG. 9, after the user has received their permanent password, the system can be accessed over Internet 10 (FIG. 1) using Internet browser 700 by selecting a start button 902 present on a Web home page 804 for the system.

Figure 10:
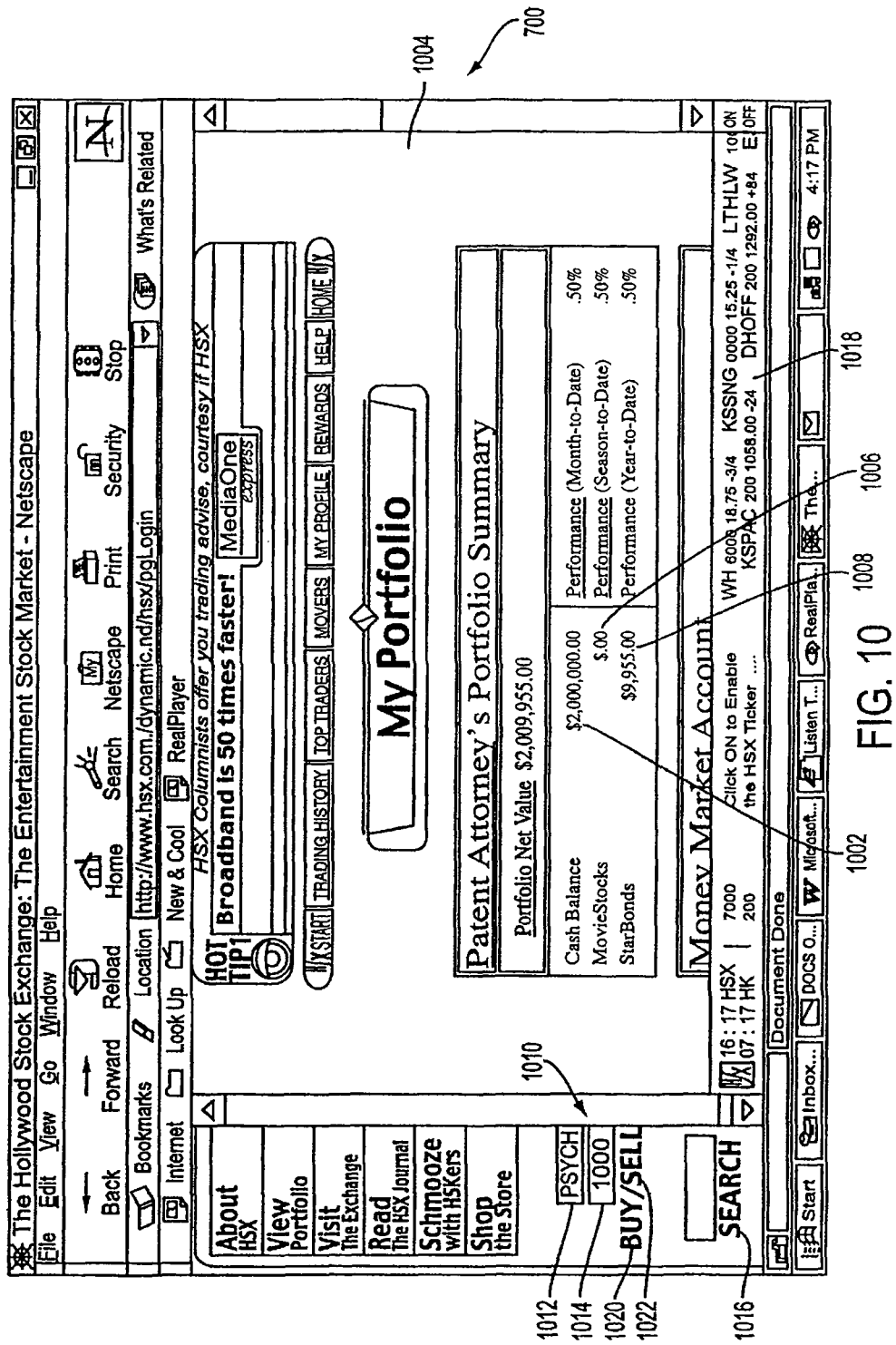
FIG. 10 shows the interface screen of FIG. 8A with a user portfolio page displayed.

With reference to FIG. 10, the user is presented with their portfolio on Web page 700. Automatically, the new user is provided with a fixed quantity of virtual currency 1002 in virtual dollars (V$) from a reserve bank program, described below, to begin trading with. This quantity can either be considered a loan from the reserve bank program, for which interest is charged, or a gift.

After logging in, the user's portfolio summary 1004 is displayed at the top of the page, which displays the user's current cash balance 1002, amount held in stocks 1006, bonds 1008, and other types of securities. When a new user logs in, the cash value of the user's portfolio is usually represented solely in cash 1002, or in a money market account. However, sometimes the system may award new users a free security holding up front, for example comprising bond securities 1008. The cash in the user's portfolio accrues at an interest rate set by a virtual reserve hank program.

Trade Orders

The user may trade security instruments by typing in the symbol 1012 for the instrument for which a purchase is desired in a buy-sell area of page 1010. A quantity 1014 is also specified in buy sell area 1010. If the user does not know the symbol for a particular instrument, a lookup or search function is provided in a symbol search area 1016 of the screen using standard graphical user interface (GUI) features such as drop-down list boxes, text search boxes, or slider bar lists. Alternatively, a ticker tape style updating menu 1018 at the bottom of the screen displays available instruments with the corresponding instrument prices.

Figure 11:
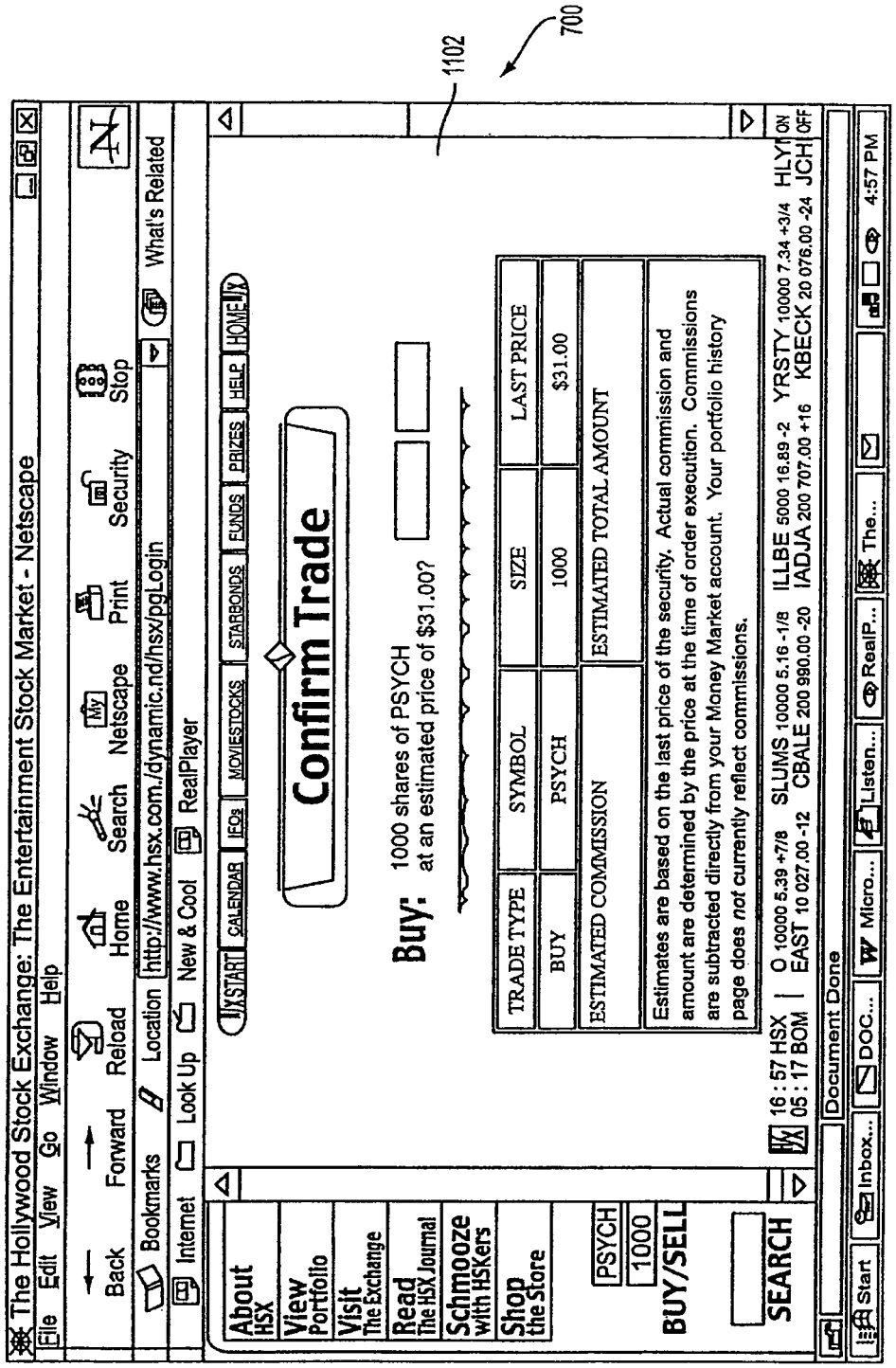
FIG. 11 shows the interface screen of FIG. 8A with a trade confirmation screen displayed.

Once the user has successfully entered the symbol 1010 for an available instrument, and a quantity 1014, a buy button 1020 may be pressed in buy-sell area 1010. With reference to FIG. 11, if the user has enough cash on account, and if the instrument is available for trading, then a confirmation screen 1102 appears before execution of the transaction. Upon confirmation, the trade is executed, and the cash is debited from the user's cash account 1002 (FIG. 10).

With reference to FIG. 10, if the user wishes to sell a security instrument, the same procedure is followed for placing a buy order described above, except, a sell button 1022 is clicked on in buy-sell area 1010 of the portfolio page 1004. After confirmation, the market price for the shares sold is added to the user's cash account 1008, and the shares are made available in the system for fulfilling purchase orders.

Virtual Specialist Program

The system includes a virtual specialist program which, among other things, handles fulfillment of buy and sell orders. In the second embodiment of the present system, the virtual specialist program controls the economy, and provides it with liquidity. The virtual specialist program provides instantaneous liquidity by fulfilling all orders, whether or not there are equal and matching sell orders to offset buy orders, and vice versa.

Figure 12A:
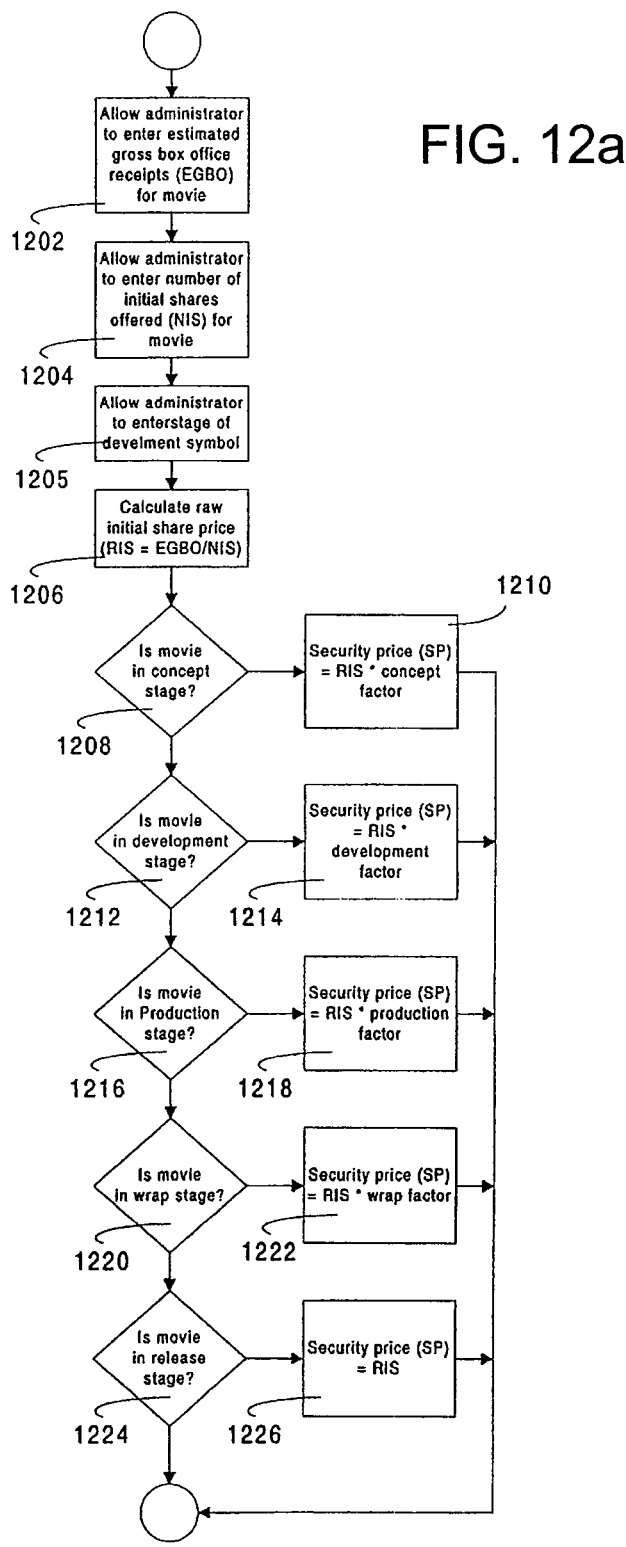
FIG. 12a is a flow diagram illustrating the logic of an initial security pricing program for the second embodiment of the 20 system.

With reference to FIG. 12a a flow chart is shown illustrating the calculations performed by the virtual specialist program for determining an initial security price. The virtual specialist program calculates the initial price in a public offering for a new security to be listed on the exchange based on administrator entered values. A system administrator, through a password protected administration module, is able to set up a new security for listing on the exchange. The exchange may set and manage the price of a derivative based in part on the nature of the underlying entity (e.g., movie, actor, contestant, and so forth). For example, the exchange may set and manage the price of a derivative based on a movie differently than the exchange sets and manages the price of a contestant in a reality-based television show.

Derivatives Based on Movies, Talent, Products, and/or Service Companies

In the case of films listed in the exchange described above, one way to determine price is by stage of production of the movie. Each movie has an associated estimated gross box office performance. An administrator is allowed to enter the estimated gross box office performance (EGBO) for the security, step 1202, in the administration screen. The administrator enters a quantity for the number initial of shares (NIS) issued for the security, step 1204. The number of shares issued is a hypothetical number since the virtual specialist program of the second embodiment does not actually keep any shares in reserve. The user also enters a code for the stage of production for the movie (described below), step 1205. The virtual specialist program takes the EGBO, and divides it by the NIS to determine a raw initial share price (RIS), step 1206.

The initial share price (ISP) is then adjusted by a stage of production factor. The following is a description of the different stages of production for a movie, with the code format entered by the administrator:

C=Concept: During a movie's concept stage, there is not active production yet. Rumors are heard about a 'new' project; maybe a sequel to an existing movie or a book adaptation.

D=Development: During a movie's development stage, the project has attracted interest, and funds are spent on developing the idea further. The final script premise is being perfected.

Pre-conceptual design work is taking place. More crew and actors are dedicating themselves to the project in this stage.

P=Production: The project has moved to active production. All of the crew and stars have been selected, and principal photography is scheduled or commenced. The release date starts to become fixed.

W=Wrap: The movie has been completed in its entirety, and is awaiting release. The release date may have been pushed back a short time, maybe a number of weeks or months, to an unscheduled future date, awaiting a more favorable window of opportunity for commercial success.

R=Release: The movie is playing in theaters.

When a movie is in the concept stage, it is much more difficult to determine the likelihood of success for the movie than when the movie is in the production, wrap, or release stage. The production cycle relates to a continuum of so success, begging with the concept stage, where it is more difficult to judge potential success, and ending with the release stage, where actual box office receipts can be observed to more accurately determine the potential success of a movie. Thus, when determining the initial success of a movie, the RIS should be reduced accordingly.

Starting with step 1208 (FIG. 12*a*), the virtual specialist program checks to see if the movie is in the concept stage. If so, then the price of the security is multiplied by an administratively set concept factor for movies in the concept stage, step 1210.

The virtual specialist program checks to see if the movie is in the development stage, step 1212. If so, then the price of the security is multiplied by an administratively set development factor for movies in the development stage, step 1214.

The virtual specialist program checks to see if the movie is in the production stage, step 1216. If so, then the price of the security is multiplied by an administratively set production factor for movies in the production stage, step 1218.

The virtual specialist program checks to see if the movie is in the wrap stage, step 1220. If so, then the price of the security is multiplied by an administratively set wrap factor for movies in the wrap stage, step 1222.

The virtual specialist program checks to see if the movie is in the release stage, step 1224. If so, then the price of the security is set to the raw unchanged RIS, step 1226.

It should be recognized by one skilled in the art that the above described factors are not the only factors which could be used in adjusting the RIS. For example, the RIS could be adjusted by such factors as an industry box office index of the movie's cast, an industry popularity index for the cast, an estimated budget, actual budget, or the release season for the movie. Further, it should be recognized that different factors will be used for product, actor, or service company securities to determine initial price.

The calculated initial price for a movie is not statically tied to the above formula. Regardless of the estimated price determined by the above factors, in the system of the second embodiment, the price is further adjusted after release of the movie. On the morning following a movie's release date, trading for the movie stock is halted. Trading is allowed to continue at the end of its opening weekend at an adjusted price that is based on the following formula:

(opening weekend box office gross/1 MM)*(a historic multiplier for total domestic gross)

By historic observation, the ideal historic multiplier value for the second embodiment of the present invention has been found to be 3.6.

The initial price for a bond in the market is determined in a similar way as with stocks. In the case of movie stars listed in the exchange described above, one way to determine price is by historical performance of movies the star has starred in.

In the exchange, individual actors are available for investors in the form of star bonds. Star bonds pay interest depending on a star's rating. Ratings are determined by a star's 36 month trailing average gross (TAG). TAG is the trailing average box-office gross of the movies a star has been in during the preceding 3 years. TAG values and ratings correspond to one of 11 classes: AAA, AA, A, BBB, BB, B, CCC, CC, C, U, and D. Each one of the 11 star bond ratings classes corresponds to a virtual dollar interest rate or coupon rate (see chart below). The rating and coupon for an individual actor in the second embodiment of the system of the present invention is determined according their TAG value as follows:

| | | |
|---|---|---|
| AAA | average gross: more than $100 million | Coupon: V$60 |
| AA | average gross: $75-99.9 million | Coupon: V$80 |
| A | average gross: $50-74.9 million | Coupon: V$100 |
| BBB | average gross: $40-49.9 million | Coupon: V$140 |
| BB | average gross: $30-39.9 million | Coupon: V$160 |
| B | average gross: $20-29.9 million | Coupon: V$180 |
| CCC | average gross: $15-19.9 million | Coupon: V$220 |
| CC | average gross: $10-14.9 million | Coupon: V$240 |
| C | average gross: $5-9.9 million | Coupon: V$260 |
| U (unrated) | average gross: less than $5 million | Coupon: V$300 |
| D (default) | average gross: none | Coupon: V$0 |

Investors in star bonds receive a 6th of the coupon interest per bond, each day. The % annual rate of return, or current yield is calculated by dividing the V$ coupon rate by the current price. Low rated star bonds denote high risk. The daily V$ payment of low rated star bonds is high to compensate traders for taking the risk of owning a low rated star bond. A high rating, such as AAA, denotes just the opposite.

The system is programmed under the principle that some traders buy star bonds whose rating is low in anticipation of the star's appearance in an upcoming blockbuster, raising the TAG (Trailing Average Gross), rating and price. Conversely, traders sell star bonds whose rating is high in anticipation of the star's appearance in an upcoming flop, lowering the TAG, rating and price.

A star bond with a U rating means that the bond is un-rated and a rating of D means that the bonds is in default.

Throughout the year, the system administrator updates TAG values, and thus, class ratings, as box office results are reported. Each Thursday, as new box office data is reported, the virtual specialist program sweeps the star bond market, looking for bond ratings which need to be-updated. Because a star bond's value is based on the cumulative performance of a movie, the virtual specialist program uses a 1.24 multiplier of the gross to date to estimate the movie's total gross after four weekends.

Alternatively, the price for bonds may be determined in a number of ways. One way a bond price may be determined is by assigning a box office index to the bond, which is based on the bond rating, and multiplying the index by a constant to obtain the price. Using this method, the bond rating can be adjusted by other factors, such as the number of films the bond's associated star has appeared in, the length of the star's career, the relative billing the star receives for the individual films that the star has appeared in, and the public's morality perception of the star. All of these factors are administratively set by the system administrator, and are then multiplied together with the box office index to obtain an adjusted box office index. The bond rating is then determined using the adjusted box office index.

Another way of determining an initial bond price is to determine the initial value in the same way the other security prices are determined as described above; namely by using a number of market factors, while determining future prices for bonds in the same way that other security prices are adjusted by the virtual specialist program as described below instead of using tradition fixed bond par values.

With respect to non-bond securities in the second embodiment of the system of the present invention, the virtual specialist program stores a running net movement balance (NMB) representing the quantity of securities for orders that the virtual specialist program fulfills which do not have any offsetting orders. The imbalance is stored as a positive number if the buy-sell imbalance represents more buy trade orders executed than sell orders, or a negative number if the buy-sell imbalance represents more sell orders executed than buy orders.

Derivatives Based on Contests

In some embodiments, the exchange may facilitate trading of derivative financial instruments representing contestants in contests. A contest may comprise a tournament, playoffs, game show, reality-based television series, awards show, sporting event, any/or any suitable competition. In general, the exchange may set initial prices for derivative financial instruments; determine a number of derivatives to sell; adjust and maintain prices associated with derivatives during the course of a contest; and manage the trading of derivatives among traders.

At the start of a contest, the exchange and/or an exchange administrator may identify the contestants in the contest. The contestants may be individuals, teams, athletes, groups, and/or any suitable entity. For a particular contestant, the exchange may determine an initial price for the derivative representing that contestant. The initial price of a particular derivative may be determined based on any suitable objective and/or subjective criteria. In particular, the initial price of a particular derivative may be based at least in part on a ranking, record, achievement, statistic, and/or team associated with the contestant represented by that derivative. Additionally, or alternatively, the initial price of a particular derivative may be based at least in part on the health, injuries, history, size, weight, and/or any suitable number and combination of characteristics associated with the contestant represented by that derivative. As an example, if the contest is a basketball tournament, the initial price of a derivative representing a particular team in the tournament may be based at least in part on the ranking and/or win-loss record of the particular team. In some embodiments, the initial price may be based at least in part on achievements, skills, or accomplishments of a particular contestant. For example, if the contest is an awards event such as the "Oscars," then the derivative for an awards nominee may be based on whether the nominee previously won an award. In some embodiments, the initial price of the derivative representing each contestant may be the same.

In some embodiments, the exchange may automatically determine the initial price of a particular derivative. In other embodiments, one or more individuals (such as, for example, a panel of experts) may use any suitable objective and/or subjective criteria to determine the initial price of a particular derivative.

In addition to determining an initial price of the derivative representing each contestant, the exchange may determine the number of shares to offer for each contestant in the contest. The exchange may determine the number of shares to offer based at least in part on an estimate of how many traders will participate in the exchange. In some embodiments, the number of shares issued may be a hypothetical number since the virtual specialist program of some embodiments may not actually keep any shares in reserve.

The exchange may be configured to define a group of traders that may participate in trading via the exchange. The group of traders may be defined by any suitable number and combination of characteristics. For example, the defined group may represent subscribers of a particular internet service, members of a particular organization, customers of a particular company, and/or any suitable group. In some embodiments, the exchange may require an individual to have a configurable passcode in order to participate in trading via the exchange. The passcode may represent a password, access key, and/or any suitable means for verifying whether an individual may participate in the exchange. In some embodiments, an individual may "win" a passcode by purchasing a product. For example, a passcode may be printed on the underside of bottle caps of certain bottles of a particular beverage. Thus, the exchange may provide incentives for individuals to purchase a particular product to have an opportunity to participate in the exchange. In the foregoing example, by purchasing more bottles of the particular beverage, an individual may increase his or her chances of obtaining a bottle cap having a passcode to participate in the exchange. In other embodiments, the passcode may be printed inside a candy wrapper, inside a box of cereal, and/or on a scratch-off card associated with a product. Although the foregoing examples illustrate a passcode associated with a product, the passcode may be associated with a service such as, for example, a cellular phone service, a music download service, an internet service, and/or any suitable service. In such embodiments, the passcode may be sent to selected individuals electronically, via email, in print, and/or via any suitable media.

In some embodiments, the exchange may allow anyone to participate as a trader in the exchange. The exchange may allow traders to form leagues or groups. For example, a group of friends, colleagues, and/or associates may form a league to compete against one another as traders. By forming leagues, traders may be able to compete against other traders in their league to determine, for example, which trader can build the most valuable portfolio, which trader can obtain the most shares associated with the winning contestant in the competition underlying the exchange, and/or which trader can achieve any suitable number and combination of goals.

After determining the initial prices of the derivatives, the exchange may offer the derivatives for sale to traders. In some embodiments, traders may register to participate in the exchange before the beginning of the contest underlying the exchange. Upon registering with the exchange, a trader may receive a configurable amount of virtual currency. The exchange may display to the trader the derivatives that are currently available for trade. Based as least in part on the displayed information, the trader may submit one or more buy orders to purchase one or more derivatives. Upon receiving the one or more buy orders, the exchange may transfer the requested number of shares to the trader. The exchange may automatically debit an account associated with the trader according to the price of the purchased shares.

Once traders begin to trade derivatives, the prices of the derivatives may fluctuate based on supply and demand of the various derivatives. In some embodiments, during the course of the contest, the virtual specialist program is operable to occasionally adjust the prices associated with the derivatives. For example, if the contest is a sports tournament, the exchange may adjust the prices associated with the derivates after one or more rounds of the tournament. The price adjustment for a particular derivative may be based at least in part on the performance of the contestant associated with that derivative. For example, for a sports tournament, the exchange may increase the price of a derivative representing a team that won in the first round of the tournament. A derivative of a team that won by a large margin may experience a greater price increase than that of a team that won by a small margin. Thus, the exchange may determine a price adjustment for a particular derivative based on the performance of the contestant represented by that derivative.

In some embodiments, if a contestant loses and/or is eliminated from the contest, the price of the derivative corresponding to that contestant may drop to zero. In other embodiments, when a contestant is eliminated from the contest, the exchange may reduce the price of the corresponding derivative. The amount or percentage by which the exchange reduces the price of the derivative may depend at least in part on the stage of the contest. For example, for a contestant that is eliminated after the first episode of a reality-based television series, the price of the corresponding derivative may be reduced by a higher percentage than if the contestant were eliminated in a later episode of the reality-based series. In other embodiments, the exchange may reduce a derivative by a lower percentage if the contestant is eliminated in an earlier episode of a reality-based series than if the contestant is eliminated in a later episode. In some embodiments, the exchange may adjust the derivative prices after each episode, stage, and/or round of the contest.

The exchange may be configured to provide incentives for a trader to increase the value of the trader's portfolio of derivatives. In some embodiments, at the end of the contest underlying the exchange, the exchange may compare the portfolios of multiple traders. The exchange may award a prize to the trader with the most valuable portfolio. In other embodiments, at the end of the contest, the exchange may award prizes to each trader having more than a configurable number of shares associated with the winning contestant. In yet other embodiments, the exchange may award dividends to traders having derivatives associated with contestants that advance beyond a particular stage of the contest. The dividends may represent virtual currency, shares of derivatives, and/or any other suitable reward.

The exchange may be operable to regulate trading activity. In particular, the exchange may be operable to halt trading during particular portions of a contest. For example, if the contest is a reality-based television series, the exchange may suspend trading during the airing of each episode of the television series.

The exchange may store a running net movement balance (NMB) representing the quantity of securities for orders that the virtual specialist program fulfills which do not have any offsetting orders. The imbalance is stored as a positive number if the buy-sell imbalance represents more buy trade orders executed than sell orders, or a negative number if the buy-sell imbalance represents more sell orders executed than buy orders.

The foregoing examples illustrate derivatives that are based on athletes, teams, contestants, and/or participants in reality-based television series. In some embodiments, the derivatives may be based on politicians, directors, public figures, celebrities, and/or models. In some embodiments, the contest associated with the exchange may represent a political event, a poll, an election, a survey, and/or any suitable event. For example, the contest associated with the exchange may be a political election and the derivatives may represent candidates in the election. As another example, the contest may represent a survey or poll (such as, for example, a magazine's ranking of the "50 Most Beautiful People") and the derivatives may represent celebrities or other individuals who may be considered in the survey or poll. Thus, the exchange may be associated with any number and combination of contests as well as any number and combination of contestants.

In some embodiments, the exchange may regulate the contents of a particular trader's portfolio. For example, a trader may not be allowed to own more than a configurable percentage of the total shares of a particular derivative. As another example, a trader may not have more than a configurable percentage of his or her shares associated with a single derivative. It will be understood that the exchange may impose any suitable number and combination of regulations on traders participating in the exchange.

In some embodiments, the exchange may determine a maximum and/or a minimum "cash-out" or redemption value for each derivative. A maximum redemption value for a particular derivative may be the maximum value for which a trader may buy, sell, and/or redeem a share of that derivative. Similarly, a minimum redemption value for a particular derivative may be the minimum value for which a trader may buy, sell, and/or redeem a share of that derivative. The exchange may adjust the maximum and/or minimum redemption value of a particular derivate after each stage of the contest. For example, if the contest represents the baseball playoffs, the maximum redemption value during the first round of the playoffs may be $50. At the start of the second round of the playoffs, the exchange may, for the remaining teams, increase the maximum redemption value for a share of a derivative to $100. The exchange may determine the maximum and/or minimum redemption value for a particular derivative based on any suitable criteria. For example, the maximum and/or minimum redemption value may be based on the number of contestants, the stage of the contest, the number of traders, and/or any other suitable factor. Although the foregoing example illustrates a contest representing baseball playoffs, it should be understood that the exchange may be associated with any number and combination of contests. In the foregoing example, the exchange doubled the maximum redemption value for derivatives representing contestants that advanced in the contest. It should be understood, however, that the exchange may adjust the maximum and/or minimum redemption values for derivatives in any suitable manner.

Figure 12B:
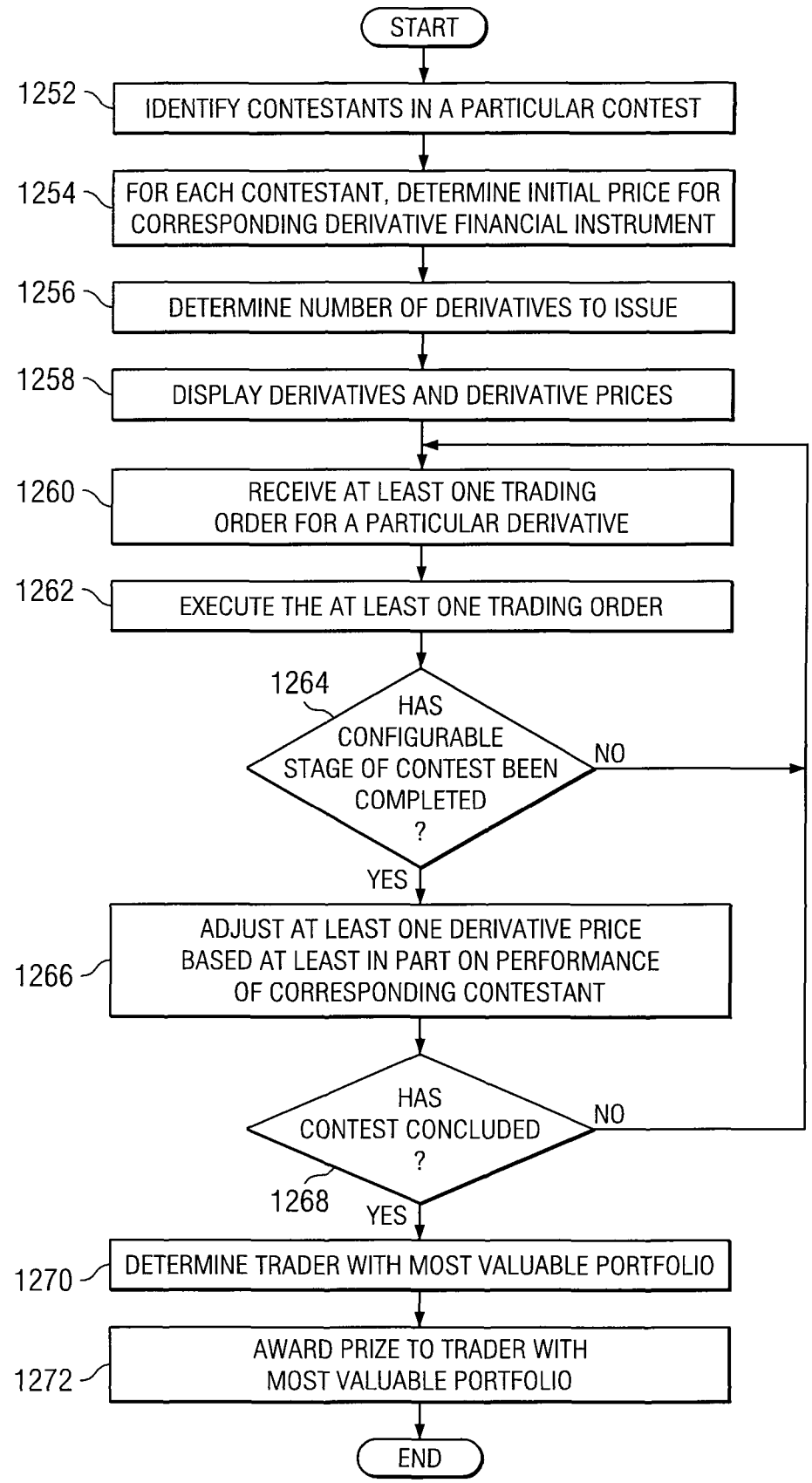
FIG. 12b illustrates a flowchart for a trading system based on contests according to one embodiment of the present invention.

FIG. 12b illustrates a flowchart for managing an exchange of derivatives based on a particular contest according to one embodiment of the present invention. At step 1252, the exchange identifies the contestants in a particular contest. At step 1254, for each identified contestant, the exchange determines an initial price for the derivative financial instrument representing the identified contestant. The determination of the initial price may be based at least in part on achievements, records, rankings, skills, and/or accomplishments associated with the particular contestant. At step 1256, the exchange determines how many shares of each derivative to offer for sale to traders. The number of shares offered for sale may be based at least in part on an estimate of the anticipated number of traders that will participate in the exchange.

At step 1258, the exchange displays to traders the derivatives and the associated prices. The exchange may display the names, background information, and/or characteristics of the contestants in the contest. At step 1260, the exchange receives from a trader at least one trading order for a particular derivative. The trading order may specify a number of shares of the derivative as well as a bid or offer price. At step 1262, the exchange executes the received trading order. At step 1264, the exchange determines whether a configurable stage of the contest has been completed. In some embodiments, a configurable stage may represent a round of a tournament, an episode of a reality-based television series, or any other suitable portion of a contest.

If at step 1264 the exchange determines that the configurable stage of the contest has not yet been completed, the process returns to step 1260. However, if at step 1264 the exchange determines that the configurable stage of the contest has been completed, then at step 1266 the exchange adjusts the prices of derivatives associated with the contest. The price adjustment for a particular derivative may be based at least in part on the performance of the corresponding contestant during a stage of the contest.

At step 1268, the exchange determines whether the contest has concluded. If at step 1268 the exchange determines that the contest has not concluded, then the process returns to step 1260. However, if at step 1268 the exchange determines that the contest has concluded, then at step 1270 the exchange determines the particular trader that has the most valuable portfolio. At step 1272, the exchange may award a prize to the particular trader with the most valuable portfolio. In some embodiments, the exchange may award multiple prizes to multiple traders based on the value and/or assets of the portfolios of the traders.

Determining Price Movement of a Security

Figure 13:
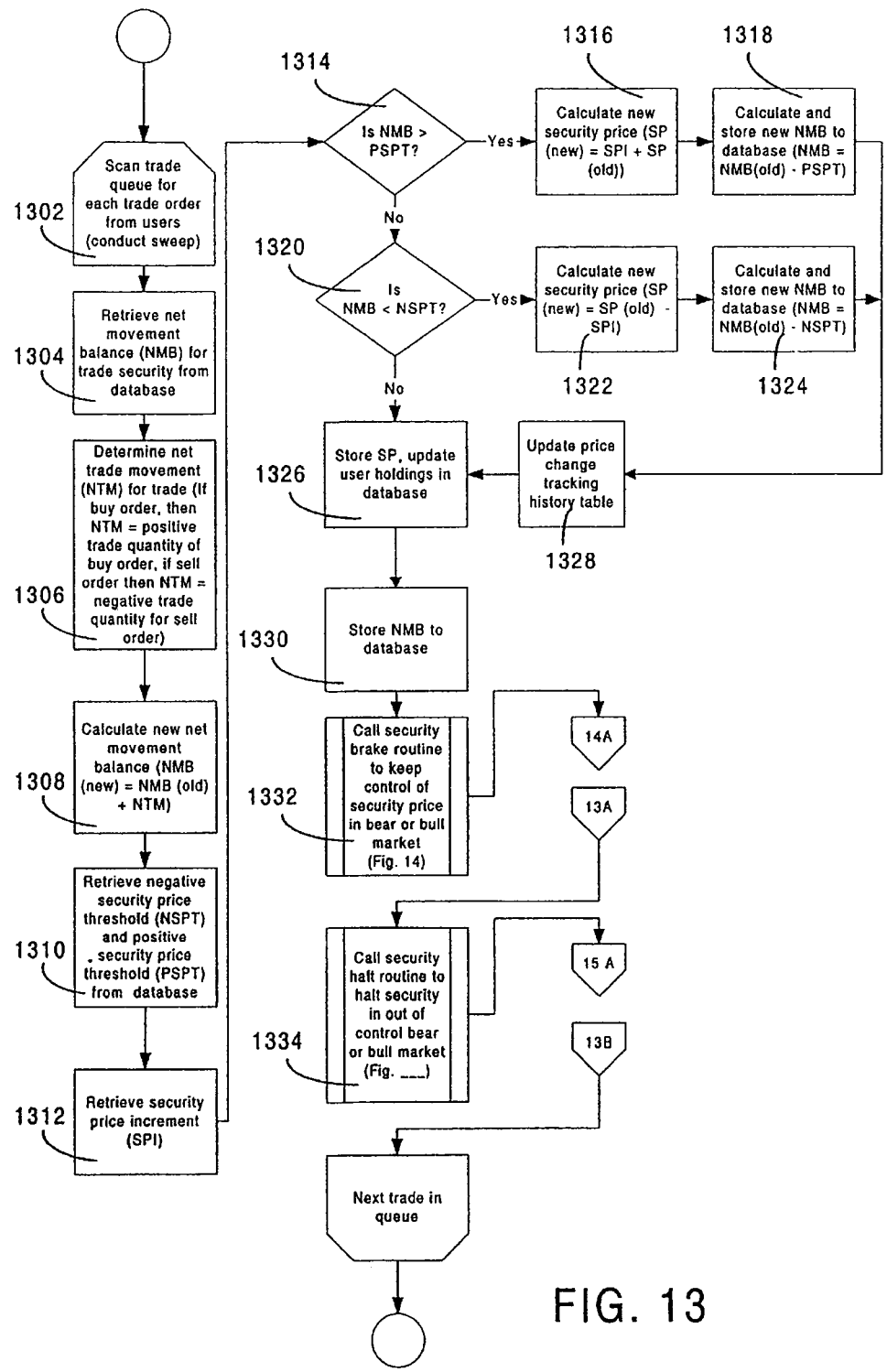
FIG. 13 is a flow diagram illustrating the logic of a security trade fulfillment and security price setting program of the second embodiment of the present invention.
Figure 14:
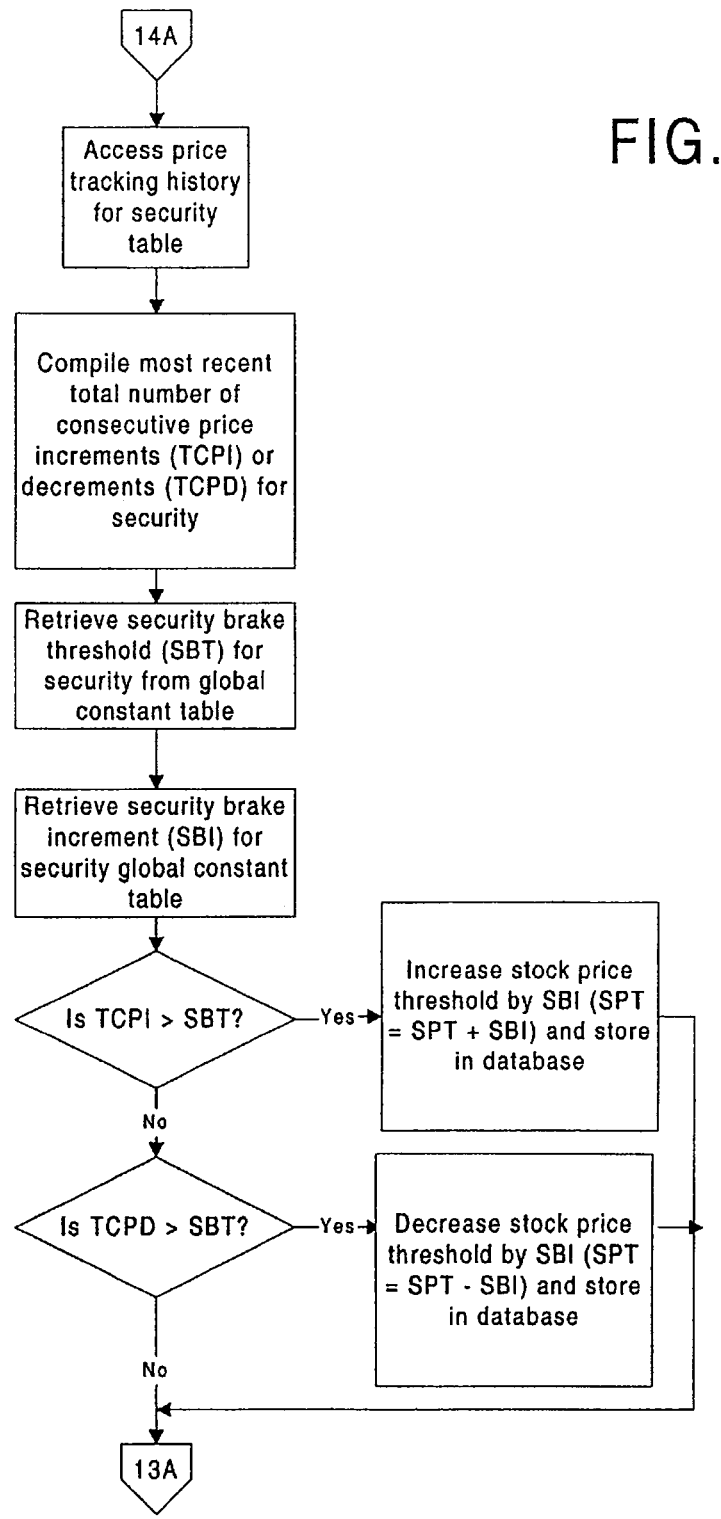
FIG. 14 is a flow diagram illustrating the logic of a trade braking program of the second embodiment of the present invention.

With reference to FIG. 13, a flowchart illustrating the calculations for determining price movement of a security is shown. Unlike trading non-virtual markets, the virtual specialist program of the second embodiment does not control the economy by setting prices of shares based on last executed buy order price. Rather, the virtual specialist program determines the price of an instrument after each trade by computing an outstanding buy-sell imbalance. The system scans or sweeps a trade queue containing the data for buy and sell orders placed by users for price adjustment, step 1302.

The buy-sell imbalance for the security, also referred to herein as the net movement balance (NMB) is read from a net movement balance database where net movement balances for all securities are tracked, step 1304. The virtual specialist program controls security prices by incrementing or decrementing security prices based on the NMB using a combination of a security price increment (SPI) constant, and a pair of security price threshold constants. Both a positive security price threshold (PSPT) constant, and a negative security price threshold (NSPT) constant is set in a security constant table 2002 for each security in the system by the system administrator.

When a user executes a trade, a record is added to the trade queue. As a field in the trade record, a net trade movement (NTM) variable for a trade order is set to the positive quantity of shares if the trade order is a buy order, and to the negative quantity of shares if the trade order is a sell order, step 1306. A new NMB is calculated by adding the pre-trade NMB, as retrieved from a net price movement table 2008 (NMB (old)), to the NTM, step 1308.

The NSPT and PSPT constants for the securities are retrieved the security constant table 2002, step 1310. A security price increment (SPI) constant for the security which is the subject of the trade order is retrieved from the security constant table 2002, 1312. The NMB is then compared to the PSPT, step 1314. If the NMB is greater than the PSPT, then the price for the security (SP) is calculated by adding the SPI to the SP before the trade which was retrieved from a security price table 2006, step 1316. The NMB is then reduced by the PSPT and stored back to the net price movement table 2008, step 1318.

Conversely, if the NMB is less than the NSPT (a negative value), step 1320, then the SP (new) is calculated by subtracting the SPI from the SP (old), step 1322. The NMB is then incremented by the NMB (which is also negative in this case), step 1324.

After the above calculations are made, the SP is stored in a security price table 2006, step 1326, which keeps track of all security prices. If the price of the security changed, a price history tracking table 2020 is updated, performing a write SQL statement which adds a record comprising the SP, NMB, UserID, and other information relating to the trade, step 1328. The NMB is updated in the net movement balance table 2012 for the security that was the subject of the trade order, step 1330. Each record of the net movement balance database further contains an increment tracking field for keeping track of the number of consecutive increments for the security instrument, up or down. Aside from the virtual specialist program, the stored information is used by a marketing tool, explained below, which provides statistical information to market researchers.

The last steps for processing a trade record are to call the security brake check routine, step 1332, and the security halt check routine, step 1334, both explained in detail below.

Periodically, due to natural popularity of a particular security, or by market manipulation by an individual or groups of traders, a security may realize wild fluctuations in price. This is especially true in a market in which virtual currency is used in a virtual market. Given the special circumstances of the virtual market, the system provides an artificial price control, or braking, mechanism.

The braking mechanism of the present invention monitors each price increment the virtual specialist program performs. When a price moves up or down on a security instrument, the increment tracking field of the net movement balance table 2008 is retrieved for the security, step 1402. A security brake threshold (SBT) constant, and a security brake increment (SBI) constant is retrieved from the security constant table 2002, steps 1404-1406. If the total consecutive number of price increments (TCPI) is greater than the SBT, step 1408, then the PSPT is increased by the security brake increment, and then stored back to the security constant table 2002, step 1410. If the total consecutive number of price decrements is greater than the SBT, step 1412, the NSPT is decreased by the security brake increment, and then stored back to the security constant table 2002, 1414. In this way, for securities which have experienced price movement greater than the set thresholds, the price movement will be slowed.

Figure 15:
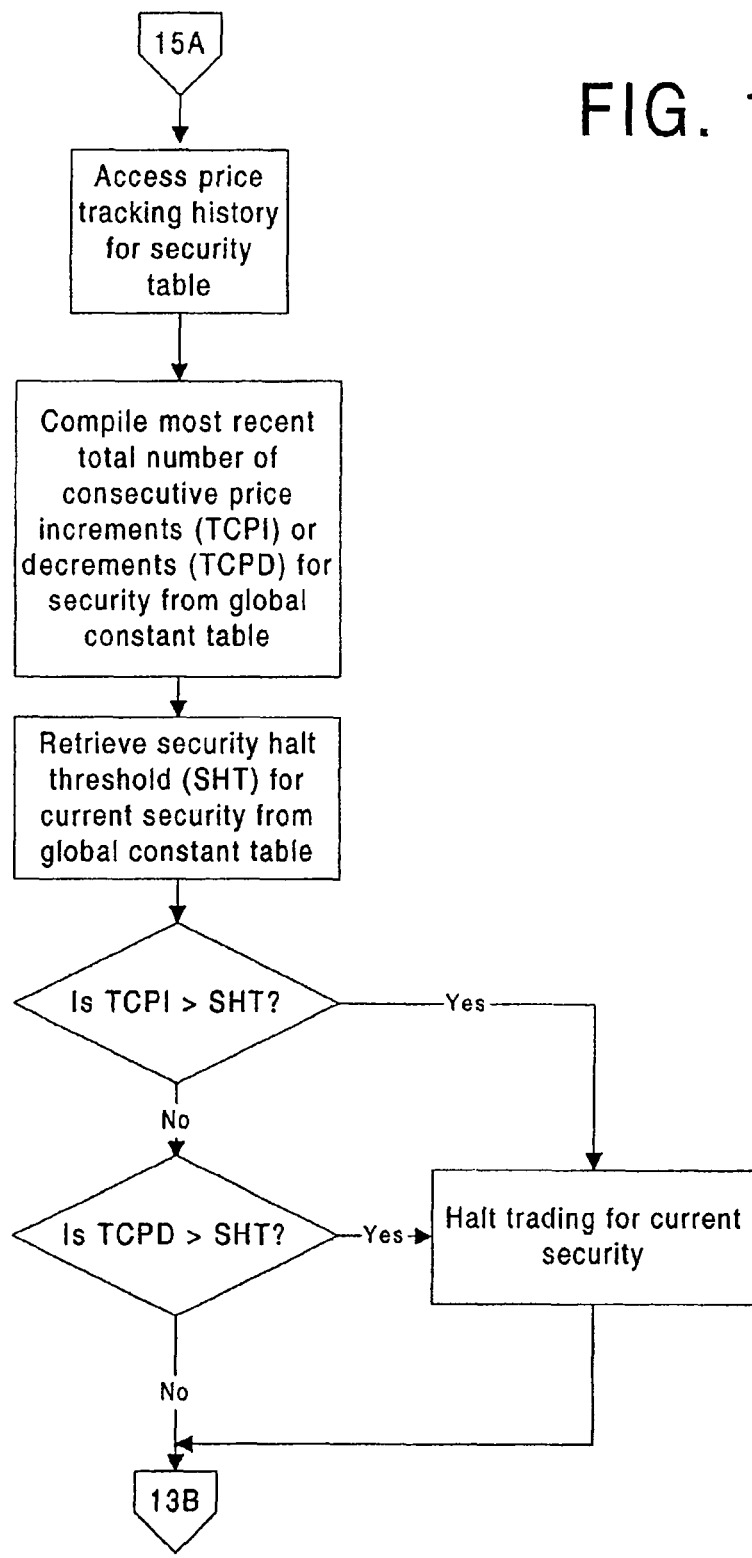
FIG. 15 is a flow diagram illustrating the logic of a trade halting program of the second embodiment of the present invention.

Still, the braking mechanism may not be effective enough in either an extreme bear or bull market for the security, or the market as a whole. In those instances, a halting mechanism is provided by the system. With reference to FIG. 15, a flowchart illustrating a process for preempting trading for certain securities with out of control price movements is shown.

The halting mechanism acts much in the same way as the braking mechanism. The TCPI or TCPD is retrieved for the security which was the subject of the trade order above from the price tracking history table 2020, step 1502. The exception is that a security halt threshold (SHT) constant is compared to the value from TCPI/TCPD field, step 1504. If the TCPI/TCPD field value exceeds the SHT, steps 1506 or 1508, then trading is halted for that particular security, step 20 1510. A notice appears on screen for a trader who tries to trade the security informing the user that trading has been halted by the system. Trading for the security may be resumed after an administratively set period of time, or manually through an administration module.

Figure 16:
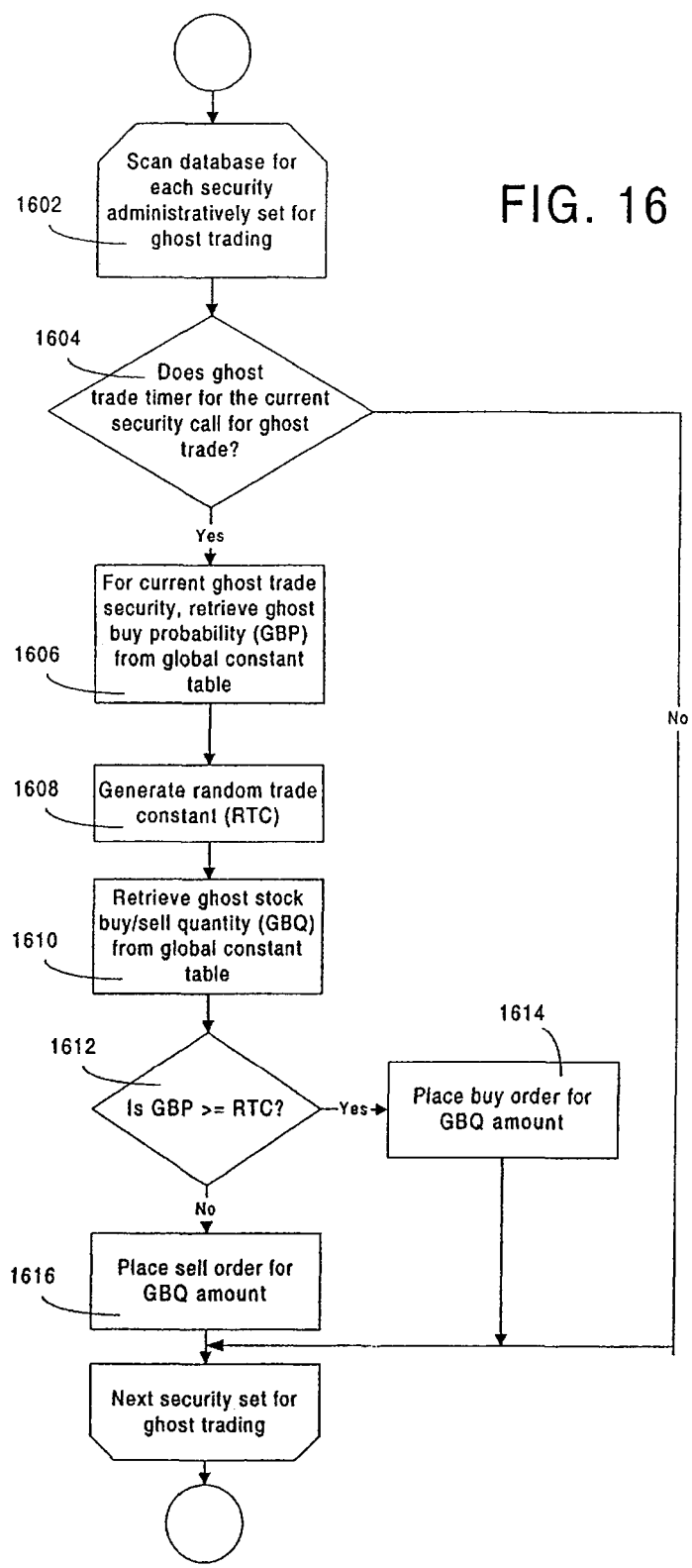
FIG. 16 is a flow diagram illustrating the logic of a ghost trading program of the second embodiment of the present invention.

With reference to FIG. 16, a ghost trading system process is illustrated. The ghost trading system of the second embodiment is used as both a tool to bolster the trading level of some securities which would otherwise have low trading levels and, more importantly, as a means for the system administrator to take control of the economy after changing thresholds, constants and global variables. The ghost trading system is used to speed up the actions of the economy by creating volume that, when processed with new variables changes the direction of the market quickly.

For each of certain selected securities, a ghost trading mechanism randomly creates automatic or ghost trades. A ghost trading table 2014 is provided with a timer, which reads the system clock and determines daily time intervals, is included. The system periodically queries the ghost trading table 2014, step 1602. Each security instrument record in 40 the ghost trading table 2014 is set to cause a trade for an administrative set number of times per trading day. If the timer detects that the time interval between trades for a security has ended, step 1604, the ghost trading mechanism retrieves a ghost buy probability (GBF) from the ghost trade table 2014, step 1606. A random trade constant (RTC) is generated by the system, 1608. Next, a ghost security buy/sell quantity (GBQ) is retrieved from the ghost trade table 2014, step 1610. If the GBT is greater than or equal to the RTC, step 1612, a buy order is placed by the system for the number of shares specified by the GBQ, step 1614. Otherwise, a sell order is placed for the number of shares specified by the GBQ, step 1616.

In the above discussion, the term trade or the term trade order also includes stop limit orders and short sells. The only difference in these types of trades is when the actual trade is posted. In the case of a stop limit order placed by a user, for example, when the user specifies the condition in which the trade should take place, the stop limit order is stored in a stop limit order queue. Each time a security changes price, the stop limit queue is checked by the virtual specialist program to see if any stop limit conditions are met. If so, the normal trade queue is updated with the stop limit order, and the virtual specialist program performs the trade as with a normal trade.

Virtual Reserve Bank Program

The system of the present invention includes a virtual reserve bank program. The reserve bank program regulates the economy with monetary tools which are provided within a reserve bank program module. With these tools, certain system global constants, such as total money supply and interest rates can be adjusted.

In the case of interest rates, adjustable global constants are built into the an administration table 2016 for the virtual trading system. By raising or lowering rates, the amount of interest paid on the virtual dollars not tied up in securities is adjusted for the users. In this way, the unused money in users' accounts act as money market accounts for which interest is adjusted accordingly.

In the second embodiment, a virtual reserve bank program chairman can determine interest rates and security threshold constants by using global interest threshold constants (GITCs), and acts as a monitor of inflationary and deflationary pressures in the system. Inflationary and deflationary pressure may be defined as the size of the system economy, i.e., number of shares of securities which obtain a certain defined price. For example, the total outstanding shares may have a combined par value of V$8 billion, and the total market price for the shares outstanding may be V$80 billion with about V$5 billion average daily trading volume. The virtual specialist program, for the majority of securities in the system, may have PSPTs set to 10,000 and NSPTs set to −10,000. The money market rate may be set to 7% under these market conditions by the reserve bank program. However, if prices on the exchange were to inflate to a value of V$200 billion, for example, the PSPT might be increased by 10,000 and the NSPTs decreased by 10,000, and the money market interest rate reset to 15%.

As part of maintaining a sound economy, the system's virtual reserve bank program and/or the virtual specialist program may monitor certain inflationary thresholds and trigger a drain of the system if those thresholds are met. During a system drain, users are offered the opportunity to exchange virtual dollars into U.S. Dollars for exchange of goods and/or services. The drain will have the effect of taking virtual currency out of the system, thus helping to control inflation. Executing the drain comprises comparing the overall currency and/or security holdings to a drain constant administratively set in the global constant table 2022. When the global constant has been reached or exceeded, users are offered the opportunity to purchase products, such as software or mail order products, with their virtual dollars. For the users who choose to do so, the cost of the products are debited from their accounts and orders are added to a product fulfillment database designating that the offered products need to be sent to the user. Similarly to the order tracking database, the orders are stored in a drain history database so that statistical information can be drawn in the marketing research tool explained below.

Marketing Research Tool

With reference to FIG. 1, the second embodiment of a market research tool is also implemented in the client server environment over Internet 10. Computer 12 is used as a front end for a market research user who wishes to access the system of the present invention to view and download statistical research data which has been compiled and stored on servers 14 from the users' demographic data and trading history.

Figure 17:
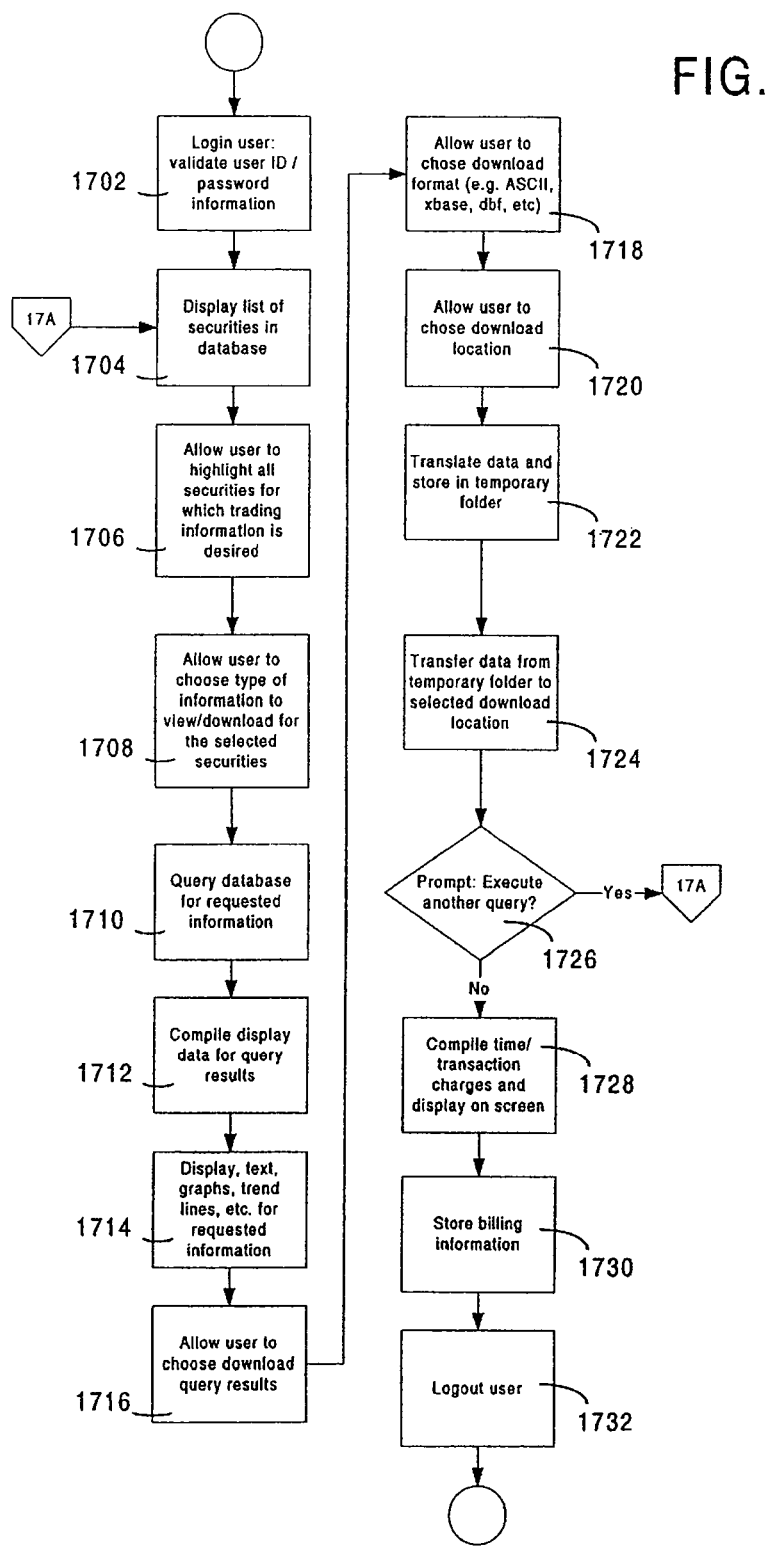
FIG. 17 is a flow diagram illustrating the logic of a research market tool of the second embodiment of the present invention.

With reference to FIG. 17 the market research user accesses the market research tool by logging into the system, step 1702. Each market research user may establish an account, by either subscribing on-line or by telephone before using the system. The market research user is prompted for a user identification code and password for entry into the system.

Upon successful login into the system, the market research user is presented with a list of securities in the system database, step 1704. The market research user may, by use of a mouse or arrow keys, highlight securities for which the user wishes to view or download statistics, step 1706. In order to choose more than one security, the market research user may use a combination of the mouse, arrow keys and shift key. If the shift key is held down during selection, the prior selections made by the user are retained as highlighted selections in combination with the new selection. Selection criteria may also be selected to choose a certain class of securities, or securities which meet, for example, a minimal trading volume threshold over a specified period of time.

After selection of securities, the market research user is given options, on screen, for categories of information which may be obtained, step 1708. Exemplary categories which may be obtained regarding a security or group of securities include: trade volume information, buy vs. sell volume information, timing of volume information, total volume held information, investment concentration information, price information, stop limit order volume information, short sell volume information, and aggregate index information.

More specifically, in choosing to obtain trade volume for particular securities, the market research user may assess public awareness of the security. A very high trade volume over a period of time indicates a high degree of awareness for the security. Conversely, minimal volume indicates very little awareness. A query is performed on a trade history tracking table 2010 maintained by the virtual specialist program which contains a mirror image of all trades fulfilled by the virtual specialist program. A trade volume query answer table is created which contains, for each requested security, overall trade volume figures, yearly trade volume figures, monthly trade volume figures, and daily trade figures.

With regard to buy vs. sell volume information, if the volume for a security is predominantly buy-side volume, or volume generated by traders buying the security, it is generally due to a positive awareness. A predominantly sell-side volume for a security indicates that traders believe the security to be overvalued. When the market research user directs the system to obtain buy vs. sell volume information, the market research tool performs a query on the trade history tracking table 2010 and the price history tracking table 2020 described with respect to the virtual specialist program above. The query creates a temporary buy-sell volume answer table for all securities requested. The buy-sell volume answer table contains, for each security, overall buy volume figures, overall sell volume figures, yearly buy volume figures, yearly sell volume figures, monthly buy volume figures, monthly sell volume figures, daily buy volume figures, and daily sell volume figures.

With regard to timing of volume information, the trade volume for a security may be evaluated with respect to the entity underlying the security. For particular securities based on films or actors, the trade volumes of the particular securities may be evaluated with respect to the stage of development that a project, for example a movie or actor's career, is in. A film that has just entered production, for example, hasn't been marketed by the studio to the public yet. High trading volume for the related movie stock may represent great public awareness for the movie or positive reaction by traders to the combination of actors who star in the movie. Similarly, in the movie star bond market, a non A-list actor that has high trade volume has a relatively high awareness.

In other embodiments, for securities based on contestants in a particular contest, the trade volumes of the particular securities may be evaluated with respect to the perceived popularity of a particular contestant. For example, high trade volumes for a derivative based on a particular contestant in a reality-based television series may represent a positive reaction by traders to the particular contestant.

When the market research user directs the system to obtain timing volume information, the market research tool performs a query on the trade history tracking table 2010 and related development stage history table 2024, which keeps track of start and completion times of stages of development. The query creates a temporary timing volume answer table for all securities requested. The timing volume answer table contains, for each security, timing volume figures for each stage of production or project.

With regard to the total volume held for a security, if traders buy a particular security and generally hold on to it for a longer than average period of time, it demonstrates a high degree of faith in the long term performance of a security. For example, if traders tend to invest and hold an actor's star bond, it is probably because they think she has a long career ahead of her and will be popular for more than just one or two films. When the market research user directs the system to obtain total volume held information, the market research tool performs a query on the trade history tracking table 2010 which calculates the average number of shares held for each trader for the requested securities for each trader. The query creates a temporary total volume held answer table for all securities requested. The total volume held answer table contains, for each security, the time that each trader held each security they purchased, along with the volume held.

With regard to investment concentration, when there is heavy investment volume per shareholder in a particular security, it may demonstrate a high degree of faith in or loyalty to the entity underlying the particular security. For example, if 50,000 traders each hold an average of 100 shares corresponding to a particular sports team, and 10,000 traders hold an average of 500 shares for a second sports team, the first sports team would tend to have more widespread appeal than the second sports team, but the second sports team would tend to have a more loyal following. An analogous principle may be applied to derivatives based on actors. For example, if 50,000 traders each hold an average of 100 star bonds for a first actor, and 10,000 traders hold an average of 500 star bonds for a second actor, the first actor would tend to have more widespread appeal than the second actor, but the second actor would tend to have a more loyal following. In financial markets, this is known as concentration. In down markets, holders of these securities are unwilling to sell; in up markets they are willing to add to their positions. When the market research user directs the system to obtain investment concentration information, the market research tool performs a query on the trade history tracking table 2010 to retrieve figures for the average volume per share for all requested securities held at any time by all traders. The query creates a temporary investment concentration answer table for all securities requested. The total investment concentration answer table contains, for each security, the average volume that each trader held for each requested security.

With regard to price information, security prices are tied to perceived chances of success of the entity to which the security is tied. For example, for derivatives based on movies or actors, security prices may be tied to perceived sales performance for the movie or actor which the security is tied to. Stock prices associated with movies may be tied to perceived box office performance. If a movie stock is priced at $30, and a trader thinks that the movie will gross more than $30 million at the box office, the trader will most probably buy the movie stock. Thus, the system of the present invention has the ability to find out what contestants, teams, groups, entities, films, actors, phonorecordings, or products consumers perceive will be successful. When the market research user directs the system to obtain price information, the market research tool performs a query on the price history tracking table 2020, described with respect to the virtual specialist program above, to retrieve price per share for all requested securities held by traders. The query creates a temporary price answer table for all securities requested. The price answer table contains, for each security, the price for each requested security.

With regard to stop limit order information, the system of the present invention tracks traders who set the price a security must obtain before a trade order is filled. Stop limit orders are not filled in the event that the market doesn't hit the specified price before the time that the order expires. This functionality gauges traders' sensitivity to a price. For example, if a trader will only buy a movie stock below $30, that may indicate that the trader only perceives a limited upside for the security, and thus believes that the movie will not be an industry blockbuster. As another example, if a trader will only buy a stock associated with a particular team if the stock price is below $30, that may indicate that the trader perceives a small chance for that team to succeed in a tournament. When the market research user directs the system to obtain stop limit order information, the market research tool performs a query on the trade history tracking table 2010 to retrieve price per share and volume figures for all requested securities held at any time by all traders which were stop limit orders, whether the limit for such orders were met or not. The query creates a stop limit order answer table for all securities requested. The stop limit order answer table contains, for each security, price per share and volume figures for every stop limit order requested by traders for the requested securities.

With respect to short sell information, if a trader thinks that the value of a security is going to decline, the trader can short sell the security. Analysis of short sell volume on a security can gauge if there is negative sentiment towards the security. When the market research user directs the system to short sell information, the market research tool performs a query on the trade history tracking table 2010 to retrieve short sell volume figures. The query creates a short sell answer table for all securities requested. The short sell answer table contains, for each security requested, the short sale trades orders by all traders.

With regard to index performance information, by aggregating market information into indices, insights can be drawn about the market as a whole. For example, a movie studio security index can be generated by calculating the sum of a studio's ten highest priced movie stocks over time. As another example, a college basketball conference index may be generated by calculating the sum of the conference's ten highest priced stocks over time. The performance of such an index may measure the potential strength of a studio's distribution, the potential box office potential of a studio's upcoming films, or the potential strength or popularity of a particular conference. When the market research user directs the system to obtain index performance information, the market research tool performs a query on the price history tracking table 2020 to retrieve price change figures for the securities in all requested indices. The query creates a temporary index performance answer table for all securities requested. The index performance answer table contains, for each requested index, price change over time figures.

In step 1708 (FIG. 17), the market research user may choose any number of the above categories of information for display or download for the securities selected in step 1706 by an on-screen selection or check list.

After the categories of information have been chosen, the market research user may then select an on-screen Ok button to execute the research. The system then compiles and executes a selection of SQL query calls according to all selections made by the user, step 1710. The query results are compiled and prepared for display, step 1712.

Once the results are compiled, pre-programmed graph, trend line and textual templates are used to display the query results on the GUI client display for all chosen securities and information categories described above, step 1714.

After display, the user is given the option, by selection button, to download the displayed results and underlying query data, step 1716. If selected, the market research user is allowed to select from a variety of download formats, such as ASCII, xbase, dbf, HTML, tif, gif, bmp, or the like, step 1718. The market research user is allowed to choose a download location on the local client, step 1720. The system then proceeds to compile the data into the chosen format, step, 1722. The data is then transferred, using any one of a variety of protocols such as zmodem, xmodem, ftp, or any one of the OS industry standard protocols, step 1724. In the Web client-server environment, a TCP/IP socket is used.

After transfer, the market research user is prompted for whether another query is desired, step 1726. If another query is desired, execution is passed back to step 1704 for another research iteration. Otherwise, time and/or transaction charges, which are tracked from login time at step 1702, are compile and displayed on client 12, step 1728. The charges are simultaneously stored in a billing database for the next billing cycle, step 1730. The user is then logged out of the system, step 1732.

Although the present invention has been described in detail, it should be understood the various changes, substitutions, and alterations can be made hereto without departing from the scope of the invention as defined by the appended claims.

What is claimed is:

1. An apparatus, comprising:
   at least one processor; and
   at least one memory that stores at least one of a first order and a second order, and that stores instructions which, when executed by the at least one processor, direct the at least one processor to:
      receive, from a first trader of a group of traders, a first order to buy a financial instrument that represents a contestant in a contest associated with a television show, wherein the first trader is associated with a first account of virtual electronic currency;

receive, from a second trader of the group of traders, a second order to sell the financial instrument, wherein the second trader is associated with a second account of virtual electronic currency;

determine a price of the financial instrument based at least in part on the first order, the second order, and at least one of a result associated with a stage of the contest and a performance of the contestant in the contest;

execute a trade at the determined price;

determine an updated price of the financial instrument if the contestant loses the contest, in which the act of determining the updated price comprises:

reducing the price of the financial instrument to zero if the contestant loses the contest;

determine that the first contestant advanced beyond a subsequent stage of the contest;

award a dividend to the first trader responsive to determining that the contestant advanced beyond a subsequent stage of the contest; and determine whether to temporarily halt trading of the financial instrument during an episode of the television show.

2. The apparatus of claim 1, wherein the instructions, when executed by the at least one processor, further direct the at least one processor to:

determine an initial price of the financial instrument based at least in part on a characteristic of the contestant.

3. The apparatus of claim 2, wherein the characteristic of the contestant comprises at least one of an achievement of the contestant, a record of the contestant, a ranking of the contestant, and a skill of the contestant.

4. The apparatus of claim 1, wherein the instructions, when executed by the at least one processor, further direct the at least one processor to:

adjust the price based at least in part on a subsequent result associated with at least one subsequent stage of the contest.

5. The apparatus of claim 4, wherein adjusting the price comprises:

adjusting the price after each stage of the contest.

6. The apparatus of claim 1, wherein the instructions, when executed by the at least one processor, further direct the at least one processor to:

compare a first portfolio of financial instruments associated with the first trader against a second portfolio of financial instruments associated with the second trader; and determine a winning trader from among the group of traders based at least in part on the comparison between the first and second portfolios.

7. The apparatus of claim 1, wherein the financial instrument comprises a stock, in which the television show is a game show comprising the contest, in which a game show host of the game show interacts with multiple contestants of the game show including the contestant during the contest, and in which the game show host does not compete in the contest.

8. The apparatus of claim 1, wherein the financial instrument comprises a bond.

9. The apparatus of claim 1, wherein reducing the price to zero if the contestant loses the contest comprises:

reducing the price to zero upon determining that the contestant was eliminated from the contest, wherein the contest comprises an awards event, and and wherein the contestant comprises at least one nominee for an award at the awards event, wherein more than two contestants are nominated for the award prior to a start of the awards event.

10. The apparatus of claim 1, wherein the stage of the contest is one of a plurality of stages of the contest, the plurality of stages of the contest respectively corresponding to a plurality of episodes of the television show.

11. The apparatus of claim 1, wherein the stage of the contest corresponds to an episode of the television show.

12. The apparatus of claim 1, wherein:

the first trader is associated with a first account of electronic currency; and the second trader is associated with a second account of electronic currency; and the instructions, when executed by the at least one processor, further direct the at least one processor to:

debit the first account according to the trade; and credit the second account with proceeds of the trade.

13. The apparatus of claim 12, wherein the electronic currency is backed by at least one of real currency and artificial currency.

14. The apparatus of claim 1, wherein the instructions, when executed by the at least one processor, further direct the at least one processor to:

determine a redemption value associated with the financial instrument; and adjust the redemption value based at least in part on a subsequent result associated with at least one subsequent stage of the contest, in which the contest comprises an awards event, and in which the contestant comprises at least one nominee for an award at the awards event, wherein more than two contestants are nominated for the award prior to a start of the awards event.

15. The apparatus of claim 14, wherein the redemption value represents a maximum value for which a trading exchange will redeem a share of the financial instrument.

16. The apparatus of claim 14, wherein the redemption value represents a minimum value for which a trading exchange will redeem a share of the financial instrument.

17. The apparatus of claim 1, wherein the instructions, when executed by the at least one processor, further direct the at least one processor to:

regulate a contents of a portfolio of financial instruments associated with the first trader such that a number of shares of the financial instrument in the portfolio does not exceed a configurable percentage of all of the shares of financial instruments in the portfolio.

18. The apparatus of claim 1, wherein the instructions, when executed by the at least one processor, further direct the at least one processor to:

receive a passcode from the first trader; and verify, based at least in part on the passcode, that the first trader is eligible to participate in trading the financial instrument, wherein the contest is not a sporting competition.

19. The apparatus of claim 18, wherein the first trader obtained the passcode via purchase of a particular product.

20. The apparatus of claim 1, wherein executing the trade comprises:

executing a trade of the financial instrument at the price using at least one of real currency and artificial currency.

21. The apparatus of claim 1, wherein the television show comprises a reality-based television series.

22. The apparatus of claim 1, wherein the television show comprises a game show.

23. The apparatus of claim 1, wherein the processor is further operable to:
regulate a contents of a portfolio of financial instruments associated with the first trader such that the portfolio does not comprise more than a configurable percentage of outstanding shares of the financial instrument.

24. The apparatus of claim 1, wherein the processor is further operable to:
define the group of traders, the group of traders being eligible to participate in trading the financial instrument.

25. The apparatus of claim 24, wherein defining the group of traders comprises:
defining the group of traders based at least in part on at least one of subscriber status with an internet service, membership status with a particular organization, and customer status with respect to a particular company.

26. The apparatus of claim 1, wherein the processor is further operable to:
determine a second price of a second financial instrument, the second financial instrument representing at least one of a second contestant in the contest associated with the television show and another contestant in another contest associated with another television show; and
execute a second trade at the second price.

27. A method comprising:
receiving, by at least one processor of a computing device, from a first trader of a group of traders, a first order to buy a financial instrument that represents a contestant in a contest associated with a television show, wherein the first trader is associated with a first account of virtual electronic currency;
receiving, by the at least one processor, from a second trader of the group of traders, a second order to sell the financial instrument wherein the second trader is associated with a second account of virtual electronic currency;
determining, by the at least one processor, a price of the financial instrument based at least in part on the first order, the second order, and at least one of a result associated with a stage of the contest and a performance of the contestant in the contest;
executing, by the at least one processor, a trade at the determined price;
determining that the contestant lost the contest;
determining an updated price of the financial instrument if the contestant loses the contest, in which the act of determining the updated price comprises:
reducing the price of the financial instrument to zero responsive to the contestant losing the contest;
determining that the first contestant advanced beyond a subsequent stage of the contest;
awarding a dividend to the first trader responsive to determining that the contestant advanced beyond a subsequent stage of the contest; and
determining whether to temporarily halting trading of the financial instrument during an episode of the television show.

28. The method of claim 27, further comprising:
determining an initial price of the financial instrument based at least in part on a characteristic of the contestant.

29. The method of claim 27, further comprising:
adjusting the price based at least in part on a subsequent result associated with at least one subsequent stage of the contest.

30. The method of claim 29, wherein adjusting the price comprises:
adjusting the price after each stage of the contest.

31. The method of claim 27, further comprising:
comparing a first portfolio of financial instruments associated with the first trader against a second portfolio of financial instruments associated with second trader; and
determining a winning trader from among the group of traders based at least in part on the comparison between the first and second portfolios.

32. The method of claim 27, wherein the financial instrument comprises a stock,
in which the television show is a game show comprising the contest,
in which a game show host of the game show interacts with multiple contestants of the game show including the contestant during the contest, and
in which the game show host does not compete in the contest.

33. The method of claim 27, wherein the financial instrument comprises a bond,
in which the contest comprises an awards event, and
in which the contestant comprises at least one nominee for an award at the awards event, wherein more than two contestants are nominated for the award prior to a start of the awards event.

34. The method of claim 27, wherein reducing the price to zero if the contestant loses the contest comprises:
reducing the price to zero upon determining that the contestant was eliminated from the contest.

35. The method of claim 27, wherein the stage of the contest is one of a plurality of stages of the contest, the plurality of stages of the contest respectively corresponding to a plurality of episodes of the television show.

36. The method of claim 27, wherein the stage of the contest corresponds to an episode of the television show.

37. The method of claim 27, wherein:
the first trader is associated with a first account of electronic currency; and
the second trader is associated with a second account of electronic currency; and
wherein the method further comprises:
debiting, by the processor, the first account according to the trade; and
crediting, by the processor, the second account with proceeds of the trade.

38. The method of claim 27, further comprising:
determining a redemption value associated with the financial instrument; and
adjusting the redemption value based at least in part of a subsequent result associated with at least one subsequent stage of the contest.

39. The method of claim 38, wherein the redemption value represents a maximum value for which a trading exchange will redeem a share of the financial instrument.

40. The method of claim 27, further comprising:
regulating a contents of a portfolio of financial instruments associated with the first trader such that a number of shares of the financial instrument in the portfolio does not exceed a configurable percentage of all of the shares of financial instruments in the portfolio.

41. The method of claim 27, further comprising:
receiving a passcode from the first trader; and
verifying, based at least in part on the passcode, that the first trader is eligible to participate in trading the financial instrument,
wherein the contest is not a sports competition.

42. A non-transitory computer-readable medium storing instructions, the computer-readable medium being a tangible medium, the instructions being executable by a processor to:
receive, from a first trader of a group of traders, a first order to buy a financial instrument that represents a contestant in a contest associated with a television show wherein the first trader is associated with a first account of virtual electronic currency;
receive, from a second trader of a group of traders, a second order to sell the financial instrument, wherein the second trader is associated with a second account of virtual electronic currency;
determine a price of the financial instrument based at least in part of the first order,
the second order, and at least one of a result associated with a stage of the contest and a performance of the contestant in the contest;
execute a trade at the determined price;
determine an updated price of the financial instrument if the contestant loses the contest, in which the act of determining the updated price comprises:
reducing the price of the financial instrument to zero responsive to the contestant losing the contest;
determine that the first contestant advanced beyond a subsequent stage of the contest;
award a dividend to the first trader responsive to determining that the contestant advanced beyond a subsequent stage of the contest; and
determine whether to temporarily halt trading of the financial instrument during an episode of the television show.

43. The non-transitory computer-readable medium of claim 42, wherein the instructions are further executable by the processor to:
determine an initial price of the financial instrument based at least in part on a characteristic of the contestant.

44. The non-transitory computer-readable medium of claim 42, wherein the instructions are further executable by the processor to:
adjust the price based at least in part on a result associated with at least one stage of the contest.

45. The non-transitory computer-readable medium of claim 44, wherein adjusting the price comprises:
adjusting the price after each stage of the contest.

46. The non-transitory computer-readable medium of claim 42, wherein the instructions are further executable by the processor to:
compare a first portfolio of financial instruments associated with the first trader against a second portfolio of financial instruments associated with the second trader; and
determine a winning trader from among the group of traders based at least in part on the comparison between the first and second portfolios.

47. The non-transitory computer-readable medium of claim 42, wherein the financial instrument comprises a stock,
in which the television show is a game show comprising the contest,
in which a game show host of the game show interacts with multiple contestants of the game show including the contestant during the contest, and
in which the game show host does not compete in the contest.

48. The non-transitory computer-readable medium of claim 42, wherein the financial instrument comprises a bond.

49. The non-transitory computer-readable medium of claim 42, wherein reducing the price to zero if the contestant loses the contest comprises:
reducing the price to zero upon determining that the contestant was eliminated from the contest.

50. The non-transitory computer-readable medium of claim 42, wherein the stage of the contest is one of a plurality of stages of the contest, the plurality of stages of the contest respectively corresponding to a plurality of episodes of the television show.

51. The non-transitory computer-readable medium of claim 42, wherein the stage of the contest corresponds to an episode of the television show.

52. The non-transitory computer-readable medium of claim 42, wherein:
the first trader is associated with a first account of electronic currency;
the second trader is associated with a second account of electronic currency; and
the instructions are further executable by the processor to:
debit the first account according to the trade; an
credit the second account with proceeds of the trade.

53. The non-transitory computer-readable medium of claim 42, wherein the instructions are further executable by the processor to:
determine a redemption value associated with the financial instrument; and
adjust the redemption value based at least in part on a subsequent result associated with at least one subsequent stage of the contest.

54. The non-transitory computer-readable medium of claim 53, wherein the redemption value represents a maximum value for which a trading exchange will redeem a share of the financial instrument.

55. The non-transitory computer-readable medium of claim 42, wherein the instructions are further executable by the processor to:
regulate a contents of a portfolio of financial instruments associated with the first trader such that a number of shares of the financial instrument in the portfolio does not exceed a configurable percentage of all of the shares of financial instruments in the portfolio.

56. The non-transitory computer-readable medium of claim 42, wherein the instructions are further executable by the processor to:
receive a passcode from the first trader; and
verify, based at least in part on the passcode, that the first trader is eligible to participate in trading the financial instrument.

57. An apparatus, comprising:
a processor operable to:
determine an initial price of a financial instrument, wherein the processor is operable to determine the initial price based at least in part on a characteristic of a contestant in a contest, the financial instrument representing the contestant in the contest;
receive, from a first trader of a group of traders, a first order to buy the financial instrument, wherein the first trader is associated with a first account of virtual electronic currency;

receive, from a second trader of the group of traders, a second order to sell the financial instrument, wherein the second trader is associated with a second account of virtual electronic currency;

determine a price of the financial instrument based at least in part on the first order and the second order;

execute a trade of the financial instrument at the price;

determine an adjusted price of the financial instrument based at least in part on at least one of a result associated with a stage of the contest and a performance of the contestant in the contest;

execute a plurality of subsequent trades at the adjusted price;

determine a further updated price of the financial instrument if the contestant loses the contest, in which the act of determining the further updated price comprises:

reducing the adjusted price of the financial instrument to zero responsive to the contestant losing the contest;

determine that the first contestant advanced beyond a subsequent stage of the contest;

award a dividend to the first trader responsive to determining that the contestant advanced beyond a subsequent stage of the contest; and determine whether to temporarily halt trading of the financial instrument during an episode of the television show; and a memory operable to store at least one of the first order and the second order.

58. The apparatus of claim 57, wherein the characteristic of the contestant comprises at least one of an achievement of the contestant, a record of the contestant, a ranking of the contestant, and a skill of the contestant.

59. The apparatus of claim 57, wherein reducing the adjusted price to zero if the contestant loses the contest comprises:

reducing the adjusted price to zero upon determining that the contestant was eliminated from the contest.

60. The apparatus of claim 57, wherein the processor is further operable to:

compare a first portfolio of financial instruments associated with the first trader against a second portfolio of financial instruments associated with the second trader; and determine a winning trader from among the group of traders based at least in part on the comparison between the first and second portfolios.

61. The apparatus of claim 57, wherein the financial instrument comprises a stock, in which the television show is a game show comprising the contest, in which a game show host of the game show interacts with multiple contestants of the game show including the contestant during the contest, and in which the game show host does not compete in the contest.

62. The apparatus of claim 57, wherein the financial instrument comprises a bond.

63. The apparatus of claim 57, wherein executing the trade comprises:

executing a trade of the financial instrument at the price using at least one of real currency and artificial currency.

64. The apparatus of claim 57, wherein the processor is further operable to:

determine a redemption value associated with the financial instrument; and adjust the redemption value based at least in part on a subsequent result associated with at least one subsequent stage of the contest.

65. The apparatus of claim 64, wherein the redemption value represents a minimum value for which a trading exchange will redeem a share of the financial instrument.

66. The apparatus of claim 57, wherein the processor is further operable to:

regulate a contents of a portfolio of financial instruments associated with the first trader such that a number of shares of the financial instrument in the portfolio does not exceed a configurable percentage of all of the shares of financial instruments in the portfolio.

67. The apparatus of claim 57, wherein the processor is further operable to:

regulate a contents of a portfolio of financial instruments associated with the first trader such that the portfolio does not comprise more than a configurable percentage of outstanding shares of the financial instrument.

68. The apparatus of claim 57, wherein the processor is further operable to:

receive a passcode from the first trader, wherein the first trader obtained the passcode via purchase of a particular product; and verify, based at least in part on the passcode, that the first trader is eligible to participate in trading the financial instrument.

69. The apparatus of claim 57, wherein the processor is further operable to:

define the group of traders, the group of traders being eligible to participate in trading the financial instrument.

70. The apparatus of claim 69, wherein defining the group of traders comprises:

defining the group of traders based at least in part on at least one of subscriber status with an internet service, membership status with a particular organization, and customer status with respect to a particular company.

71. The apparatus of claim 57, wherein the processor is further operable to:

determine a second price of a second financial instrument, the second financial instrument representing with at least one of a second contestant in the contest and another contestant in another contest; and execute a second trade at the second price.

72. The apparatus of claim 57, wherein:

the contest comprises a sports tournament; and the contestant comprises at least one of an athlete and a team in the sports tournament.

73. The apparatus of claim 57, wherein the contest is associated with a television show.

74. The apparatus of claim 57, wherein:

the contest comprises an awards event; and the contestant comprises at least one nominee for an award at the awards event, wherein more than two contestants are nominated for the award prior to a start of the awards event.

75. The apparatus of claim 57, wherein:

the contest comprises a political election; and the contestant comprises at least one politician competing in the political election.

76. The apparatus of claim 57, wherein:

the contest comprises a survey; and the contestant comprises at least one individual, the at least one individual being a subject of the survey.

77. A method, comprising:

determining, by a processor of a computing device, an initial price of a financial instrument, the initial price is determined based at least in part on a characteristic of a contestant in a contest, the financial instrument representing the contestant in the contest;

receiving, by the processor, from a first trader of a group of traders, a first order to buy the financial instrument, wherein the first trader is associated with a first account of virtual electronic currency;

receiving, by the processor, from a second trader of the group of traders, a second order to sell the financial instrument, wherein the second trader is associated with a second account of virtual electronic currency;

determining, by the processor, a price of the financial instrument based at least in part on the first order and the second order;

executing, by the processor, a trade of the financial instrument at the price;

determining, by the processor, an adjusted price of the financial instrument based at least in part on at least one of a result associated with a stage of the contest and a performance of the contestant in the contest;

executing, by the processor, a plurality of subsequent trades at the adjusted price;

determining that the contestant lost the contest; and determining a further updated price of the financial instrument responsive to determining that the contestant lost the contest, in which the act of determining the further updated price comprises:

reducing, by the processor, the adjusted price to zero based on the act of determining that the contestant lost the contest;

determining that the first contestant advanced beyond a subsequent stage of the contest;

awarding a dividend to the first trader responsive to determining that the contestant advanced beyond a subsequent stage of the contest; and determining whether to temporarily halting trading of the financial instrument during an episode of a television show.

* * * * *